(12) United States Patent
Ghuman et al.

(10) Patent No.: US 6,918,577 B2
(45) Date of Patent: Jul. 19, 2005

(54) TOOLING PLATE FOR A FLEXIBLE MANUFACTURING SYSTEM

(75) Inventors: Abid Ghuman, Bloomfield Hills, MI (US); John E. Robertson, Troy, MI (US); Bruce Giezentanner, Troy, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/253,168

(22) Filed: Sep. 24, 2002

(65) Prior Publication Data

US 2004/0056405 A1 Mar. 25, 2004

(51) Int. Cl.$^7$ ................................................ B23Q 3/00
(52) U.S. Cl. ................................................... 269/309
(58) Field of Search .......................... 269/309; 29/787, 29/281.5, 407.04, 407.1, 702, 705, 720; 408/87; 248/346.02; 279/79; 403/32.4; 409/219

(56) References Cited

U.S. PATENT DOCUMENTS

| | | |
|---|---|---|
| 3,968,558 A | 7/1976 | Sekine et al. |
| 4,069,764 A | 1/1978 | Teyssedre |
| 4,442,335 A | 4/1984 | Rossi |
| 4,589,184 A | 5/1986 | Asano et al. |
| 4,641,820 A | 2/1987 | Gold et al. |
| 4,670,961 A | 6/1987 | Fontaine et al. |
| 4,683,651 A | 8/1987 | Taketani et al. |
| 4,738,387 A | 4/1988 | Jaufmann et al. |
| 4,776,085 A | 10/1988 | Shiiba |
| 4,829,445 A | 5/1989 | Burney |
| 4,991,707 A | 2/1991 | Alexander et al. |
| 5,014,901 A | 5/1991 | Moran |
| 5,105,534 A | 4/1992 | Kautt |
| 5,127,569 A | 7/1992 | Sekine et al. |

(Continued)

FOREIGN PATENT DOCUMENTS

| | | |
|---|---|---|
| EP | 0003024 B1 | 1/1982 |
| EP | 0203170 B1 | 6/1984 |
| EP | 0133456 A2 | 2/1985 |
| EP | 0289384 B1 | 9/1988 |
| EP | 0166558 B1 | 8/1989 |
| EP | 0044565 B1 | 3/1991 |
| EP | 0446518 A1 | 9/1991 |
| EP | 0318965 B1 | 2/1995 |
| EP | 0346816 B1 | 6/1995 |
| EP | 1225003 A2 | 7/2002 |
| EP | 1225121 A2 | 7/2002 |
| JP | 19800000155006 A2 | 5/1982 |
| JP | 02220783 A | 9/1990 |
| JP | 04084694 A | 3/1992 |
| WO | WO 8607554 A1 | 12/1986 |
| WO | WO 00/43845 A1 | 7/2000 |

OTHER PUBLICATIONS

C. Jarvis, Cell Technology and Flexible Manufacturing Systems. http://sol.brunel.ac.uk/~jarvis/bola/jit/cellsfms.html.

Alliance Introduces New Line of Modular Manufacturing Systems. www.allianceauto.com/news3,1.html—Spring 1996.

(Continued)

Primary Examiner—Robert C. Watson
(74) Attorney, Agent, or Firm—Raymond L. Coppiellie; Brooks & Kushman P.C.

(57) ABSTRACT

A tooling plate to fixture a workpiece for a vehicle subassembly is provided, including a planar body 10 for supporting fixture tools 32, 34 for holding a workpiece, a connector mechanism to allow the planar body 10 to be removably connected with a workpiece presenter 50, and a locater mechanism 70, 72, 74 to locate the planar body 10 with respect to the workpiece presenter 50 in a repeatable manner.

14 Claims, 81 Drawing Sheets

U.S. PATENT DOCUMENTS

| | | | |
|---|---|---|---|
| 5,152,050 A | | 10/1992 | Kaczmarek et al. |
| 5,216,800 A | | 6/1993 | Nishigori |
| 5,239,739 A | | 8/1993 | Akeel et al. |
| 5,272,805 A | | 12/1993 | Akeel et al. |
| 5,386,621 A | | 2/1995 | Fluegge et al. |
| 5,788,225 A | * | 8/1998 | Iwata et al. .................. 269/309 |
| 6,073,325 A | * | 6/2000 | Stark ........................... 29/33 P |
| 6,089,557 A | * | 7/2000 | Obrist ......................... 269/309 |
| 6,145,180 A | | 11/2000 | Kogai et al. |
| 6,185,469 B1 | | 2/2001 | Lewis et al. |
| 6,193,142 B1 | | 2/2001 | Segawa et al. |
| 6,308,496 B1 | | 10/2001 | Lee et al. |
| 6,324,749 B1 | | 12/2001 | Katsuura et al. |
| 6,334,252 B1 | | 1/2002 | Sato et al. |
| 6,360,421 B1 | | 3/2002 | Oatridge et al. |
| 6,378,190 B2 | | 4/2002 | Akeel |
| 6,389,698 B1 | | 5/2002 | Malatier |
| 6,438,842 B1 | | 8/2002 | Raami |
| 6,642,473 B2 | | 11/2003 | Stiers et al. |
| 6,768,076 B2 | * | 7/2004 | Walter ..................... 219/69.11 |
| 2002/0056187 A1 | | 5/2002 | Oatridge et al. |
| 2002/0077721 A1 | | 6/2002 | Linn et al. |

OTHER PUBLICATIONS

Models for Specification and Control of Flexible Manufacturing Systems. www.cs.chalmers.se/~andreass/cfms/Bilder_fran_Lulea/index.html. Mar. 27, 1997.

Gary S. Vasilash, Honda's Hat Trick, Automotive Design Production, www.autofieldguide.com/articles/article_print.cfm.

An American in Graz. Daimler Chrysler Totally Integrated Automotive Special 2000.

John Sprovieri, The Perils and Profits of Assembly Cells. Assembly, Business News Publishing Company, Jul., 2002.

James V. Higgins, The Detroit News, Honda Continues to Fine Tune the Art of Automobile Making, Jul. 28, 2002.

* cited by examiner

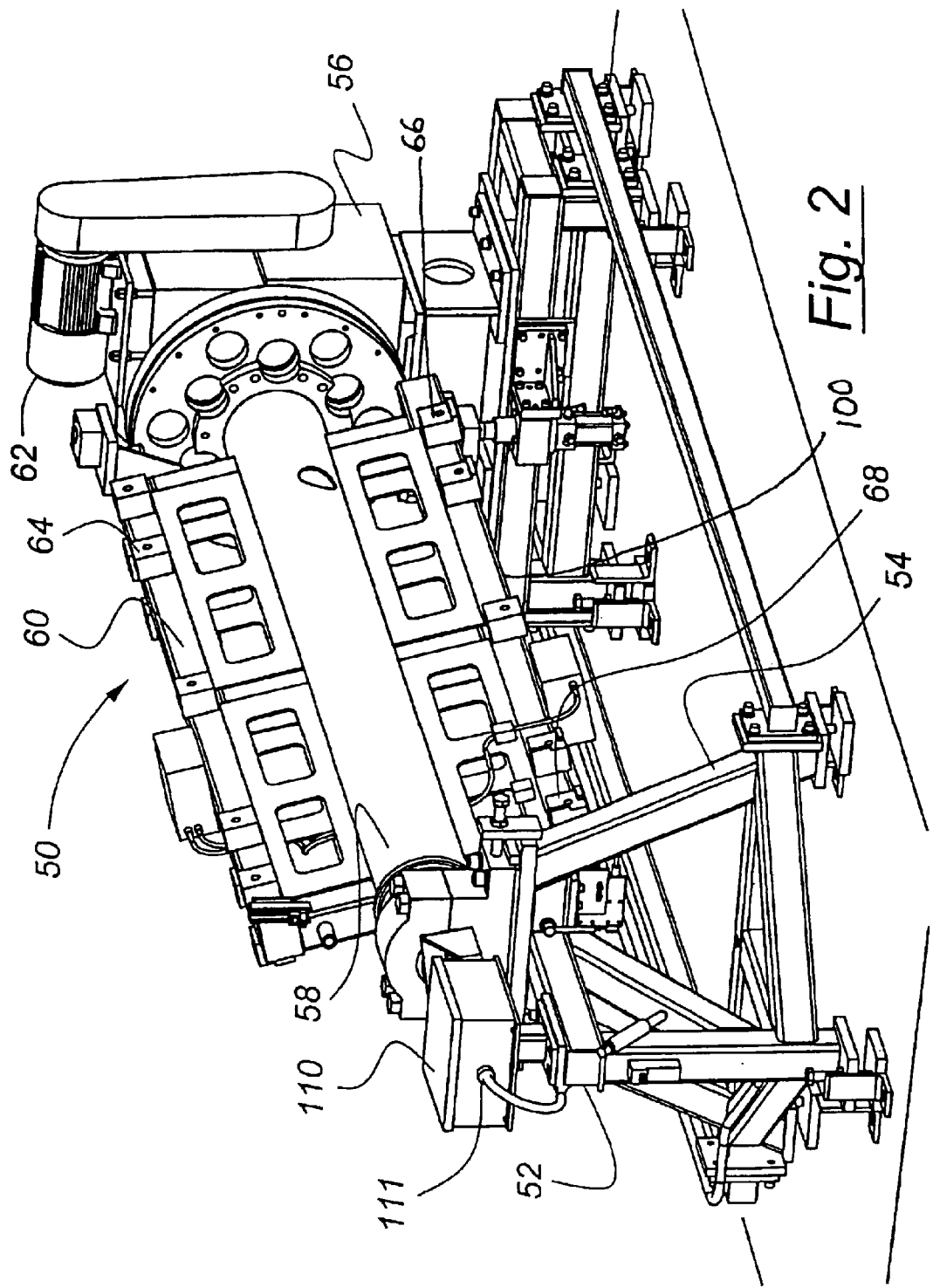

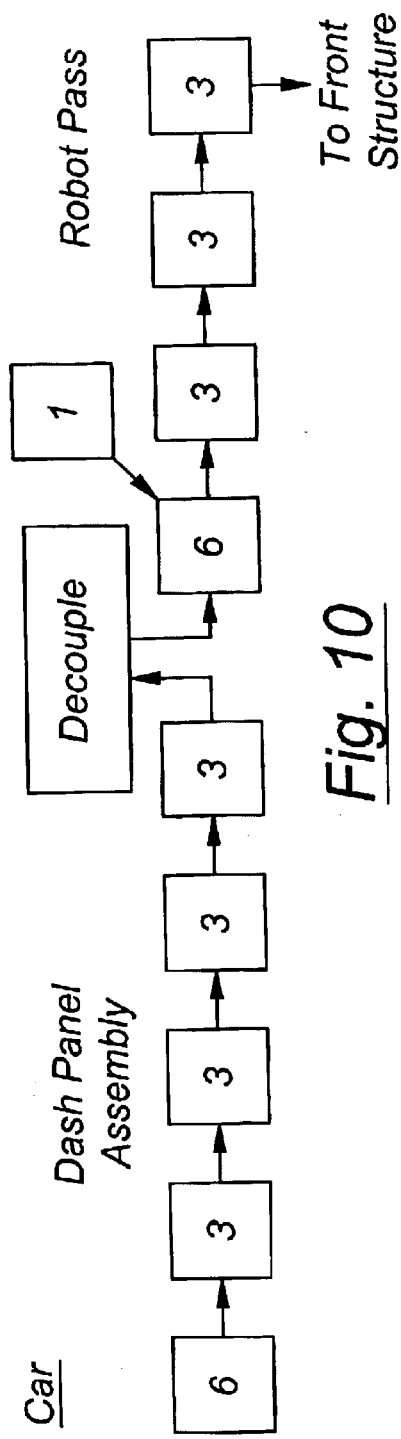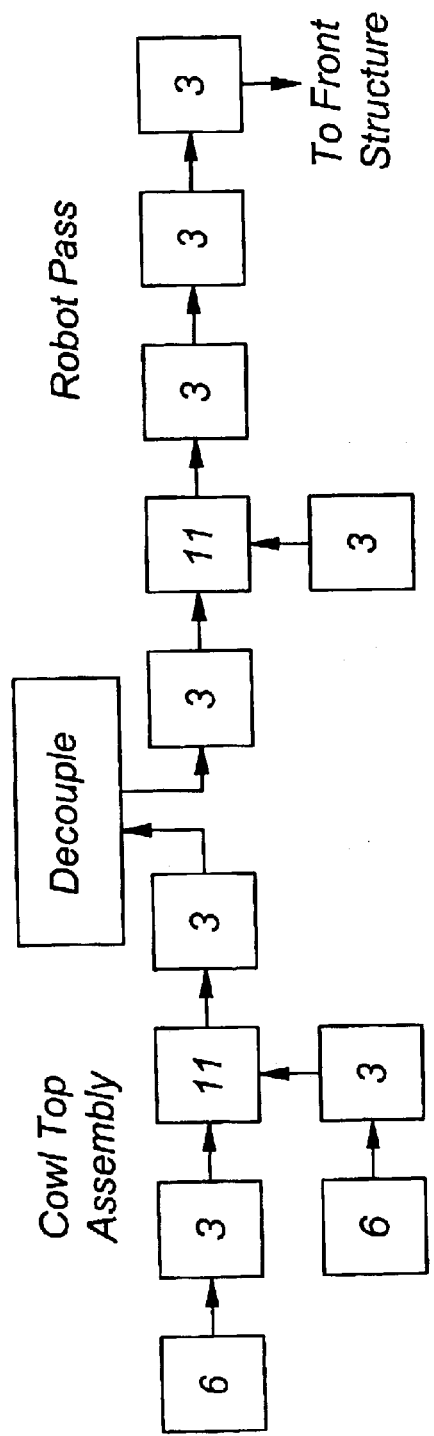

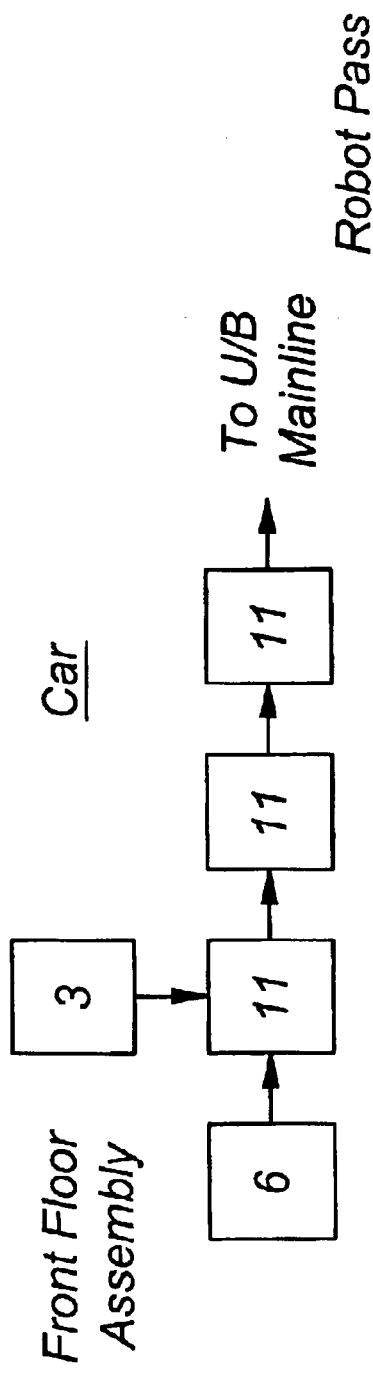
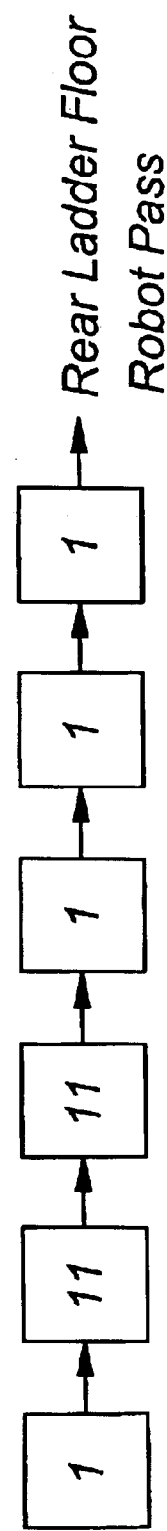

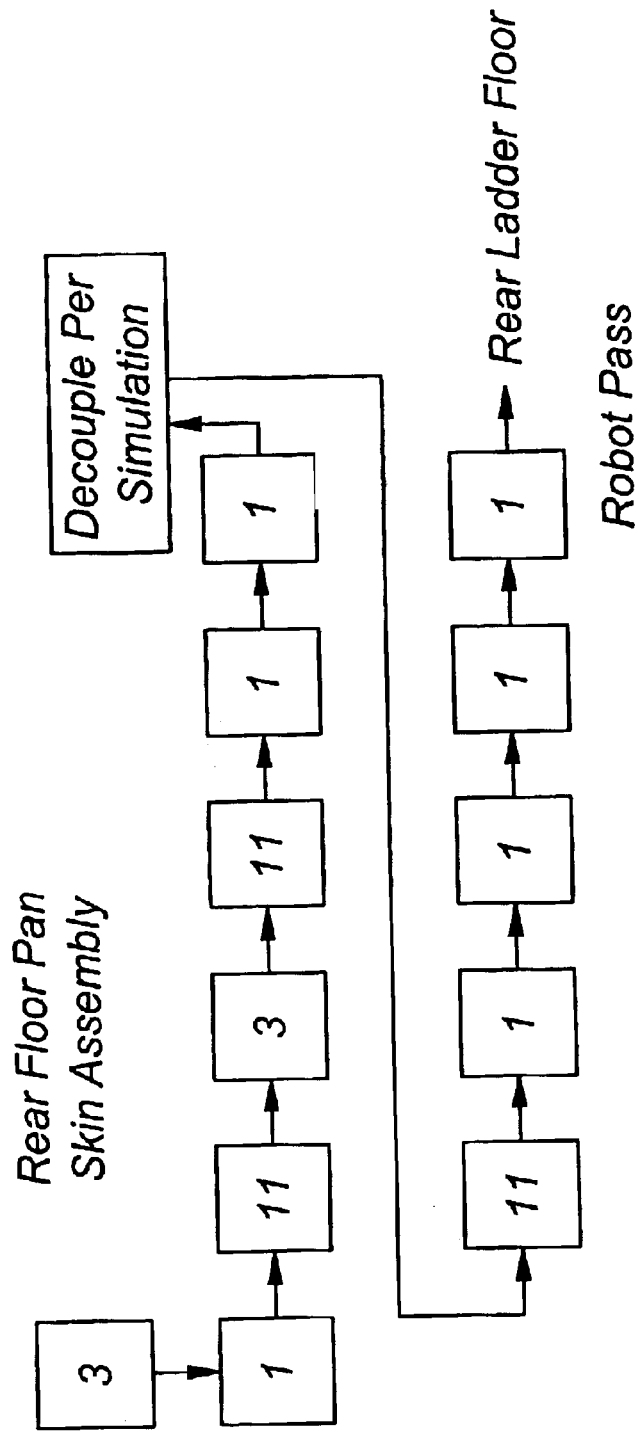

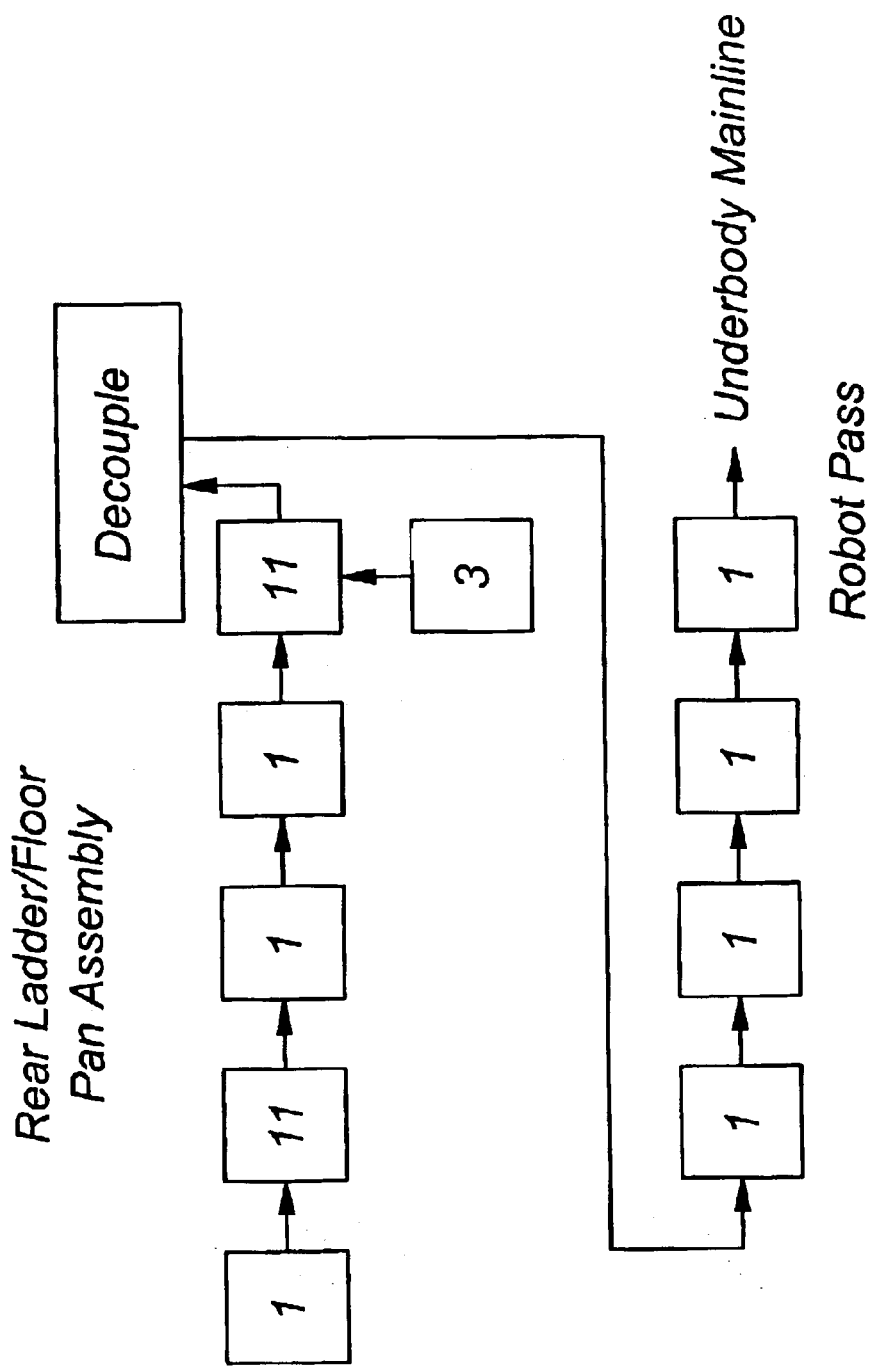

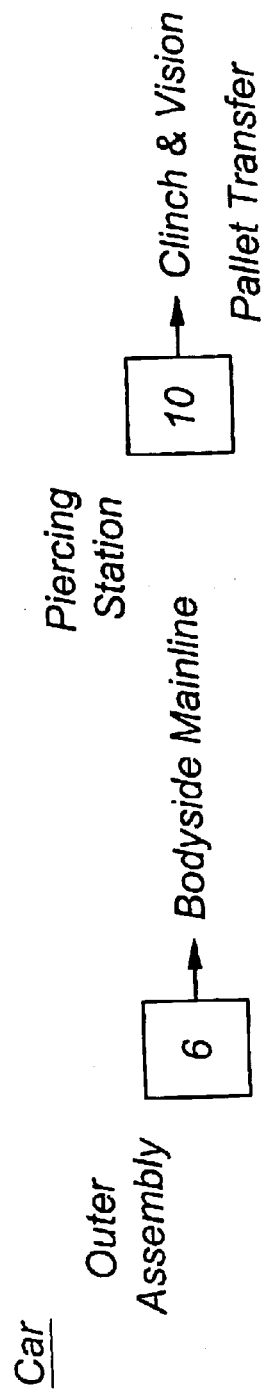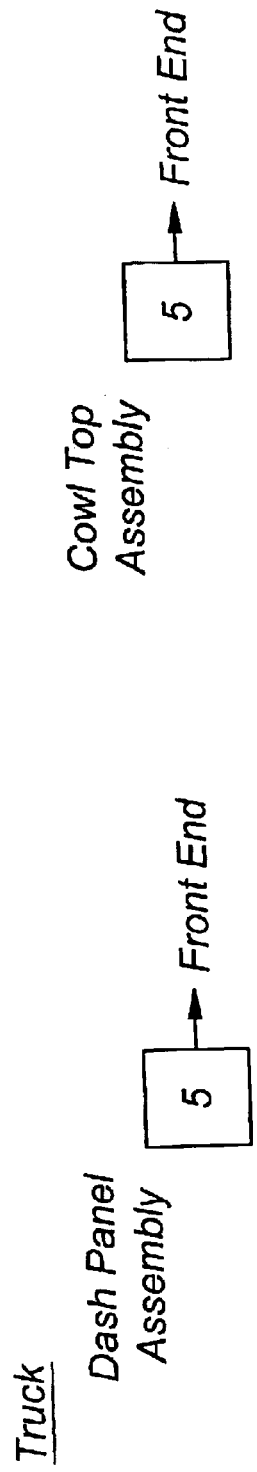

Truck
*Fig. 22* — Front Ladder Assembly → Ladder Mainline
*Fig. 24* — Rear Ladder Assembly → Ladder Mainline
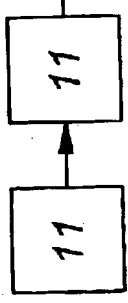
*Fig. 21* — Front End Assembly: 11 → 11 → To Ladder Mainline / Robot Pass
*Fig. 23* — Center Ladder Assembly → Ladder Mainline

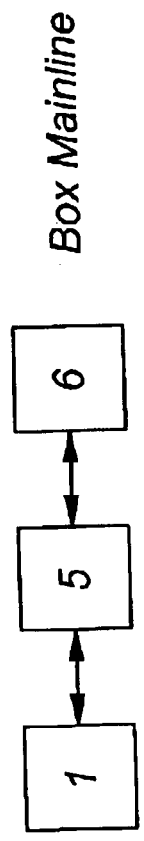

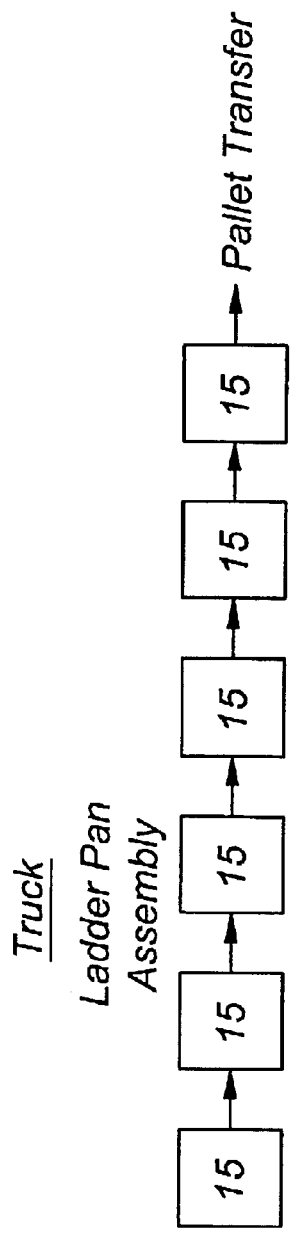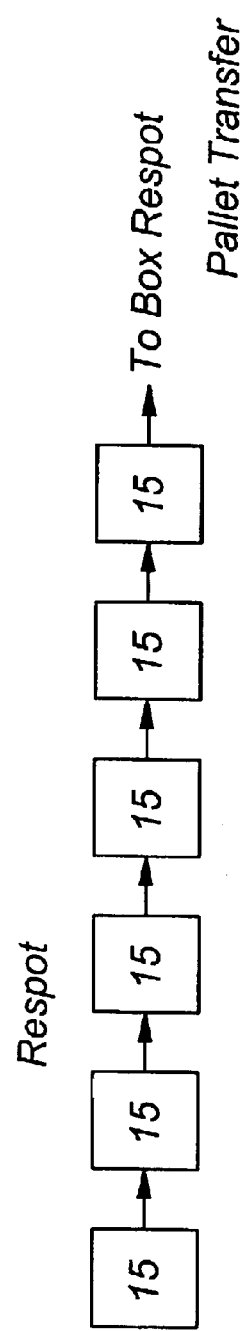

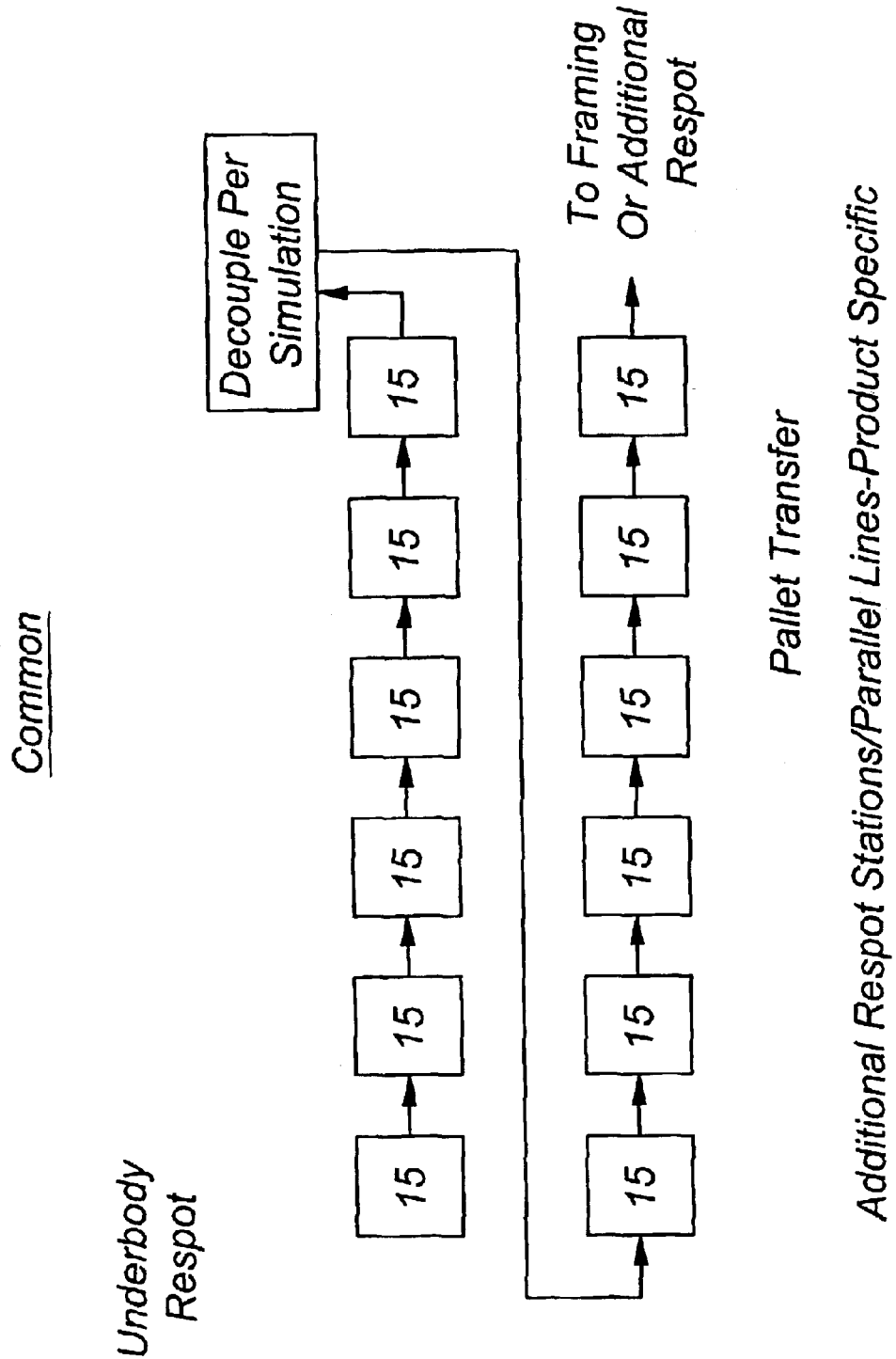

Common

T-Bone Assemblies

Inner Assemblies

Miscellaneous Underbody Sub-Assemblies

As Required by Product

Trough Assemblies

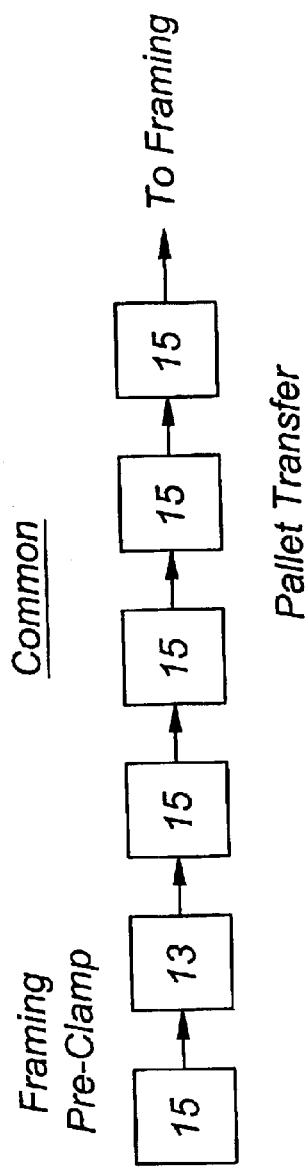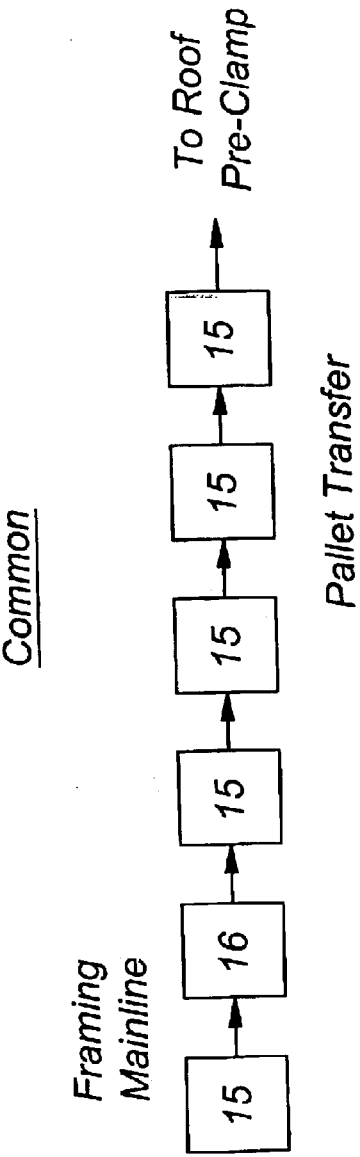

Laser Station

Pallet Transfer

8

Common

Pallet Vision Station

Pallet Transfer

12

Common

Miscellaneous Closure Sub-Assemblies

As Required by Product

1 ↔ 5 ↔ 6

Car

| Dash Panel Assembly Fig. 10 | Cowl Top Assembly Fig. 11 | Front Structure Assembly Fig. 12 |
|---|---|---|
| *Fig. 79* | *Fig. 80* | *Fig. 81* |

| Front Floor Assembly Fig. 13 | Rear Ladder Assembly Fig. 14 | Rear Floor Pan Skin Assembly Fig. 15 |
|---|---|---|
| *Fig. 82* | *Fig. 83* | *Fig. 84* |

| Rear Ladder/ Floor Pan Assembly Fig. 16 | Outer Assembly Fig. 17 | Piercing Station Fig. 18 |
|---|---|---|
| *Fig. 85* | *Fig. 86* | *Fig. 87* |

Truck

| Dash Panel Assembly Fig. 19 | Cowl Top Assembly Fig. 20 | Front End Assembly Fig. 21 |
|---|---|---|
| *Fig. 88* | *Fig. 89* | *Fig. 90* |

| Front Ladder Assembly Fig. 22 | Center Ladder Assembly Fig. 23 | Rear Ladder Assembly Fig. 24 |
|---|---|---|
| *Fig. 91* | *Fig. 92* | *Fig. 93* |

| Front/Center/ Rear Ladder Assembly Fig. 25 | Outer Assembly Fig. 26 | Tailgate Assembly Fig. 27 |
|---|---|---|
| *Fig. 94* | *Fig. 95* | *Fig. 96* |

_Truck_

| | | |
|---|---|---|
| Miscellaneous Box Sub-Assemblies Fig. 28 | D-Pillar Assembly Fig. 29 | Headboard Assembly Fig. 30 |
| *Fig. 97* | *Fig. 98* | *Fig. 99* |
| Inner Assembly Fig. 31 | Outer Assembly Fig. 32 | Ladder Pan Assembly Fig. 33 |
| *Fig. 100* | *Fig. 101* | *Fig. 102* |
| Respot Fig. 34 | Inner Headboard To Pan Assembly Fig. 35 | Box Mainline Fig. 36 |
| *Fig. 103* | *Fig. 104* | *Fig. 105* |

*Common*

| Miscellaneous Front End Sub-Assemblies Fig. 38 | Miscellaneous Underbody Sub-Assemblies Fig. 39 | Underbody Mainline Fig. 40 |
|---|---|---|
| *Fig. 107* | *Fig. 108* | *Fig. 109* |
| Underbody Respot Fig. 41 | Miscellaneous Underbody Sub-Assemblies Fig. 42 | Quarter Inner Assembly Fig. 43 |
| *Fig. 110* | *Fig. 111* | *Fig. 112* |
| T-Bone Assembly Fig. 44 | Trough Assembly Fig. 45 | Inner Assembly Fig. 46 |
| *Fig. 113* | *Fig. 114* | *Fig. 115* |

*Common*

| Bodysides Mainline Fig. 47 | Clinch & Vision Fig. 48 | Miscellaneous Framing Sub-Assemblies Fig. 49 |
|---|---|---|
| *Fig. 116* | *Fig. 117* | *Fig. 118* |

| Framing Pre-Clamp Fig. 50 | Framing Mainline Fig. 51 | Roof Pre-Clamp Mainline Fig. 52 |
|---|---|---|
| *Fig. 119* | *Fig. 120* | *Fig. 122* |

| Framing Roof Mainline Fig. 53 | Laser Station Fig. 54 | Framing Respot Fig. 57 |
|---|---|---|
| *Fig. 123* | *Fig. 124* | *Fig. 125* |

*Common*

| Pallet Vision Station Fig. 55 | Miscellaneous Closure Sub-Assemblies Fig. 56 | Front or Rear Door Assemblies Fig. 58 | Hood Assembly Fig. 59 | Deck Lid Assemblies Fig. 60 | Liftgate Assembly Fig. 61 | Fender Assembly Fig. 62 |
|---|---|---|---|---|---|---|
| *Fig. 126* | *Fig. 127* | *Fig. 128* | *Fig. 129* | *Fig. 130* | *Fig. 131* | *Fig. 132* |

Car cont.

*Truck cont.*

TOOLING PLATE FOR A FLEXIBLE MANUFACTURING SYSTEM

FIELD OF THE INVENTION

The field of the present invention is that of tooling plates utilized in manufacturing. The tooling plate of the present invention is particularly useful in automotive manufacturing.

BACKGROUND OF THE INVENTION

In the genesis of automotive manufacturing, vehicle bodies were carriages fabricated from wood and leather. Hence the term "horseless carriage" came to describe automobiles. Subsequently, vehicles were developed having a steel frame chassis which was connected with the drive train of the vehicle. A steel vehicle body was then mated with the chassis.

Initially, steel vehicle bodies were connected together primarily by rivets and threaded fasteners. Welding was not an option in many situations since the sheet metal was too thin to absorb the heat of most welding techniques. In the mid-$20^{th}$ century a welding technique was developed which could weld together relatively thin overlapping members of sheet metal, commonly referred to as spot welding.

In spot welding, a weld gun compresses a small portion of a joint of overlapping workpieces of sheet metal and applies pressure. Thereafter, an electric charge is delivered through the joint. The joint is heated until the metal of the joint is partially melted. The electric charge is stopped and the joint is allowed to cool wherein the metal of the two sheet metal workpieces is fused together.

The development of spot welding facilitated a tremendous advancement in vehicle body design. Now, structural components of the body could be fabricated from sheet metal which was folded into a desired tubular or other structural form, and then be welded together to form a structural beam. Therefore, the utilization of heavier plate members to provide the structural components of the vehicle body could be minimized.

Initially, most spot welding of vehicles was performed with equipment which could be either manipulated manually or via manual controls. In the early 1980s more and more equipment became available so that the spot welding function could be done robotically. Typically, the process lines that form a body are referred to collectively as a body shop and are part of an assembly plant. The body shop typically receives stamped workpieces from a stamping facility, which may be an on-site facility or a plant that is distantly located and serves several assembly facilities.

Typically, each vehicle line has its own body shop. When an automotive vehicle is updated for a major redesign, the body shop is typically scrapped and a new body shop is built from scratch within the assembly plant facility. The paint shop of an automotive vehicle assembly plant which receives the body, typically is utilized over and over again. However, the body shop is typically rebuilt and is therefore a tremendous consumer of tooling capital. This expenditure of tooling capital not only reduces profits, but also discourages model changeover. The lack of model changeover often causes a lack of consumer demand. Therefore, body shop capital costs generate a vicious cycle which can lead to very negative financial results for a vehicle manufacturer.

Another reason why the body shop consumes a large amount of capital is that the body shop has typically been customized to a given vehicle. Therefore, in most instances vehicles that are dissimilar in size and function cannot be made on a common body process line. Even vehicles which are the same, but are built in geographically separated assembly locations typically have different body process lines since the process lines are typically built to accommodate a specific assembly plant.

The lack of flexibility of body process lines not only leads to increased capital cost, but is also less efficient in the utilization of maintenance equipment and purchasing. Maintenance and the associated training cost of operational personnel is also increased. Attempts have been made to provide more flexible equipment, but most of these attempts have dwelt on variation in the path programming of robotic operations and the utilization of robots whose end effecters can be modified. This has generally not saved money and time.

It is desirable to provide a process line where the process line can accommodate a vehicle after a major redesign with a minimum capital cost.

It is desirable to provide a process line with greater flexibility so that a wider range of vehicle bodies can be processed on the same processing line.

It is desirable to provide flexibility in the processing line such that it may produce different vehicles, such that the vehicles can be made sequentially with each other and not require a major maintenance operation to change over the tooling.

It is desirable to provide a process line wherein engineering, maintenance, training and purchasing costs can be reduced.

SUMMARY OF THE INVENTION

According to one aspect of the present invention, a tooling plate assembly is provided. The tooling plate assembly includes a tooling plate and a workpiece presenter. The tooling plate is adapted to receive a workpiece for a vehicle subassembly. The tooling plate is removable from a workpiece presenter. The tooling plate may include a planar body for supporting fixture tools for holding a workpiece.

The present invention provides an advantage in that the tooling plate can readily be removed from a workpiece presenter, therefore providing more flexibility in a manufacturing arrangement.

Other advantages of the present invention will become more apparent to those skilled in the art as the invention is further revealed in the accompanying drawings and detailed description.

BRIEF DESCRIPTION OF THE DRAWINGS

FIGS. 1, 2 and 3 are perspective views of a trunnion used in the flexible manufacturing system of the present invention.

FIGS. 10–62 are templates of defined sets of task stations of the manufacturing system of the present invention.

FIGS. 79–87 list templates that are discrete to passenger cars.

FIGS. 88–106 list templates that are discrete to trucks.

FIGS. 107–120, and 122–132 list templates which are common to both cars and trucks.

DETAILED DESCRIPTION OF THE INVENTION

Figure 1:
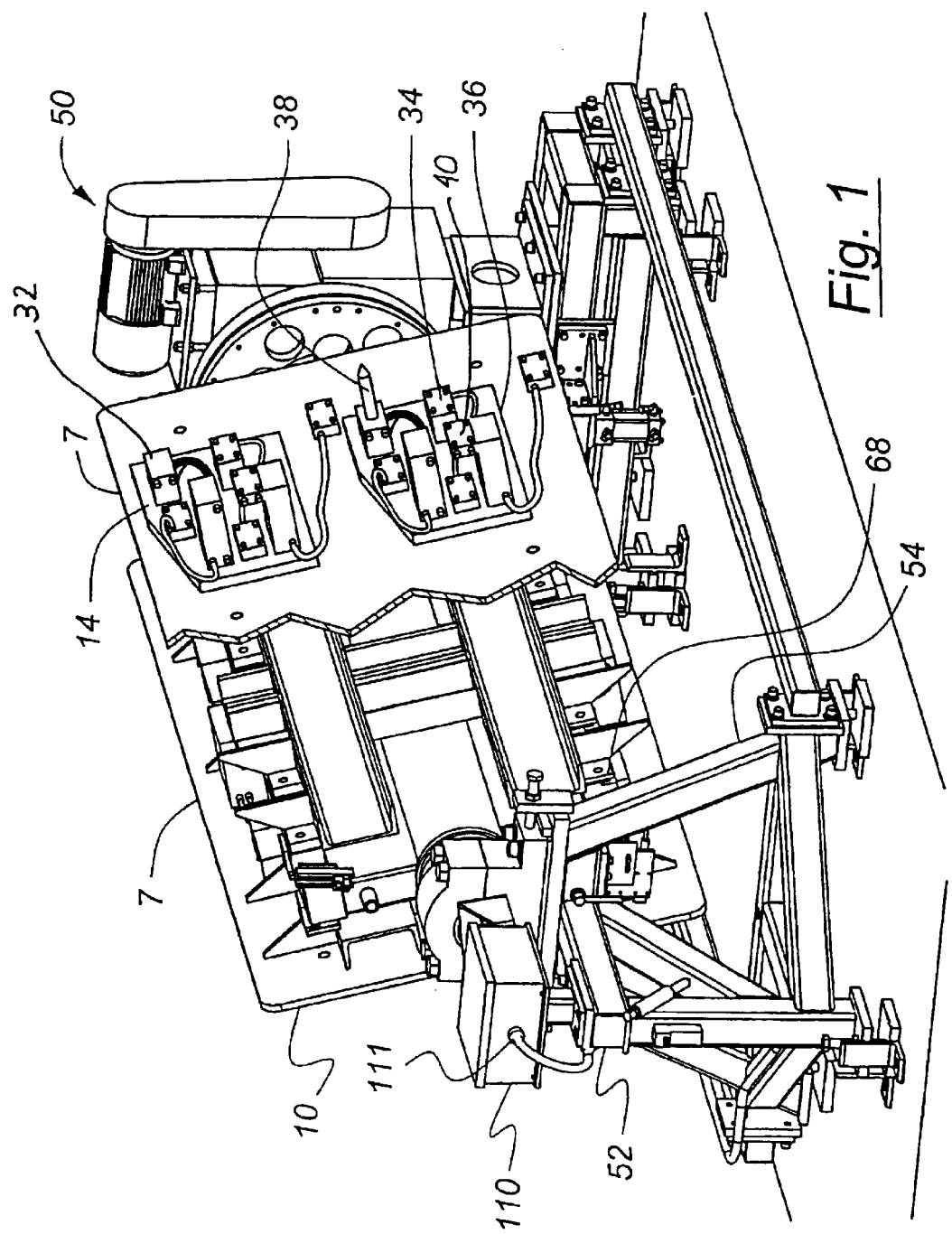

The flexible manufacturing system of the present invention is demonstrated in the environment of a weld process line for assembling a body of an automotive vehicle. Metal components of the body assembly for an automotive vehicle are first acted upon in a metal stamping facility. In some instances, the stamping facility will be located next to a vehicle assembly plant. However, most automotive manufacturers have fewer stamping facilities than assembly facilities. Therefore, often the stamped metal workpieces are shipped by rail or truck to an assembly plant.

Upon arrival at the assembly plant, the stamped workpieces are delivered to the body shop of the assembly facility. In the body shop, the body shell of the vehicle is assembly primarily on a weld processing line as will be further explained. After the body shell of the vehicle has been assembled in the weld processing line, the body is delivered to the paint shop of the assembly plant, wherein the body is painted. Often, a prime coat applied to the body shell is white; hence the term body-in-white is often utilized when referring to the body assembly.

After the prime coat has been applied the body is then color-coated and typically, multiple clear coats of paint are applied over the color coat. The painted body is later married with the chassis components and the powertrain which is inclusive of the engine, the transmission and final drive shafts. At this time, in a body-on-frame type vehicle, the body will be married to the frame. The vehicle is typically then delivered to the trim portion of the assembly plant wherein the interior components and the seating are added to the vehicle.

An example of the flexible manufacturing method of the present invention includes engineering to provide an automotive vehicle body wherein components are primarily joined together by welding processes. The process line produces an automotive vehicle from a plurality of subassemblies which are generated from various combinations of workpieces. The process line is provided by a plurality of standardized task stations. To enjoy the greatest benefit from the present invention, the number of different task stations is limited.

At least one of the task stations in a given process line has a workpiece presenter. The workpiece presenter has a platform which in some instances, can move. Connected to the platform in a repeatable manner and precision located thereon, is a tooling plate. To produce a given subassembly of a vehicle body a determination is made to define a set of task stations, which is referred to as a template. A combination of at least two or more templates is aligned in a predetermined manner to form a process line which fabricates the body assembly.

Referring to FIGS. 1–7, a preferred embodiment tooling plate 7 (sometimes called a tooling tray) is provided. The tooling plate 7 is utilized to fixture a workpiece (not shown) of an automobile vehicle body weldment subassembly (not shown). The tooling plate 7 includes a planar body 10. The planar body as shown is typically provided by 1800 mm by 2400 mm, 25 mm thick plate.

In an automotive vehicle body weldment process line according to the present invention, tooling plates may be provided having planar bodies and 4–6 standardized designs. Tooling plate 7, as best shown in FIG. 1A, has a series of positionally predetermined holes 11 formed therein by drilling and tapping. The holes 11 receive threaded fasteners extending therethrough (not shown) that connect the base plates of various fixture tools to the tooling plate 7.

Figure 1A:
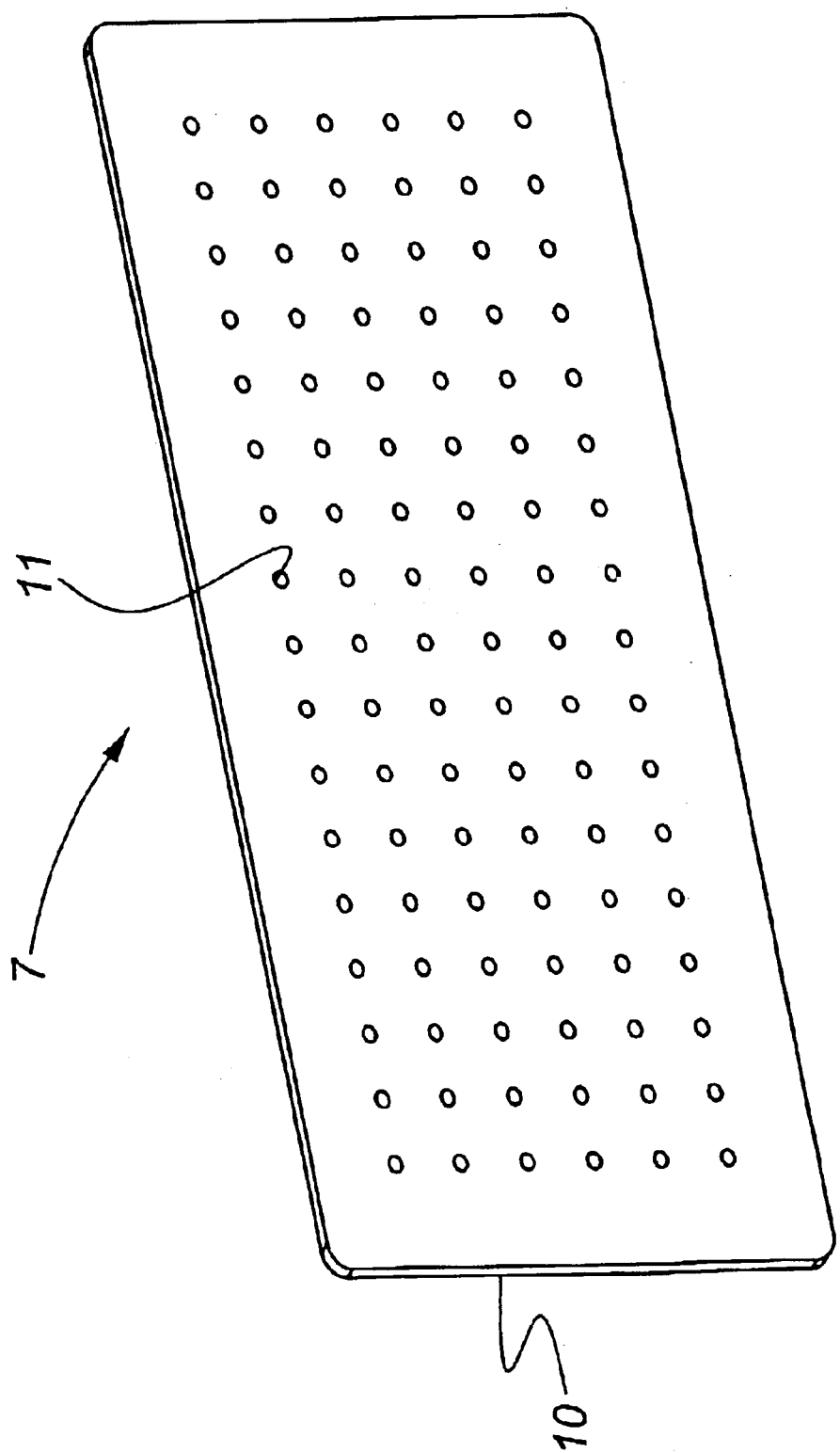
FIGS. 1A and 4 are perspective views of the tooling plate utilized with the trunnion shown in FIG. 1.
Figure 4:
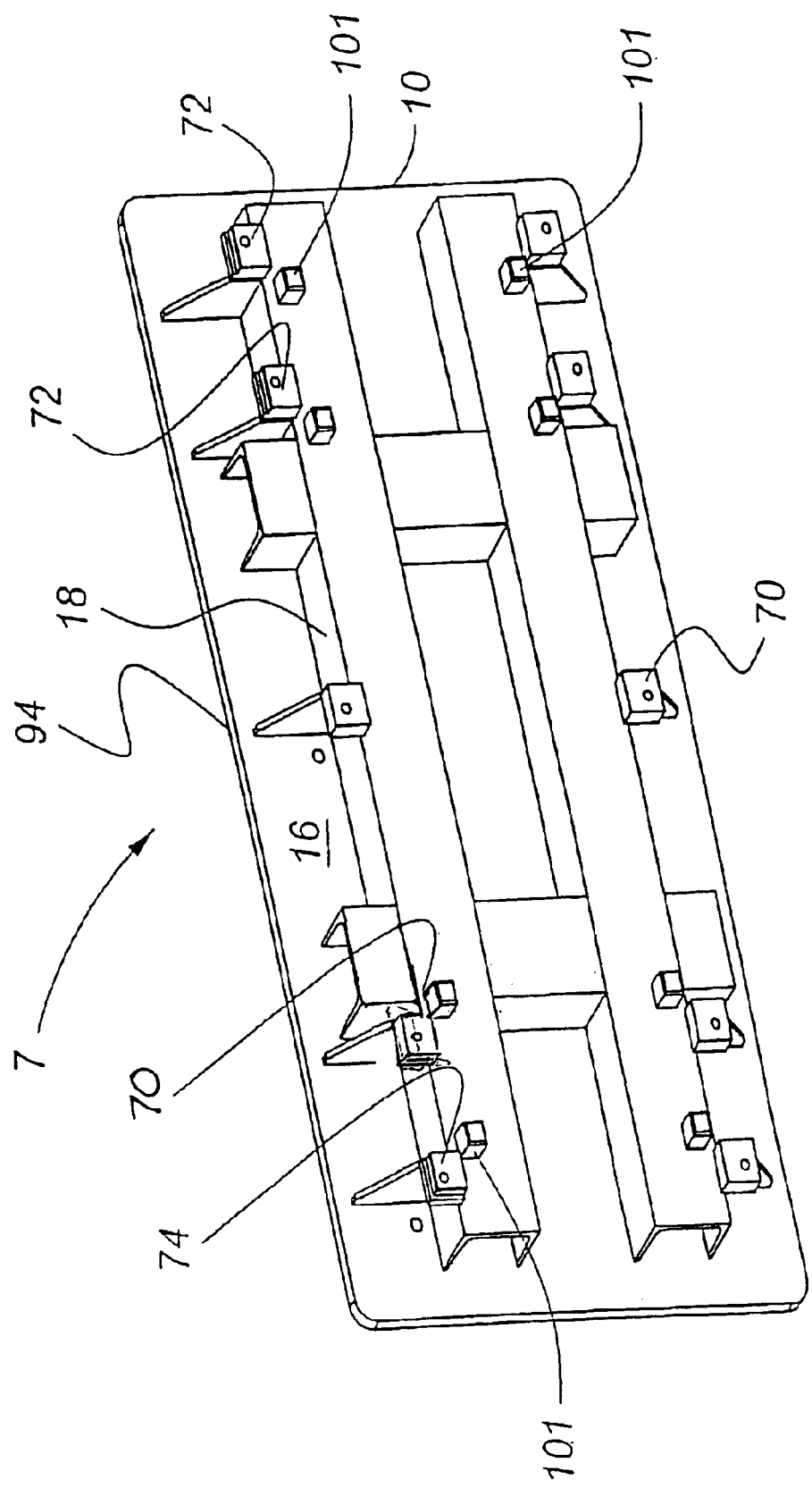

Referring to FIGS. 1 and 4, a back surface 16 of the tooling plate 7 has two longitudinal weldably attached stiffening channels 18. The tooling plate 7 supports various fixture tools 34 via base plates 14, 36. The fixture tools are typically a combination of locating fixtures, such as locating pin 38, along with a pneumatically actuated clamp 40. Various weldment workpieces can be loaded to the fixture manually or, as in most cases, robotically by a robot (not shown). Appropriate control logic will be utilized synchronize the loading robot with the various clamps 40 which are provided.

The tooling plate 7 will typically mount the appropriate pneumatic or electric actuators required along with any pneumatic control devices required. The fixture tooling may provide a geopositioning function wherein the tooling positions two separate workpieces for welding by a welding robot (not shown). In other configurations, the fixture tooling will hold just one workpiece for welding or other various metal working operations. These operations can additionally be spot welding, burr removing or weld finishing operations. In still other operations, fixture tooling will position a workpiece or a subassembly for sealant or adhesive application operations.

Figure 3:
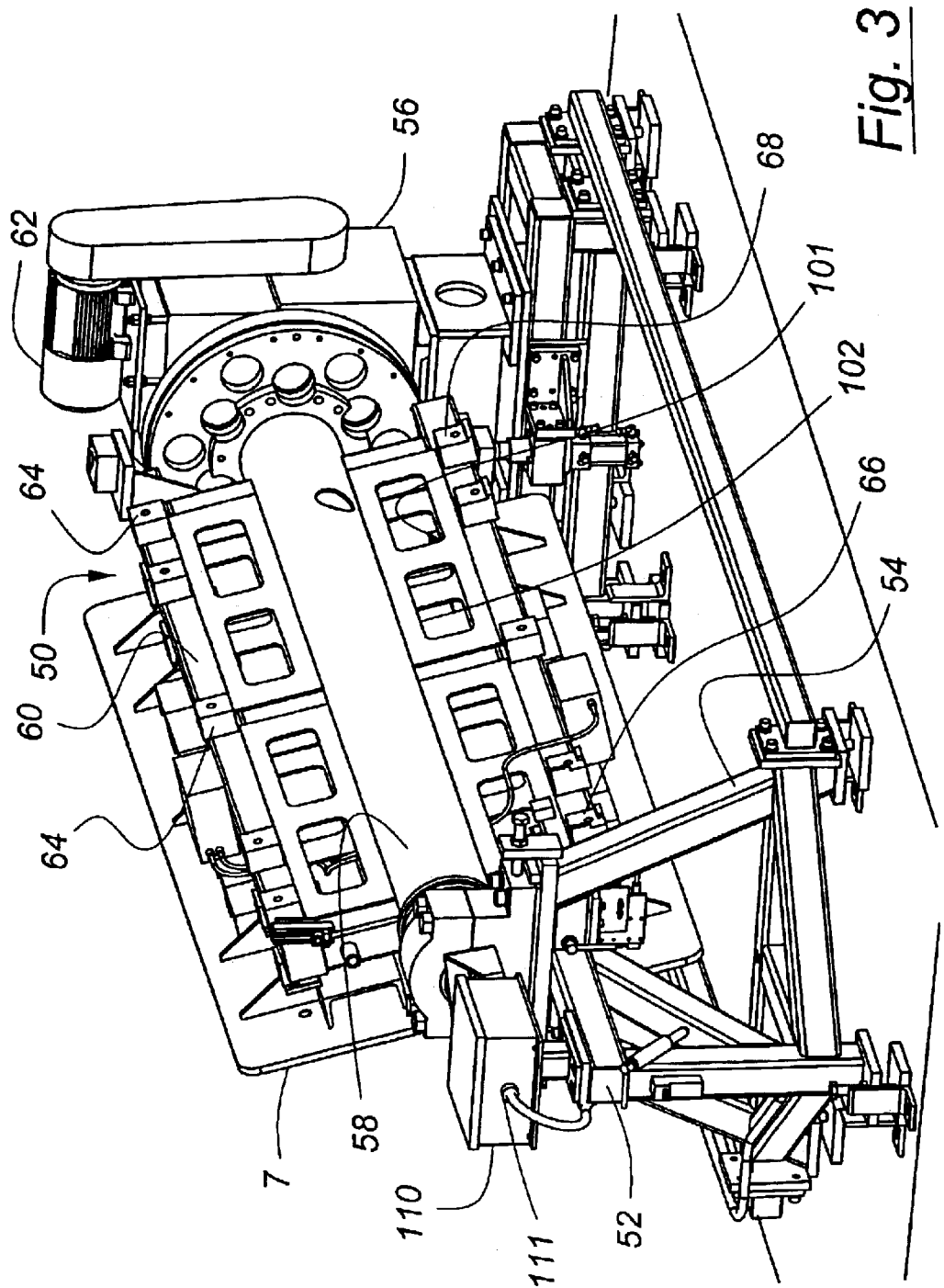

Referring to FIGS. 2 and 3, a trunnion 50 is provided. The trunnion provides a platform for two tooling plates 7. The trunnion 50 includes a stand 52 which includes A-frame legs 54. An opposite end of trunnion 50 has a motor stand 56. Rotatably mounted to the stands 52, 56 is a drum 58. The drum 58 has rigidly connected thereto a supporting frame 60. The drum 58 can be rotated about a horizontal axis with via a drive train driven by a motor 62. Positioned on frame 60 is a locater mechanism which includes three axis abutment locater heel blocks 64, 66, 68.

Referring back to FIGS. 4, 6 and 7, tooling plate 7 has a three axis abutment system including heel block plates (sometimes referred to as plates) 70, 72, 74. All of the heel block plates have a hole 76 that allows for receipt of a shank of a fastener 78. The heel block 66 has a longitudinal locating axis block portion 80. The heel block plate 72 has a longitudinal groove formed by recess step 82. Step 82 is configured to be operatively associated with the locating block portion 80.

The heel block 68 has perpendicularly extending block portions 84, 86. Heel block plate 74 has recessed steps 88,

90. Recessed steps 88, 90 are provided to make abutting contact with respective block portions 84, 86.

The heel blocks and heel block plates provided on the frame 60 and on the tooling plate 7 provide a locater mechanism to allow the tooling plate 7 to be positioned in a precise, repeatable manner. The edge 94 of the tooling plate is aligned with a lower edge 100 of the frame. The steps 82 of the heel block plate 72 are aligned with the block portions 80 of the heel blocks 66. Additionally, the recessed steps 88 are aligned with the block portions 84. At this point, alignment is achieved in the horizontal axis. The tooling plate is then slid to the left causing the recessed step 90 to be abutted against the block portion 86. Alignment is then achieved in the transverse axis of the tooling plate 7.

Threaded fasteners 78 may extend through corresponding holes 76 in the heel blocks to connect the tooling plate 7 with the frame 60. The thicknesses of the heel plates, when the threaded fasteners are torqued, sets the position of the tooling plate 7 in the Z-axis (a direction generally perpendicular with the surface of the planar body 10 of the tooling plate). In one embodiment, the tooling plate 7 has eight standoffs 101. The standoffs 101 (FIG. 4) extend outwardly further than the locater heel blocks. The standoffs 101 prevent the locater heel blocks from coming in contact with any flat surface, such as the factory floor, which the tooling plate 7 may be placed upon when the tooling plate is removed from the platform (frame 60). When the tooling plate is attached to the frame 60, the standoff 101 will project through an aperture 102 provided in the trunnion frame 60.

As shown in FIG. 1, trunnion 50 can have two identical tooling plates 7. Often, one tooling plate will be utilized for loading a workpiece or workpieces to the tooling plate, while a robot is performing an operation on the workpiece or workpieces on the other tooling plate. In other applications, the two tooling plates can have fixture tools for workpieces which differ from one another. On one trunnion side, the fixture tools may fixture two workpieces for a passenger car. On the other trunnion side the workpieces may be for a truck.

Figure 141:
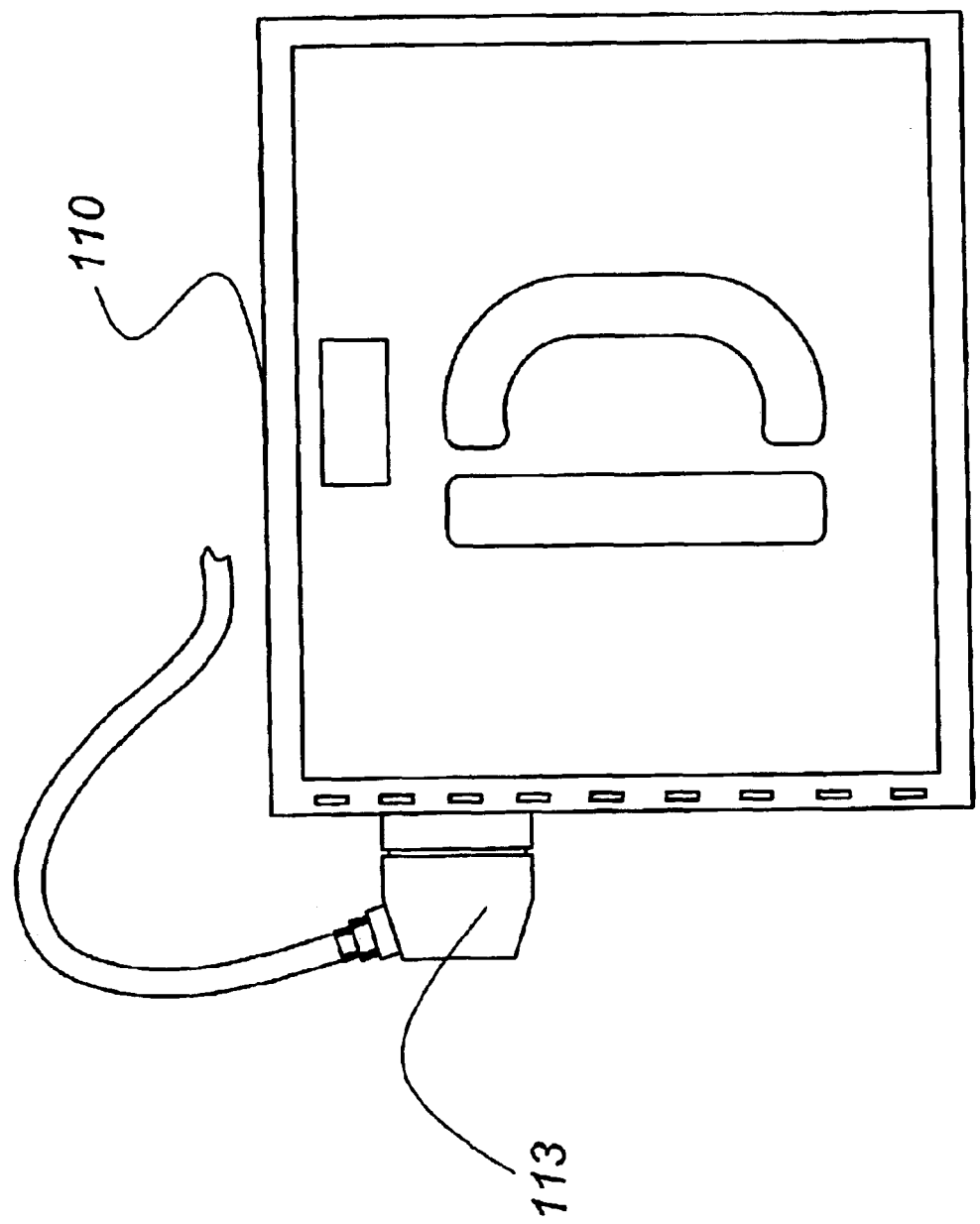
FIG. 141 is an enlargement of a portion of FIG. 1.

A quick disconnection 111 for a line supplying air for the pneumatic actuators is made via a connector box 110 provided on the trunnion 50. An enlargement of a multiple electrical quick connector 113 is shown in FIG. 141.

Figure 5:
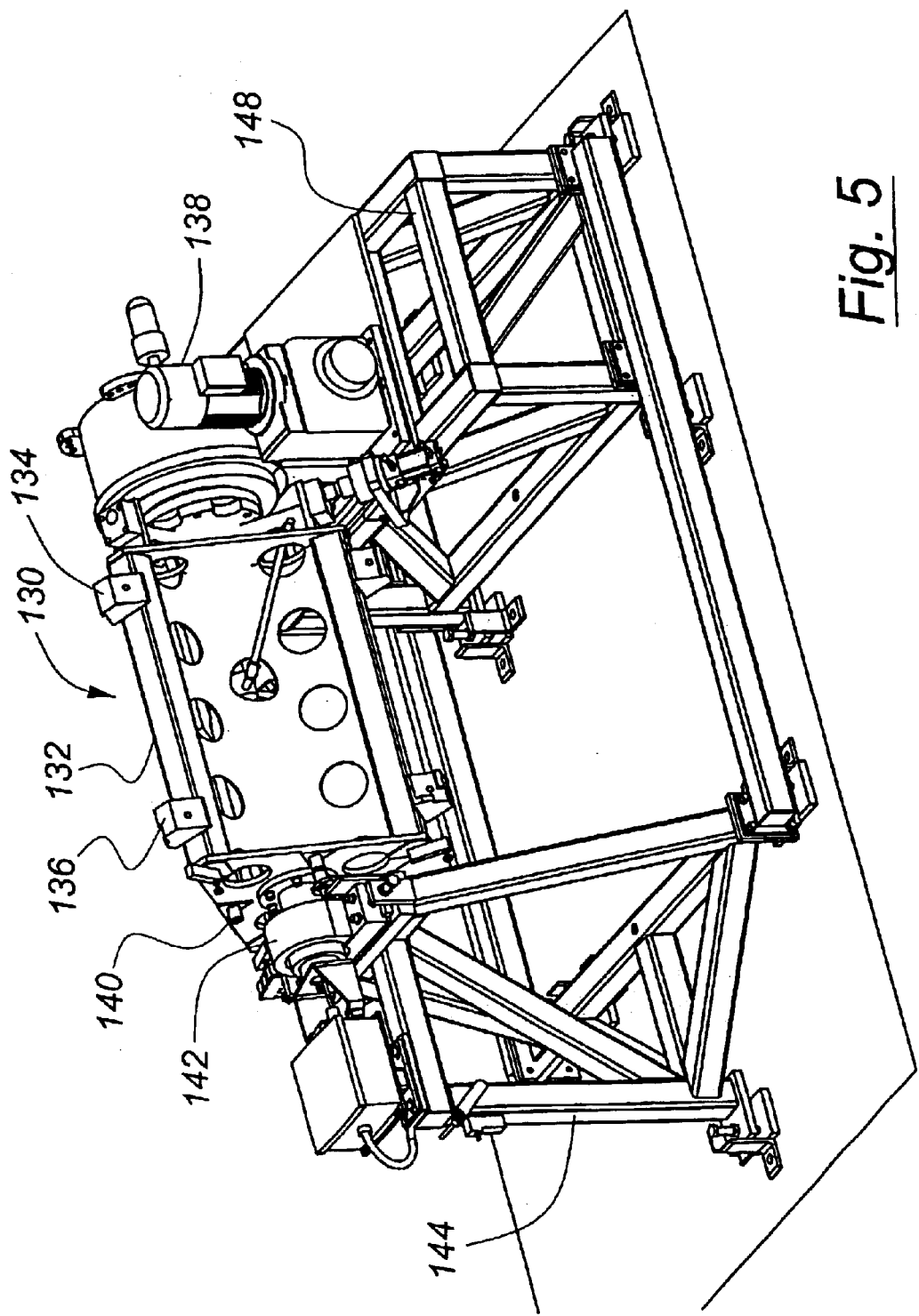
FIG. 5 is a perspective view of a three sided trunnion.
Figure 7:
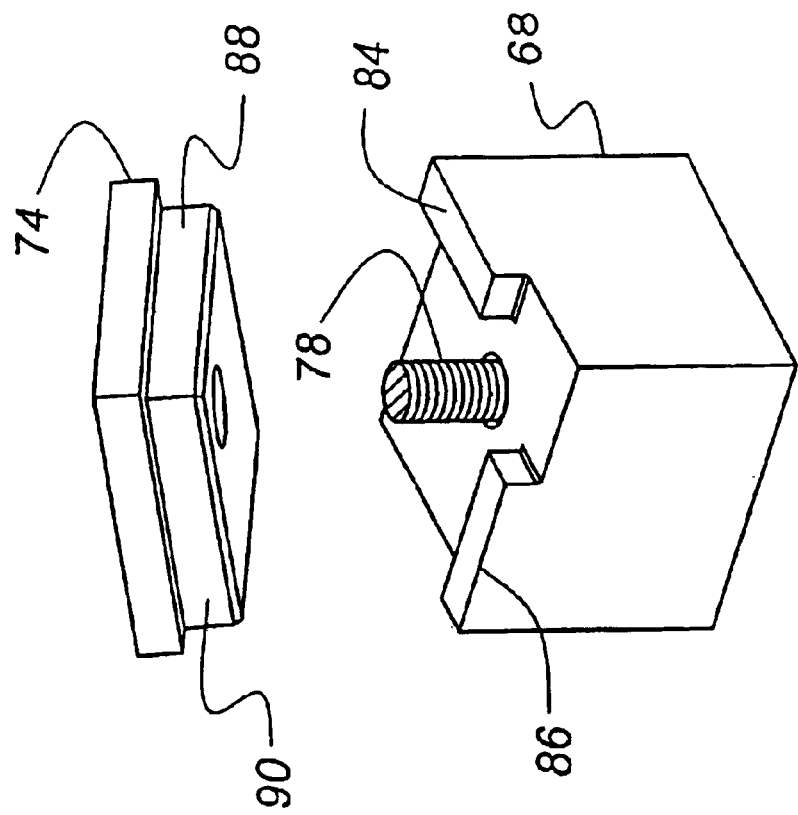
FIGS. 6 and 7 are perspective views of the locater heel blocks utilized in the aforementioned tooling plates and trunnions.
Figure 6:
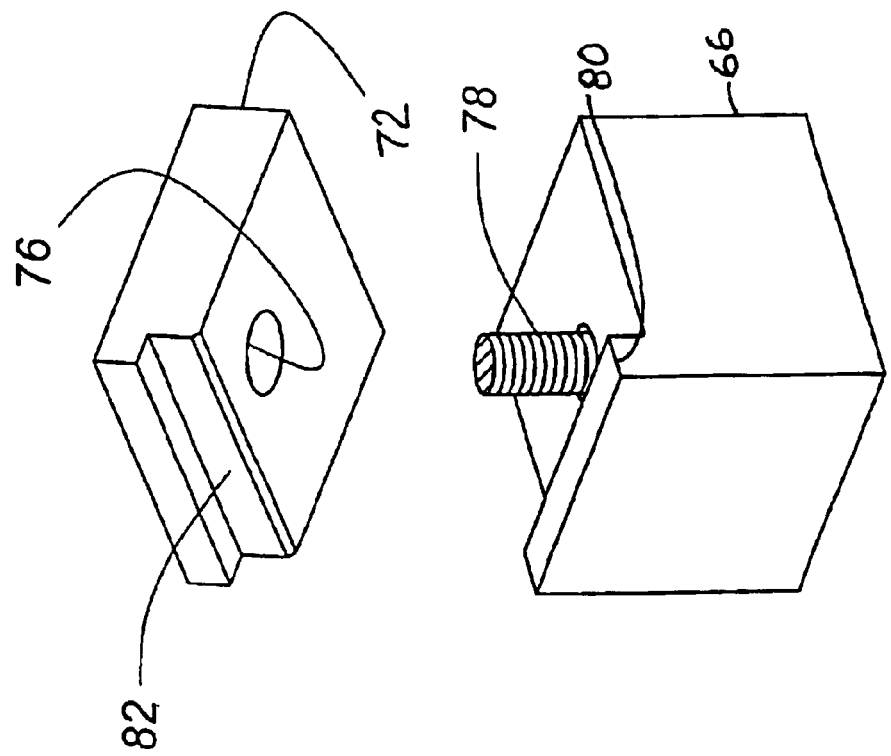

Referring in particular to FIG. 5, a three sided trunnion 130 is provided. The trunnion 130 is very similar to that aforedescribed in FIGS. 1–3, with the exception that it can hold three tooling plates (not shown). Typically, the tooling plates utilized in trunnion 130 will be smaller members than the tooling plates shown in FIG. 4. However, the same locating and connective principles will apply. Such a trunnion will typically be utilized for smaller subassemblies or operations associated with manual machines.

The trunnion 130 has a frame 132 which is provided with heel blocks 134, 136. A motor is provided through appropriate gearing to turn a horizontally mounted shaft 140 which is journaled at one end by a bearing 142 supported on a stand 144. An opposite side stand 148 supports an opposite end of the shaft 140.

Figure 8:
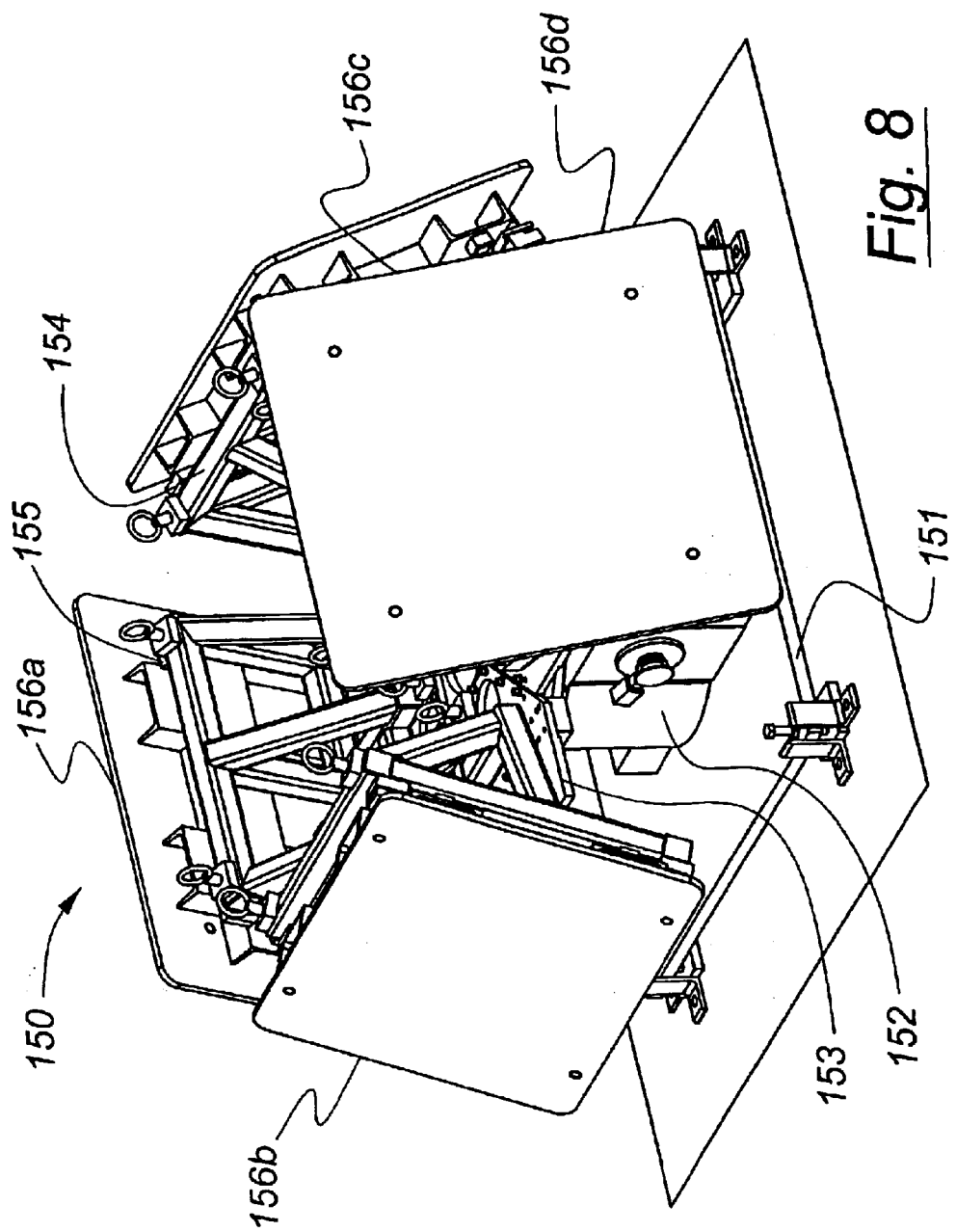
FIG. 8 is a perspective view of a turntable.

Referring to FIG. 8, a turntable 150 is provided. The turntable 150 has a base plate 151. Supported on the base plate 151 is a rotary base 152. A motor (not shown) turns a rotary table 153 about a vertical rotational axis. The rotary table 153 is rigidly connected to four geometrically spaced frames 154. Frames 154 have a series of heel blocks 155 similar to those previously explained, to provide a three axis abutment locater system. Precision located in a repeatable manner by the heel blocks 155 on each frame 154, are tooling plates 156A, 156B, 156C and 156D

Turntable 150 in some instances will have fixture tooling which may be exclusively dedicated to a given subassembly formed by two or more workpieces. In an alternative arrangement, the turntable will provide multiple tooling plates for a first subassembly that may be materially different than that of a second subassembly. The difference can be that of between passenger cars and trucks and sports utility vehicles, front-wheel drive and rear-wheel drive vehicles, or vehicles having a body that is married to a chassis having its frame, or unibody type vehicles wherein a portion of the vehicle is formed to provide for its frame portion. In such situations, the turntable 150 will be programmed to present the intended workpiece to an operational tool (such as a robot spot welder or a robot sealant or adhesive applicator) in selective, non sequential manner.

A flexible manufacturing system according to the present invention preferably utilizes sixteen standardized flexible shop task stations.

Figure 64:
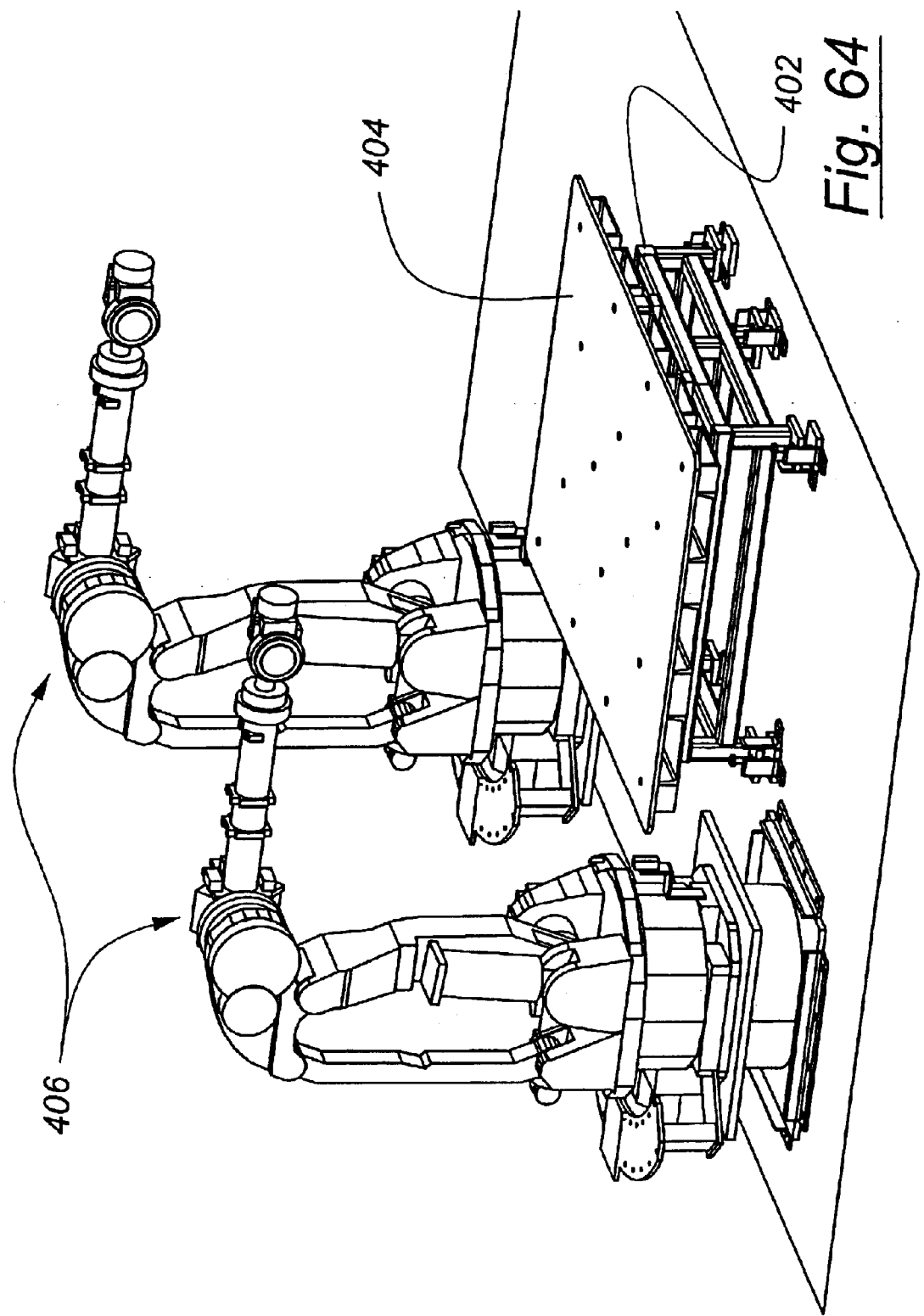
Figure 65:
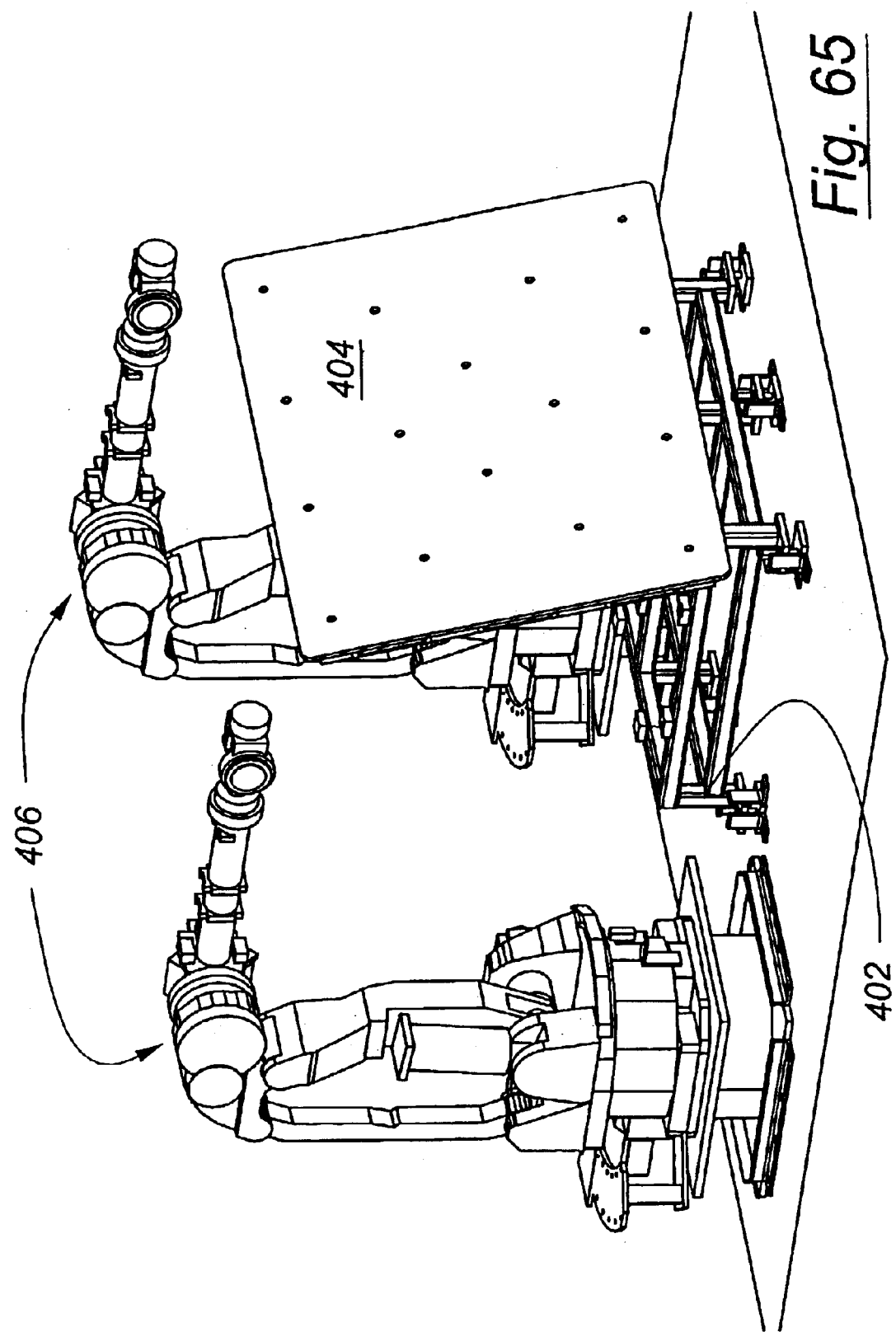
Figure 67:
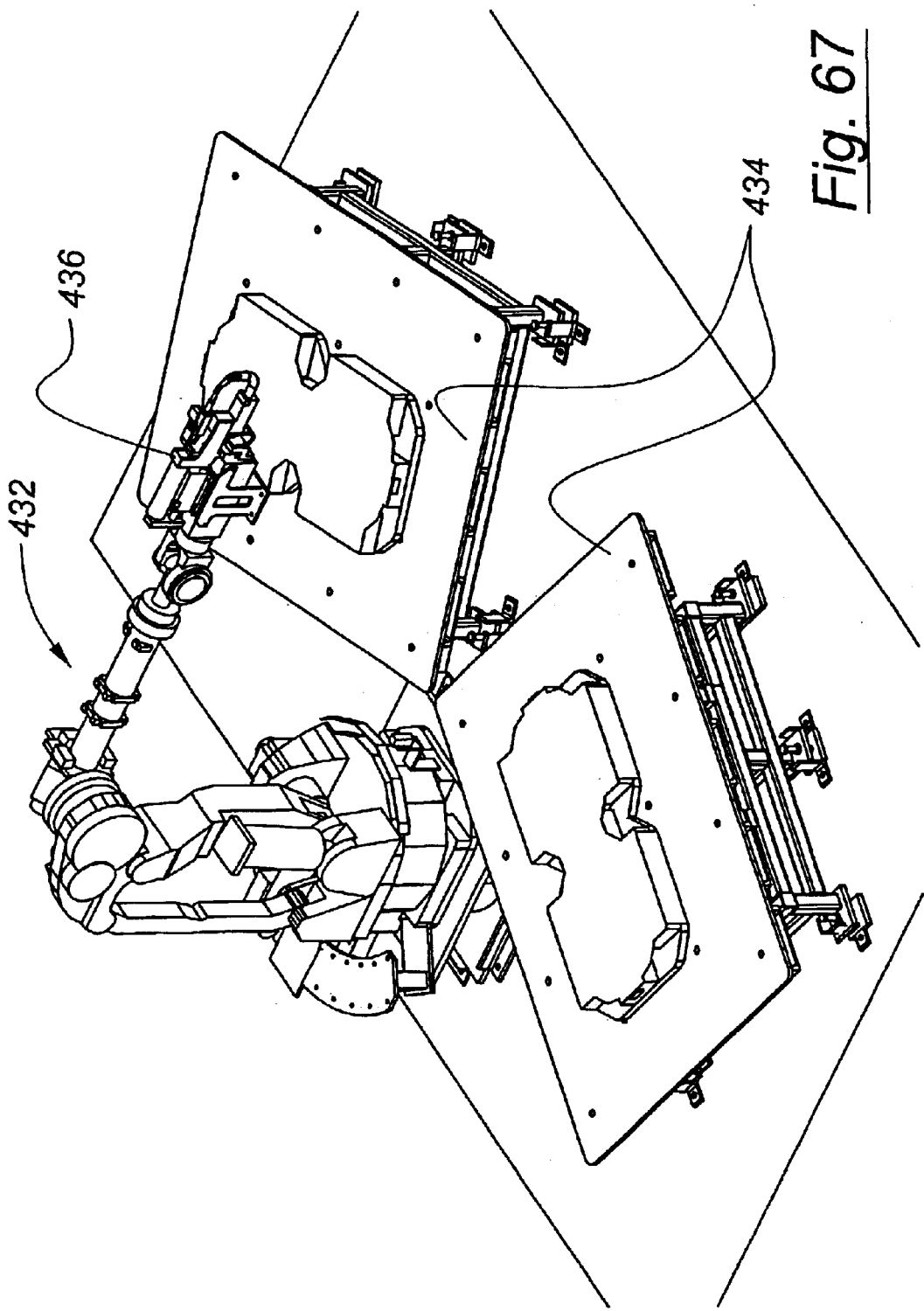

Task station 1 (FIG. 64) is a tabletop fixture, having tilt platform 402 for mounting tooling plate 404, and at least one robot 406. Tilt platform 402 accommodates tooling plate 404 by tilting from the horizontal to a convenient easel-like angle as shown in FIG. 65. The tilting feature allows an operator, whether human or otherwise, to reach fixtures (not shown) mounted upon tooling plate 404 so as to mount a workpiece when tilt platform 402 and tooling place 404 are in the tilted position, with tooling plate 404 and platform 402 being returned to the horizontal position for welding or sealer application, or other operations performed by one or more robots 406. If welding is desired, robots 406 may be equipped with a weld gun 436, as shown in FIG. 67. The fixture shown in FIGS. 64 and 65 may preferably accommodate tooling plates ranging in size from about 900×1200 mm to about 1800×2400 mm.

The welder robot 406 employed in task station 1 (FIGS. 64 and 65) may be a completely robotic welder or otherwise. Other units which may be used with task station 1 include robotic material handling devices utilizing a custom design gripper to remove a part assembly from a fixture mounted upon tooling plate 404, or a combined robotic material handler and welder combination. As another option, the work envelopes of robots 406 may be increased by using a 7th-axis slide.

Figure 63:
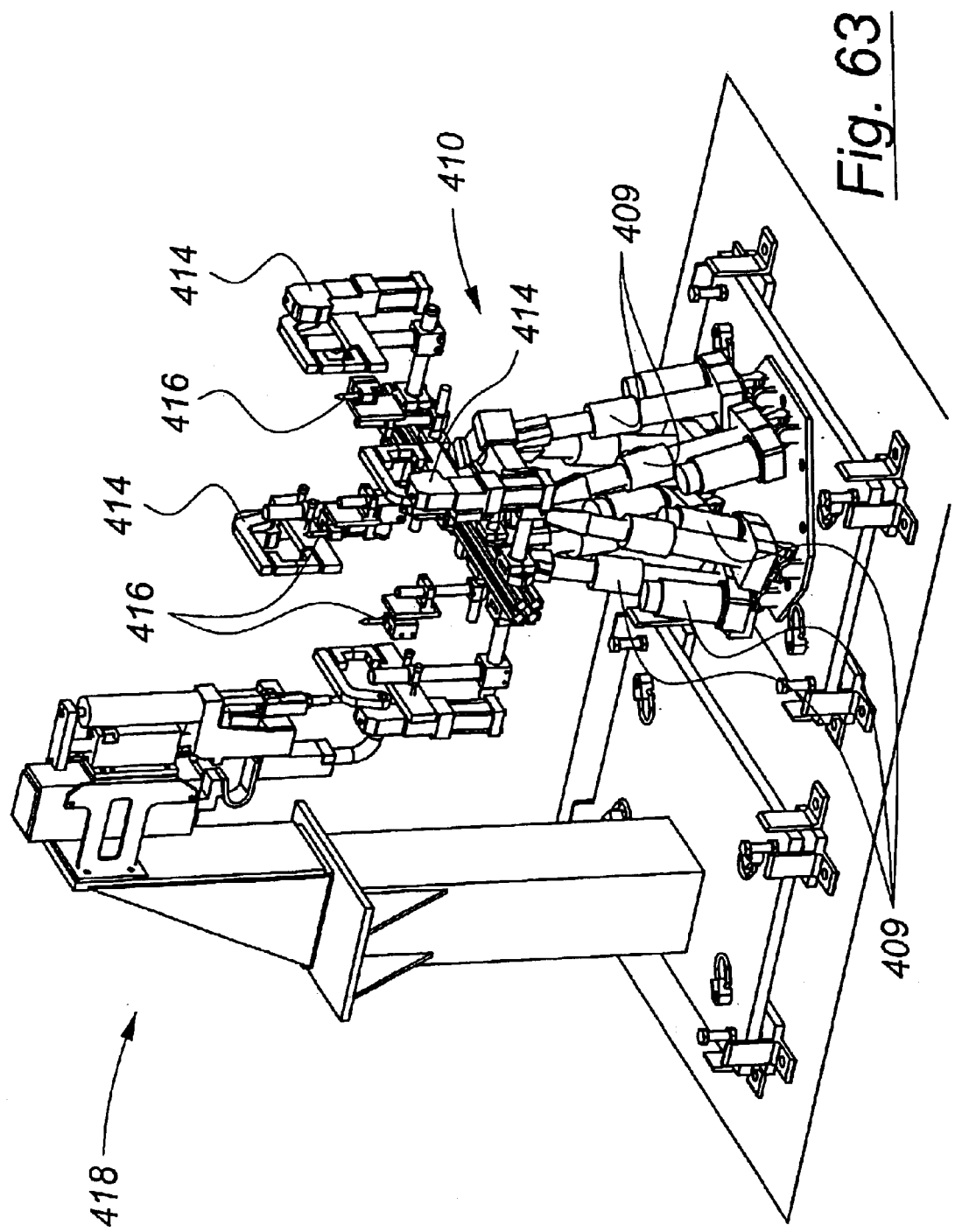
FIGS. 63–78 illustrate various task stations of the manufacturing system of the present invention.

Task station 2 (FIG. 63) is a hexapod manipulator task station. As used herein, the term "hexapod manipulator" means a compact robot having six electrically driven, computer operated ball screws, 409, which hold and position a workpiece. Here, hexapod manipulator 410 uses clamps 414 and pins 416 to precisely hold a workpiece for welding by means of pedestal welding machine 418. Unlike welders attached as an end effector to a movable robot, pedestal welder 418 does not move; rather the workpiece must be brought to welder 418. Pedestal welder 418 may be supplemented or even supplanted by a projection weld gun unit (not shown) which includes a transformer, cables and weld controller, with hexapod 410 manipulating the workpiece into the weld gun of pedestal welder. As yet other alternatives for task station 2, a sealer dispensing unit (not shown) may be used to place sealer on certain surfaces of a workpiece while the workpiece is positioned by hexapod manipulator 410. Finally, a nut feeder with a hopper and a feeder tube (not shown) may be used to supply nuts which can be welded or mechanically fastened in place upon the work piece.

Figure 66:
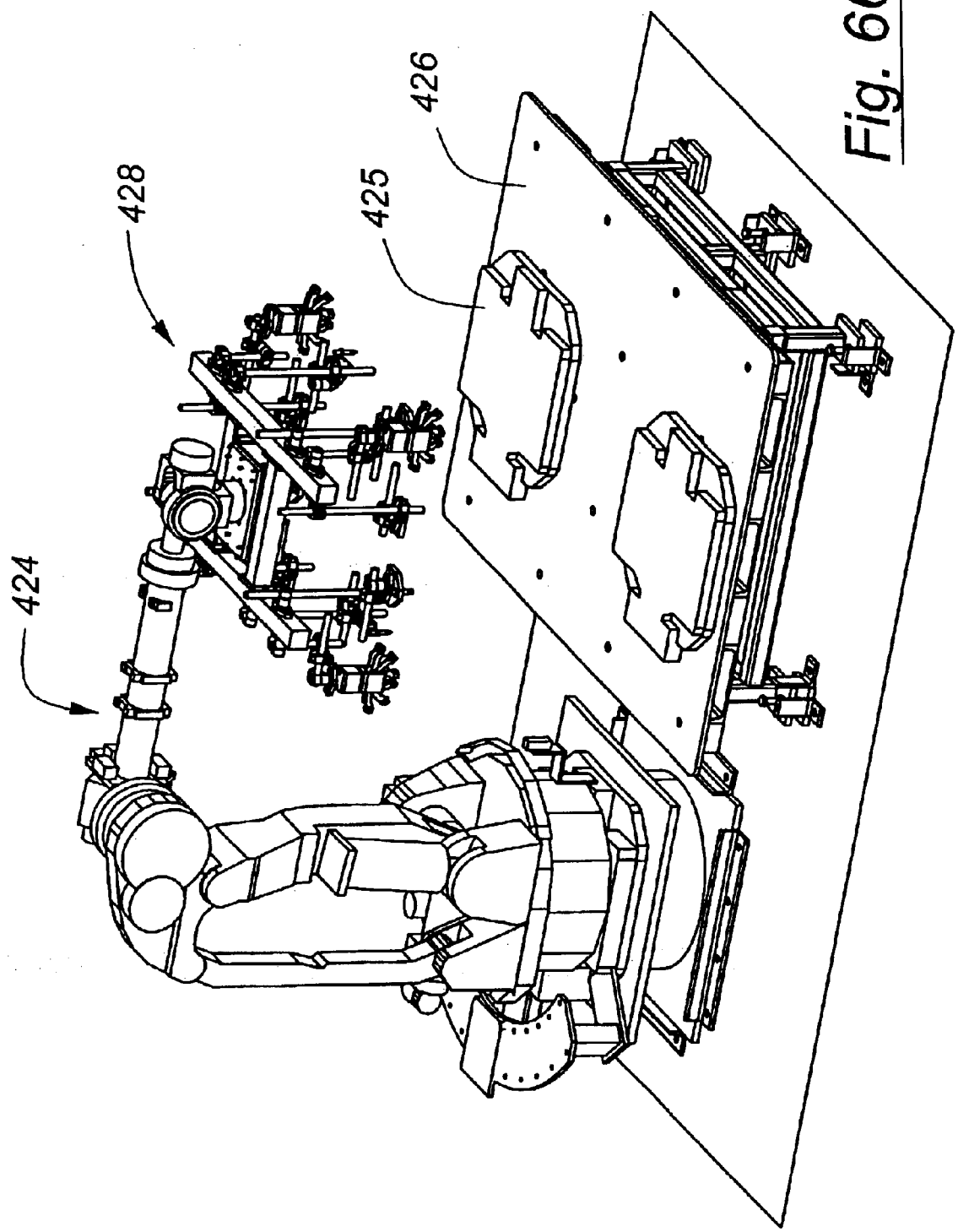

Task station 3 (FIG. 66) is a pedestal welding task station having robot 424 for positioning a workpiece. When task station 3 is employed, an operator, human or otherwise, will position the workpiece parts within fixtures 425 attached to tooling plate 426, which is mounted at bench height. Then, end effector 428, which is a gripper, and robot 424 will pick up the parts from tooling plate 426 and move them either to a pedestal welder of the type shown in FIG. 63 for task station 2, or a projection welder or a sealer dispenser (not shown).

Task station 4 (FIG. 67) is a dual station having a seventh-axis slide to increase the work envelope of robot 432. As shown, task station 4 may have dual tooling plates 434 and may utilize either a shared robot 432, or multiple robots. A variety of tooling plates may be used, with several different sizes extending from approximately 900×1200 mm to the largest at about 1800×2400 mm. Welding gun 436 handles the task of supplying the localized current and electrodes needed for a spot or fusion welding operation.

As described above, robotic welding units or material handler robots or material and welder combination robots may be employed with this task station. Also, the tooling plate orientation may be zero° or flat, 30° angled or 70° angled. An important point here is that interchangeable tooling plates or plates allow repeatable and precise positioning of parts.

Figure 68:
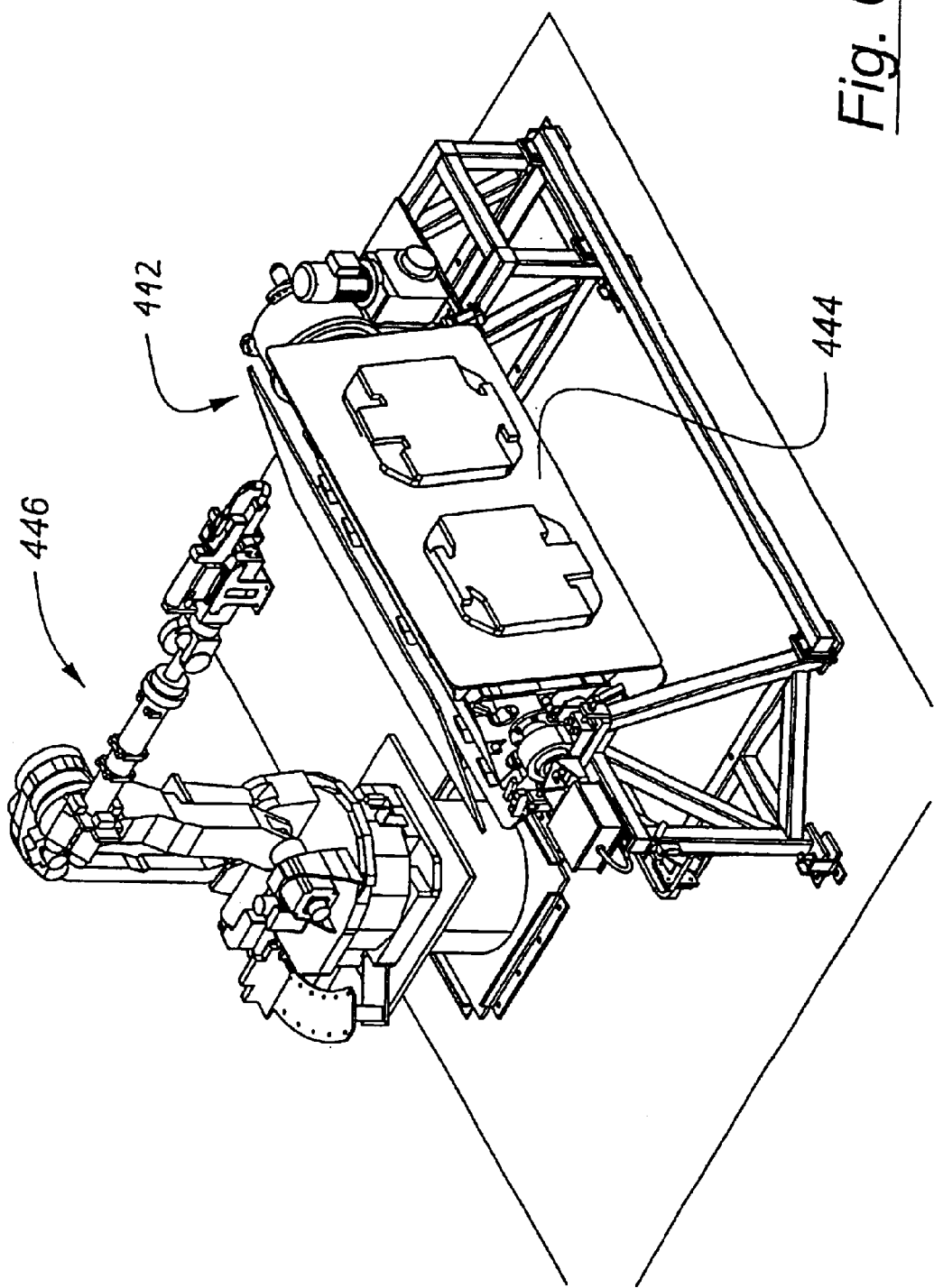

Task station 5 (FIGS. 5 and 68) includes a three-sided trunnion fixture 442, which may be equipped with three tooling plates 444 (FIG. 68) and which rotates about a horizontal axis so as to present workpieces to welding robot 446. FIG. 5 illustrates a similar trunnion fixture 130 with the tooling plates removed, and without robot 446.

FIGS. 1–3 illustrate the aforementioned two-sided trunnion 50, which is a second larger version of task station 5, and which too rotates about a horizontal axis, and which accepts a standard tooling plate 7, albeit of a larger size than the tooling plates employed with the three-sided trunnion fixture 130. Two-sided trunnion 50 also functions as a workpiece presenter, preferably for a welding or sealing operation.

As shown in FIG. 1, tooling plate 7 has a plurality of tooling fixtures 34 mounted thereon. Tooling fixtures 34 include a plurality of locating pins 38. This tooling plate setup has quick disconnect 111 for pneumatic service (not shown).

Task station 6 (FIG. 69) is a four-sided turntable fixture 460 having four positions and which mounts four standard tooling plates 450. Turntable 460 would be expected to be constructed in approximately three different capacity ranges from 6500 lbs. total capacity to 20,500 lbs. total capacity. This largest turntable could accommodate tooling plates up to 1800×2400 mm.

Figure 69:
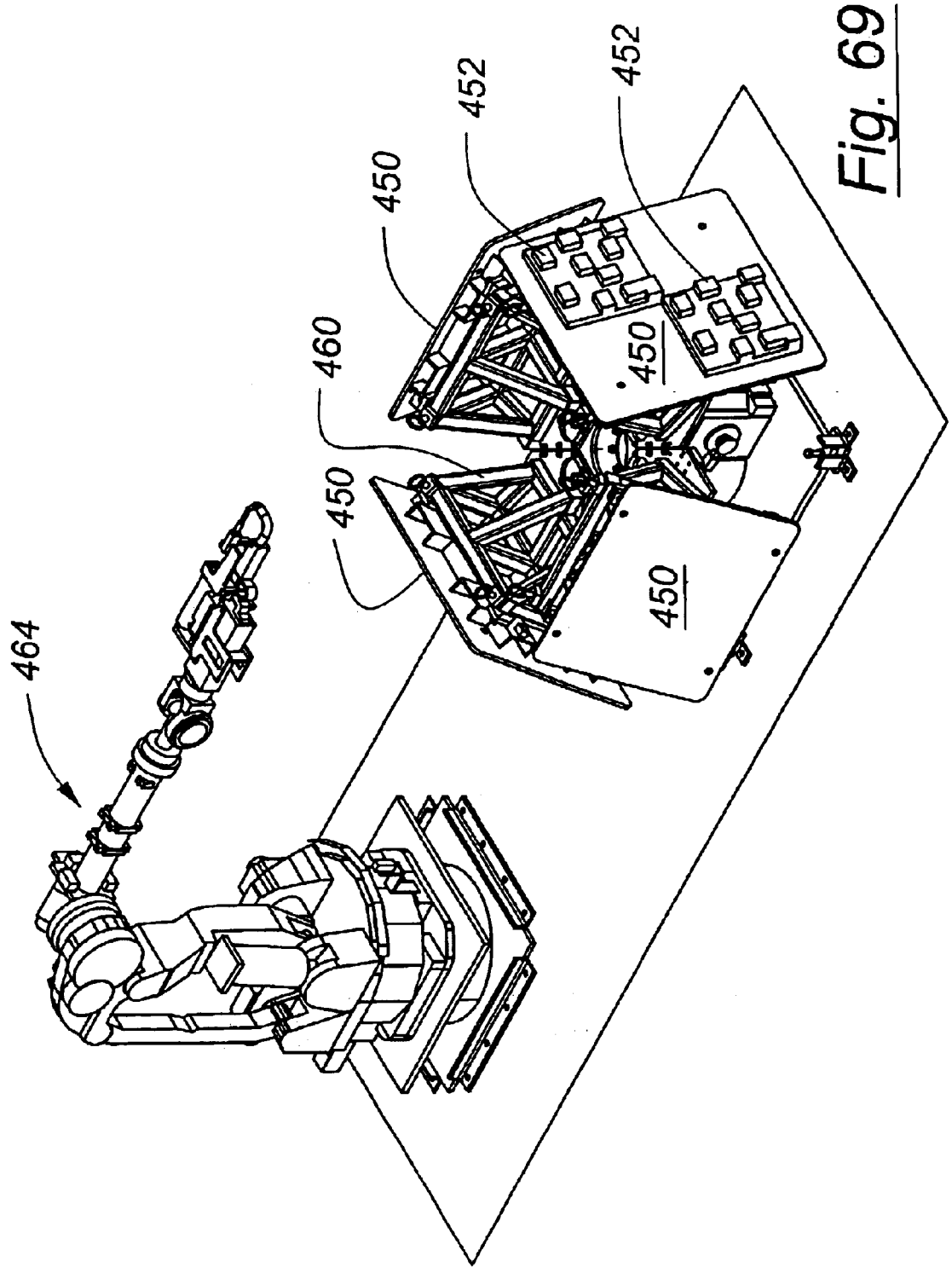

As shown in FIG. 69, robotic welding could be accomplished by at least one welding robot 464. Although multiple tooling fixture modules 452 are shown as being attached to tooling plates 450, those skilled in the art will appreciate in view of this disclosure that other types of tooling arrangements could be selected. Robotic material handling is another option as is a combination material handler and welder (not shown). Finally, a seventh-axis slide (not shown) may be used to increase the welding robot's work envelope.

Figure 70:
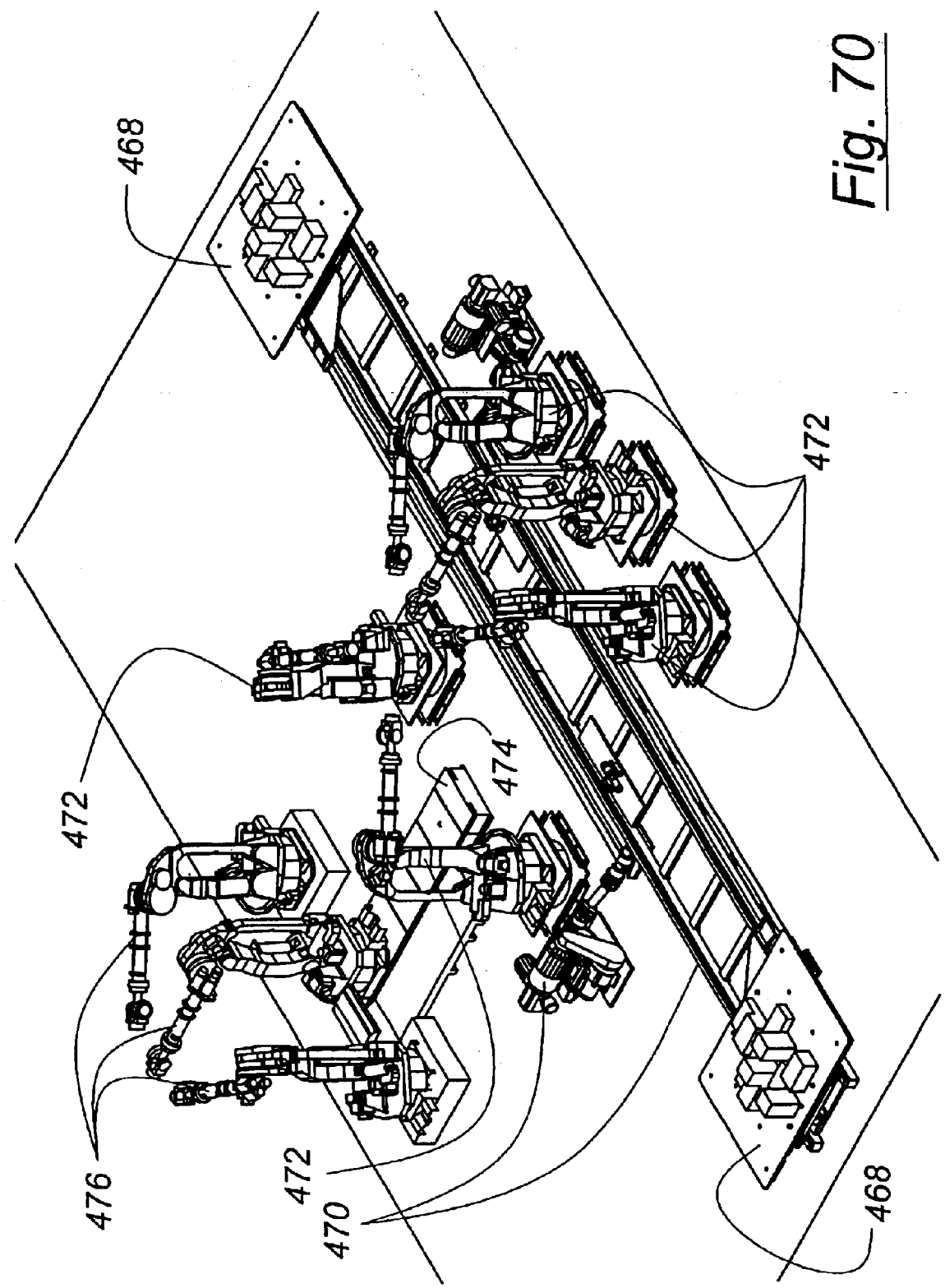

Task station 7 (FIG. 70) is an indexing tooling plate task station having two tooling plates 468 which are independently controlled and which are preferably loaded by a human operator. Tooling plates 468 are mounted to indexing shuttle mechanism 470 which indexes the loaded tooling plates and attached workpieces into a welding or sealing zone. Up to five welding or sealing or machining robots 472 or other types of robot may be used with task station 7. Because shuttle 470 travels perpendicular to the material system flow, operators may load parts from three sides of the fixture and one additional slide mechanism 474 and material handling robots 476 may be accommodated on the opposing side. Task station 7 may be used with robotic welders or robotic material handlers or combination robotic material handler and welder robots, as previously described.

Figure 71:
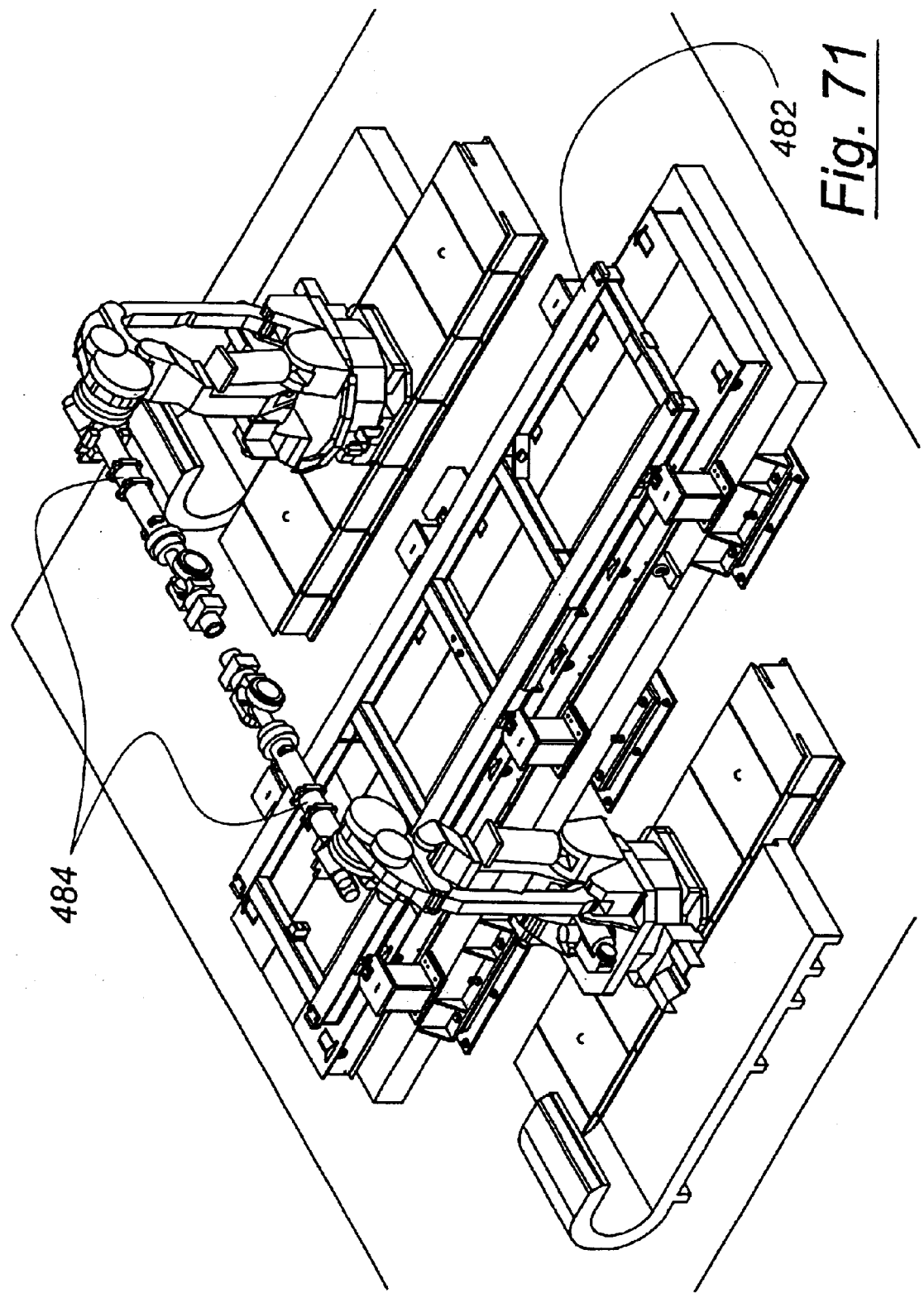

Task station 8 (FIG. 71) is a laser welding task station equipped for receiving very large tooling plate (not shown) by means of roller bed 482. This large tooling plate often termed a "pallet" in the trade. Although two laser welding robots 484 are shown, additional robots, or even a single robot, could be used with this task station. Additional equipment which could be employed with task station 8 according to the needs of someone wishing to practice the present invention may include, but is not limited to, a robot vision system or a seventh axis slide to increase the robot's work envelope.

Figure 72:
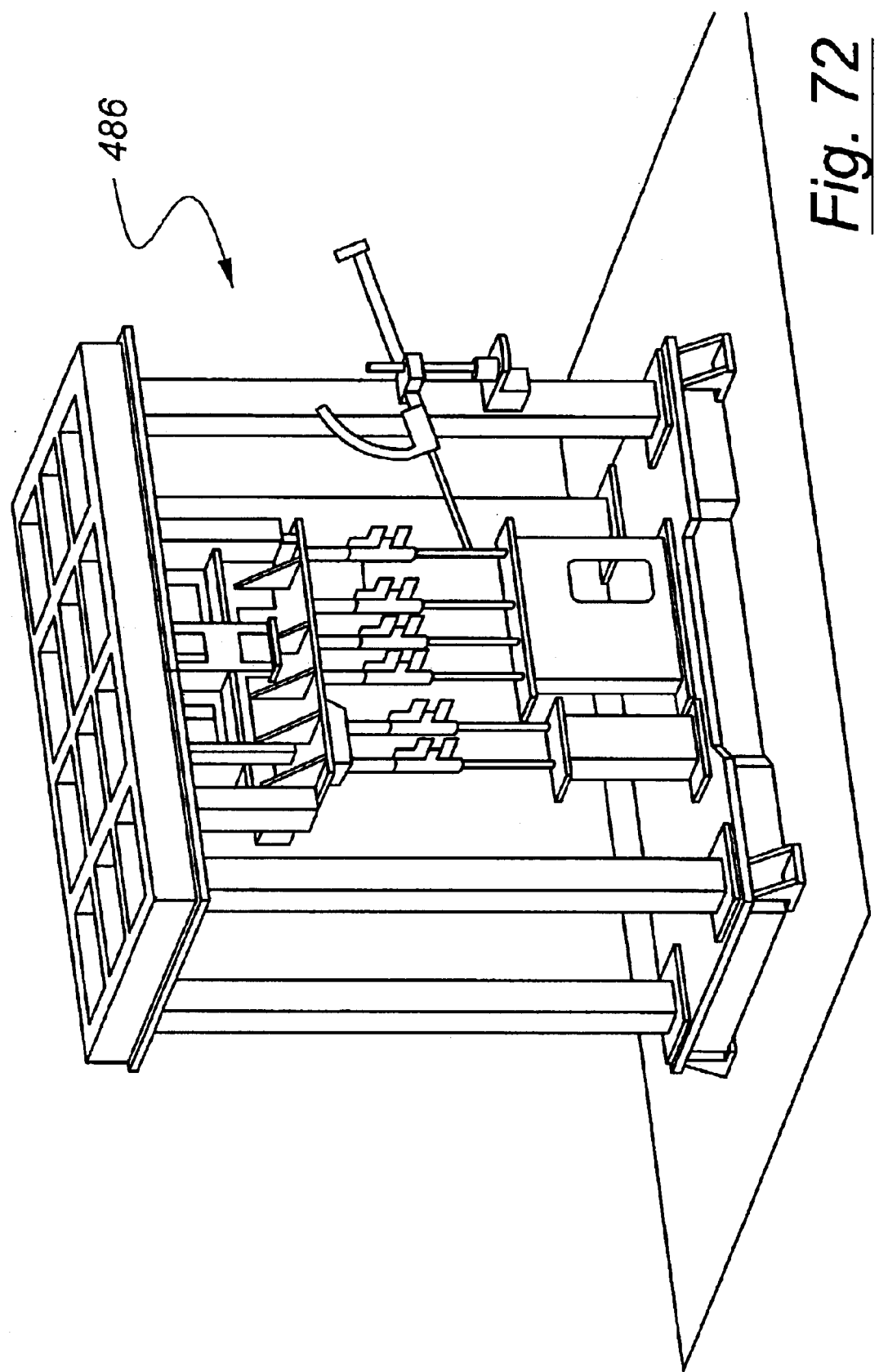

Task station 9 (FIG. 72) includes press welding fixture 486 which allows many spot welds to be made in a short period of time. This type of fixture has been in use for many years in automotive assembly plant body shops, but without the addition of the inventive tooling plate system, and without being part of a standardized task station system according to the present invention.

Figure 73:
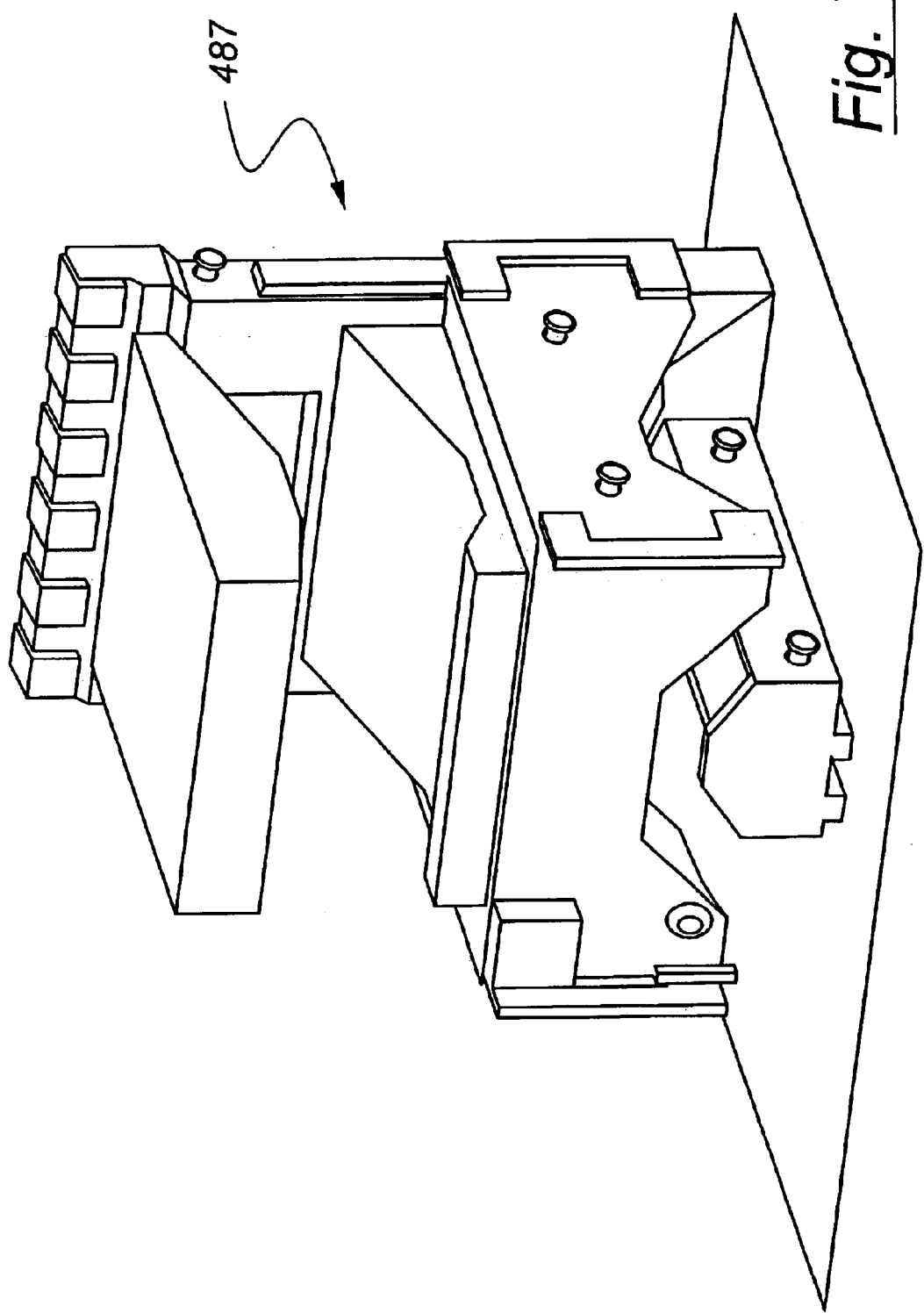

Task station 10 (FIG. 73) is a schematic representation of a task station which may include either a conventional hemmer or a clincher or a piercer 487. A robotic material handler may be used with this task station to remove processed assemblies or subassemblies.

Figure 9:
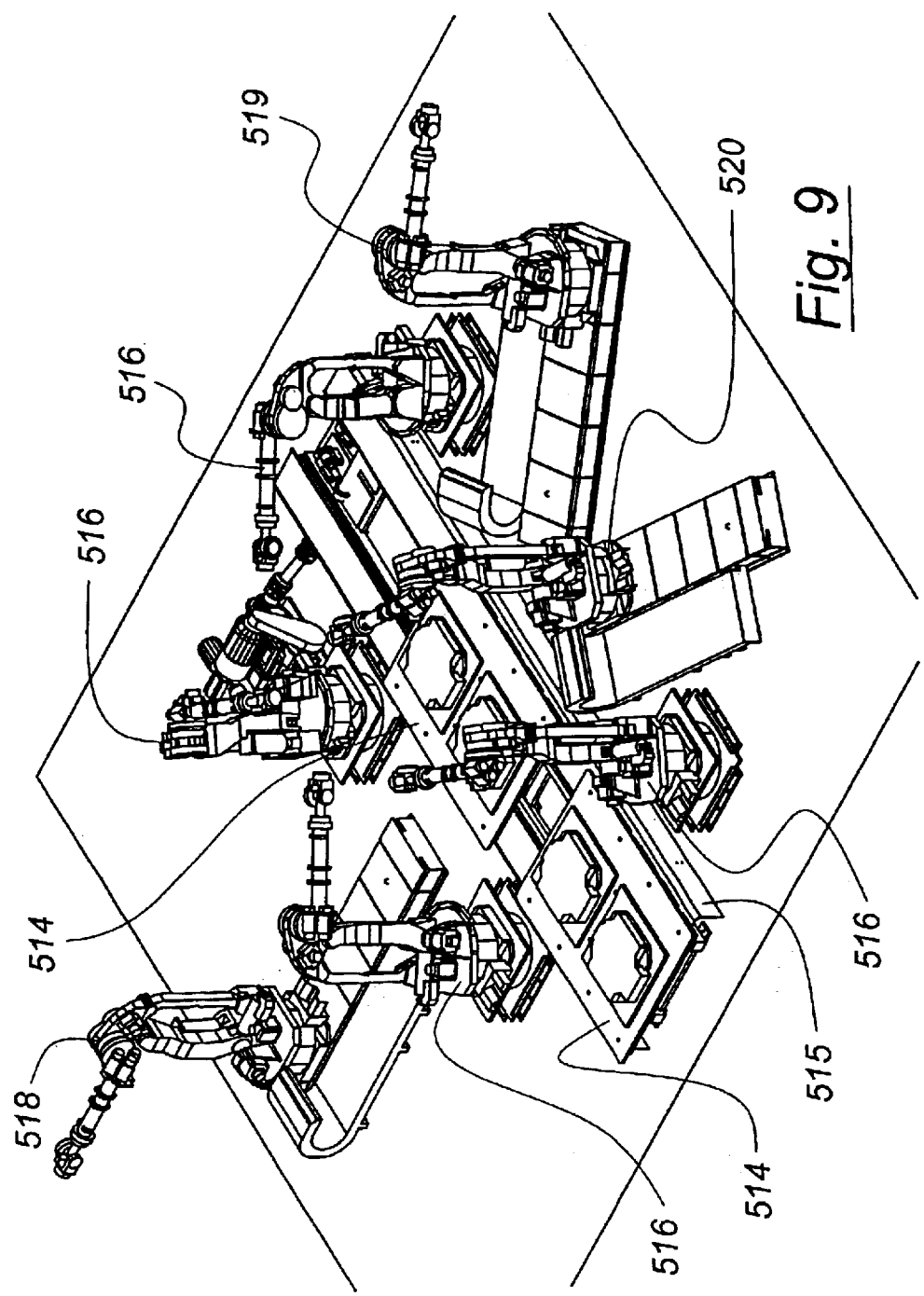
FIG. 9 is a perspective view of a task station of the present invention.
Figure 12:
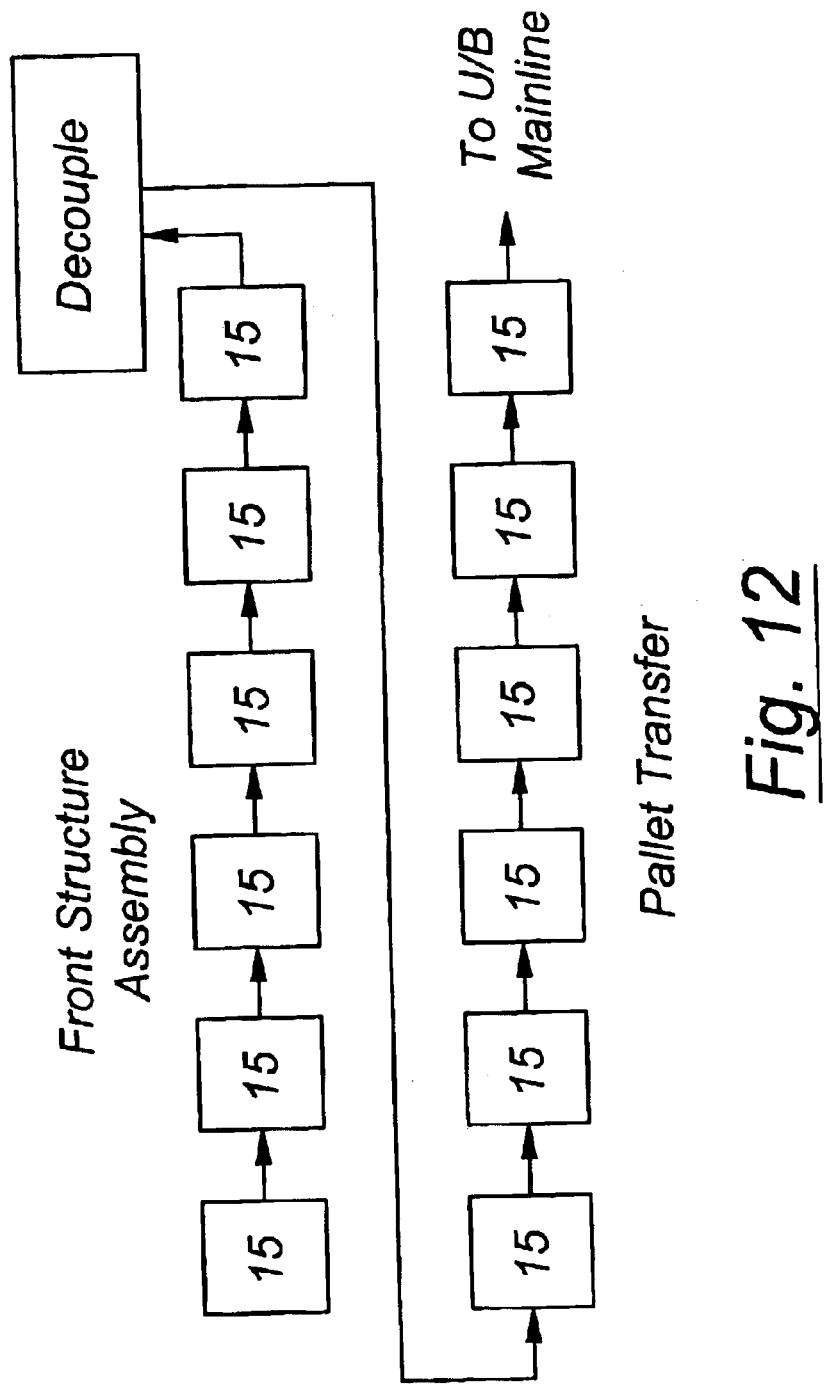
Figure 25:
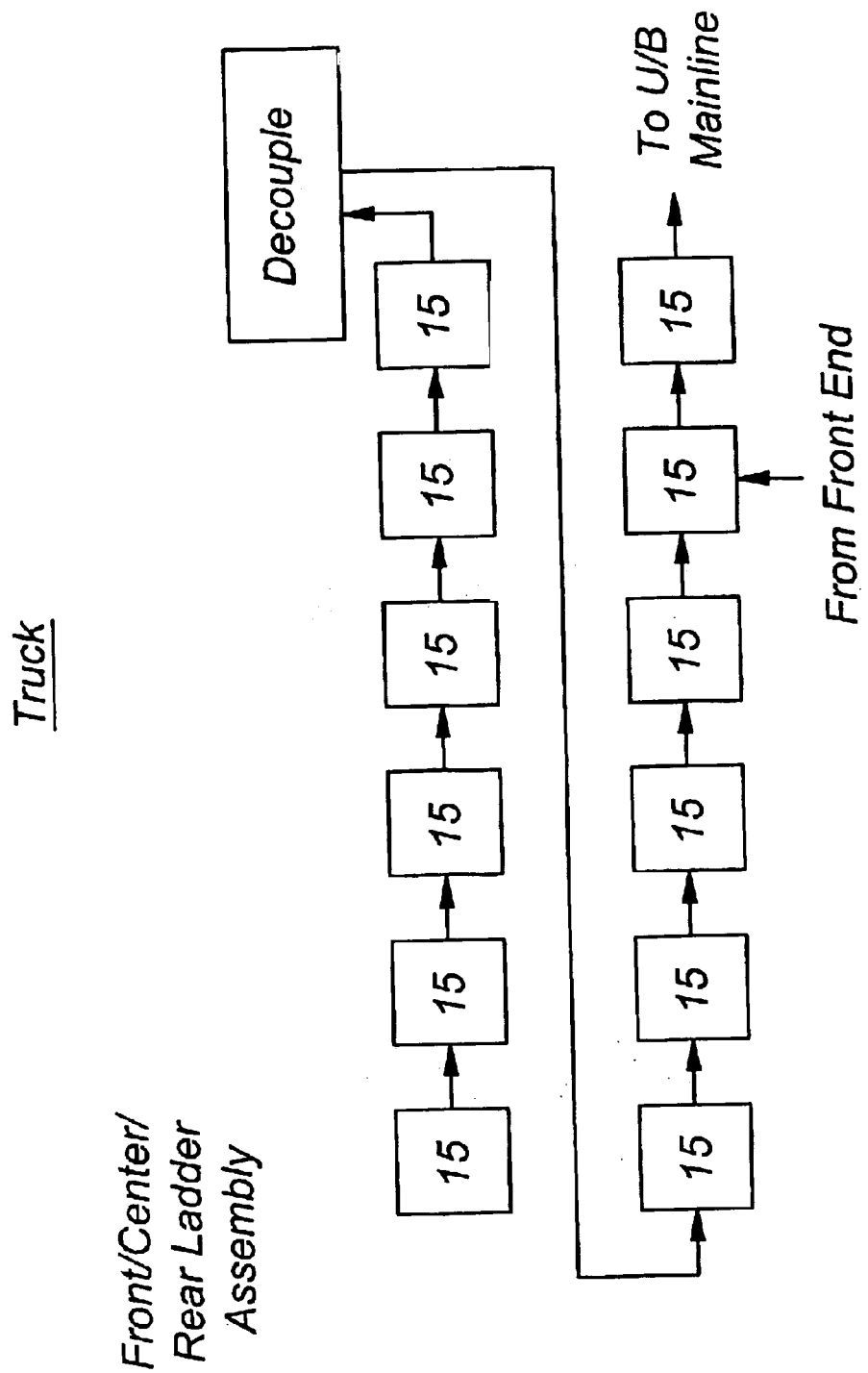
Figure 26:
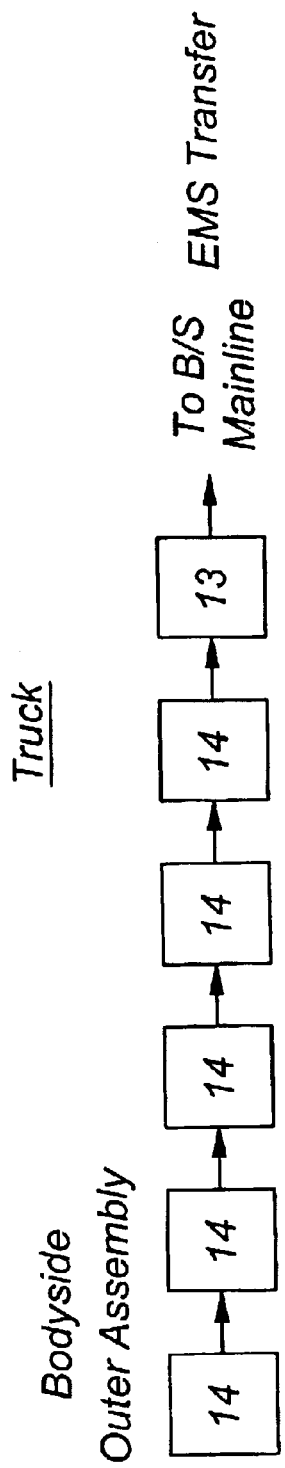
Figure 27:
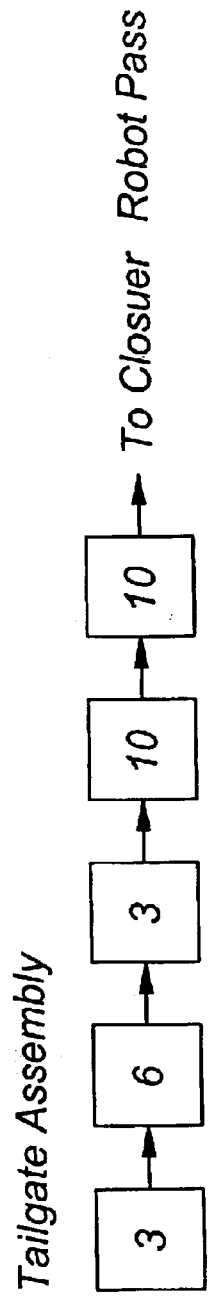
Figure 31:
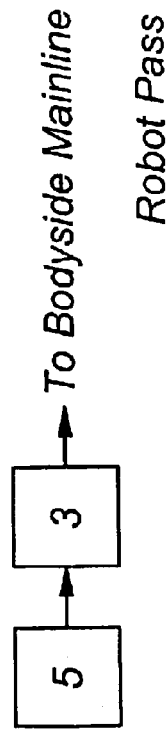
Figure 30:
Figure 32:
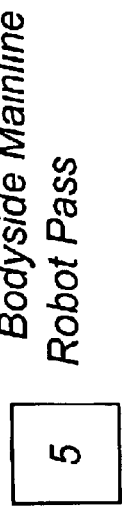
Figure 35:
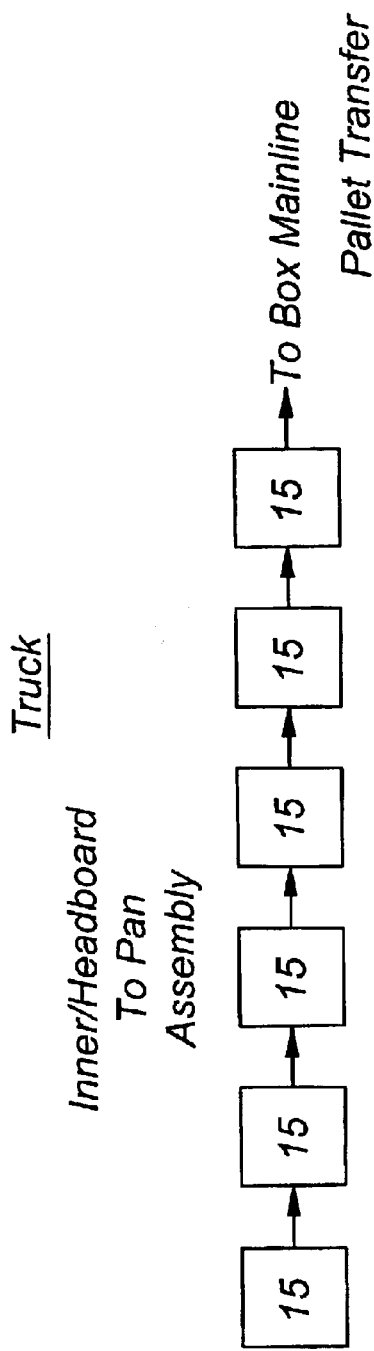
Figure 36:
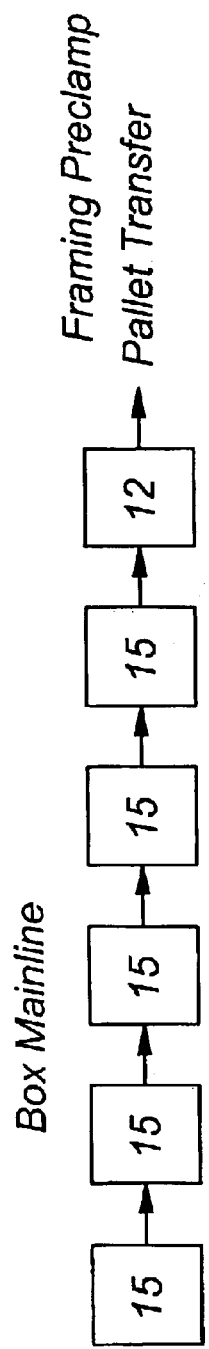
Figure 37:
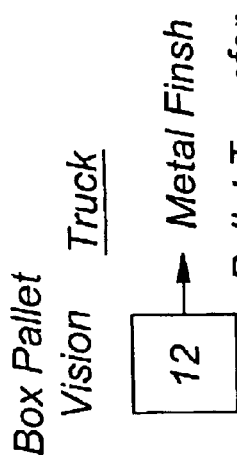
Figure 38:
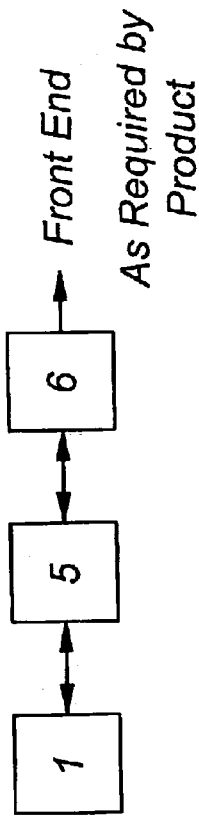
Figure 39:
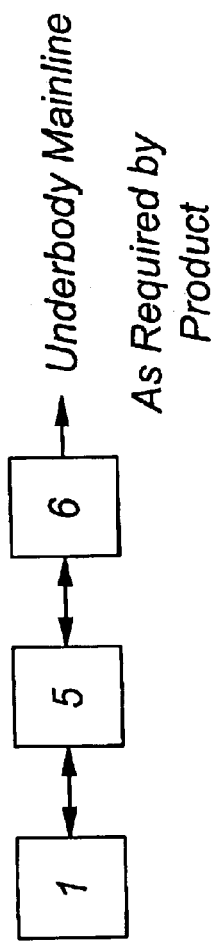
Figure 40:
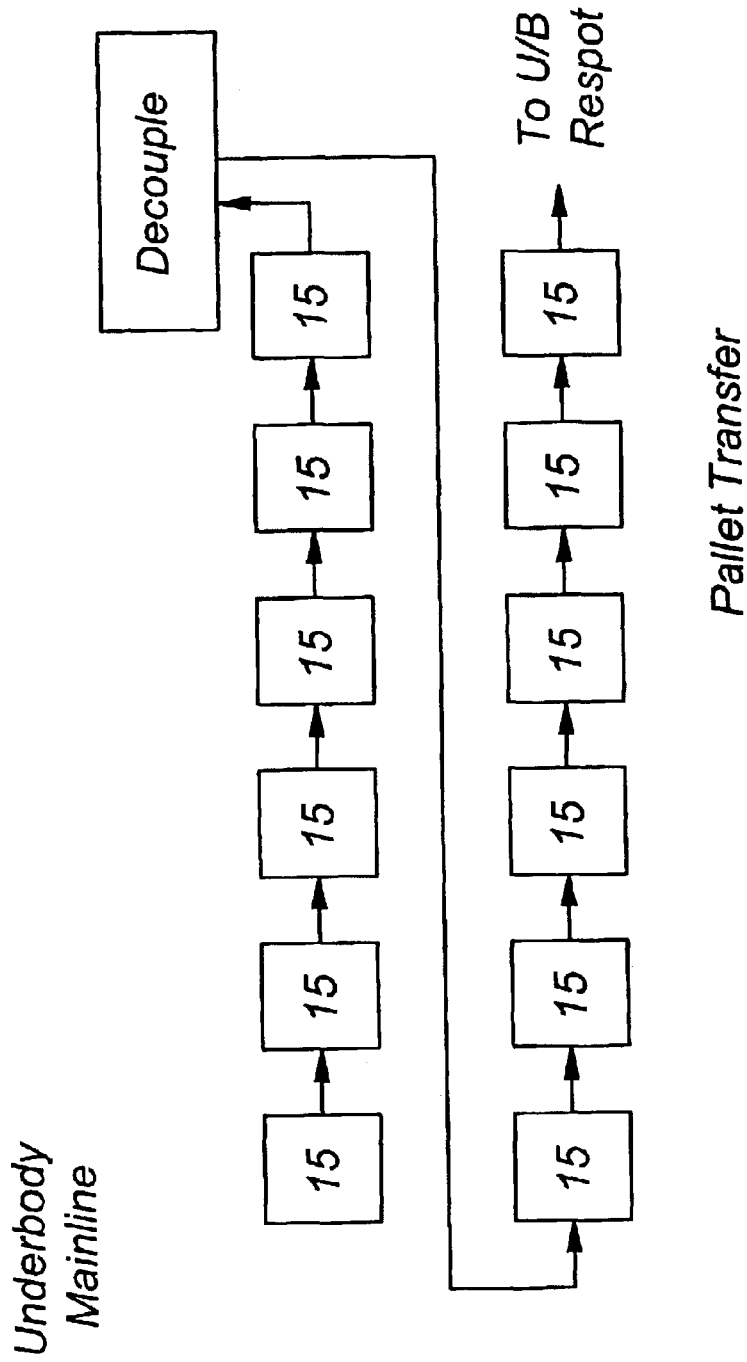
Figure 44:
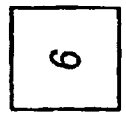
Figure 46:
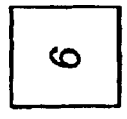
Figure 42:
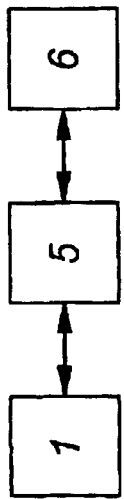
Figure 45:
Figure 43:
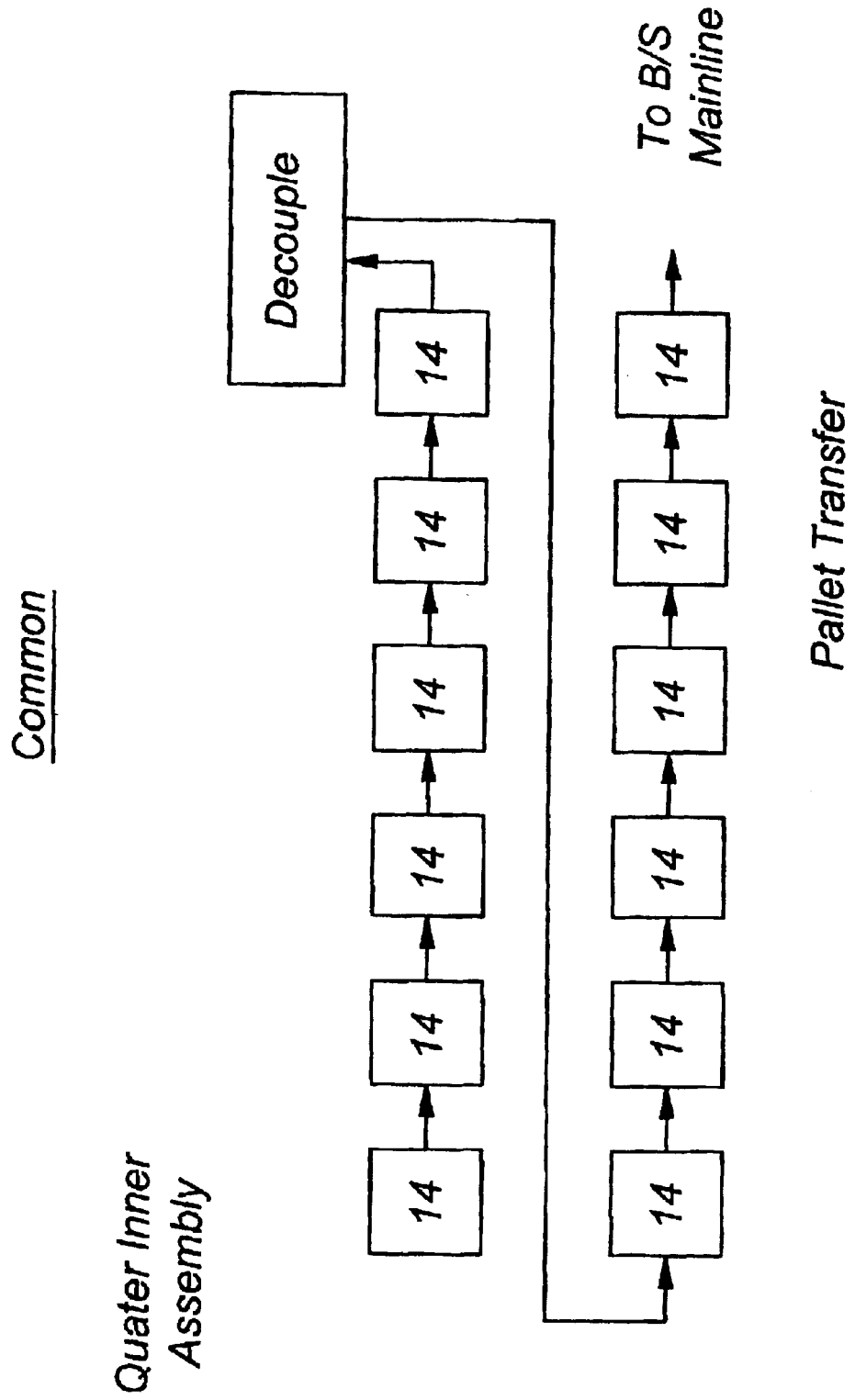
Figure 47:
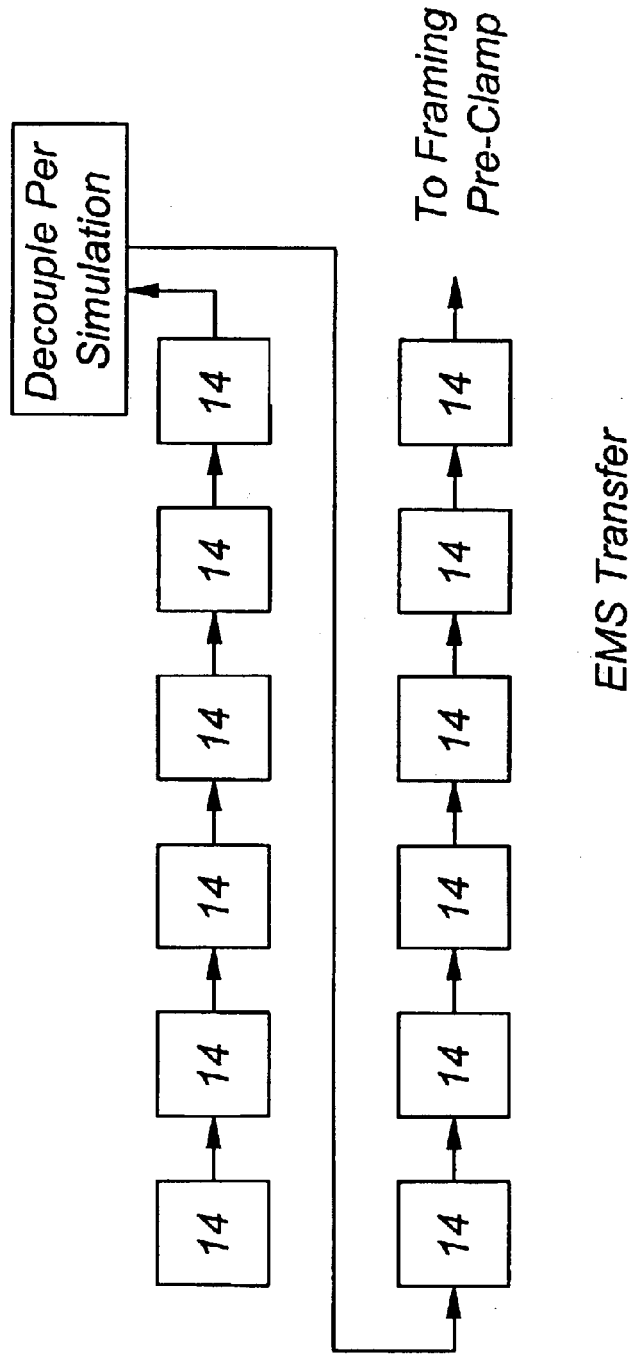
Figure 48:
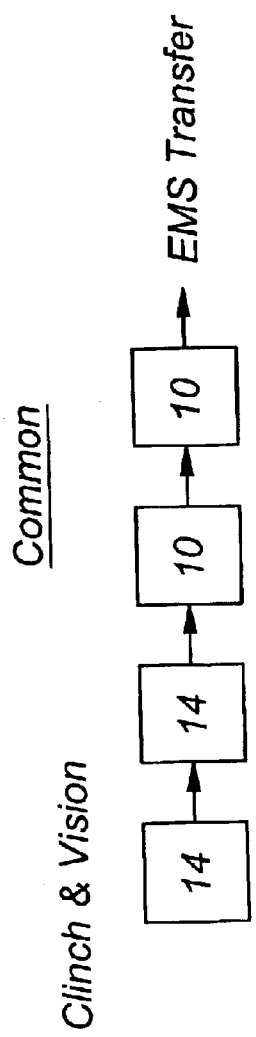
Figure 49:
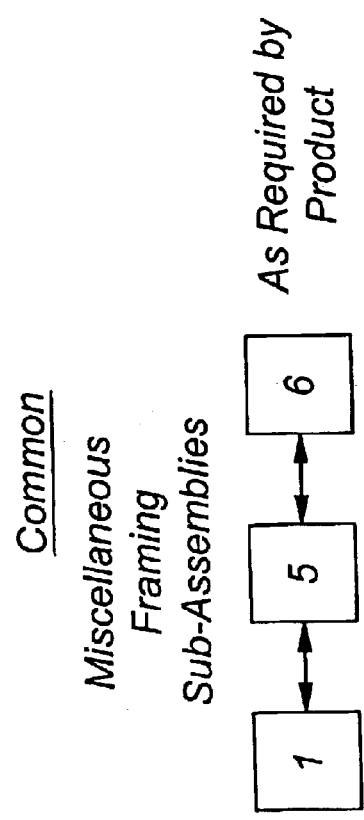
Figure 52:
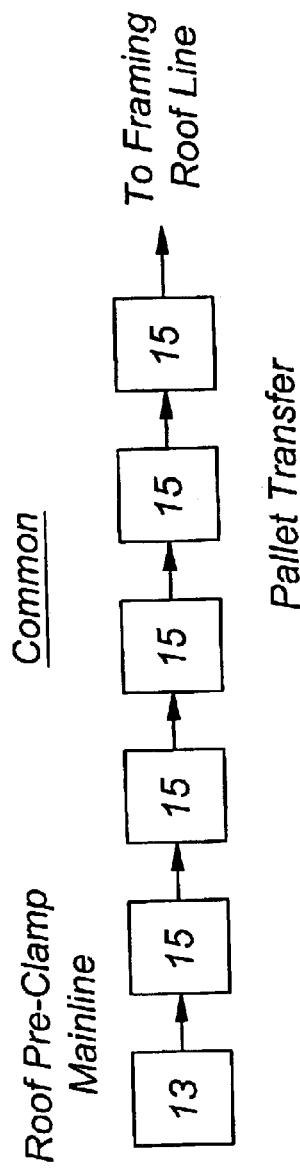
Figure 53:
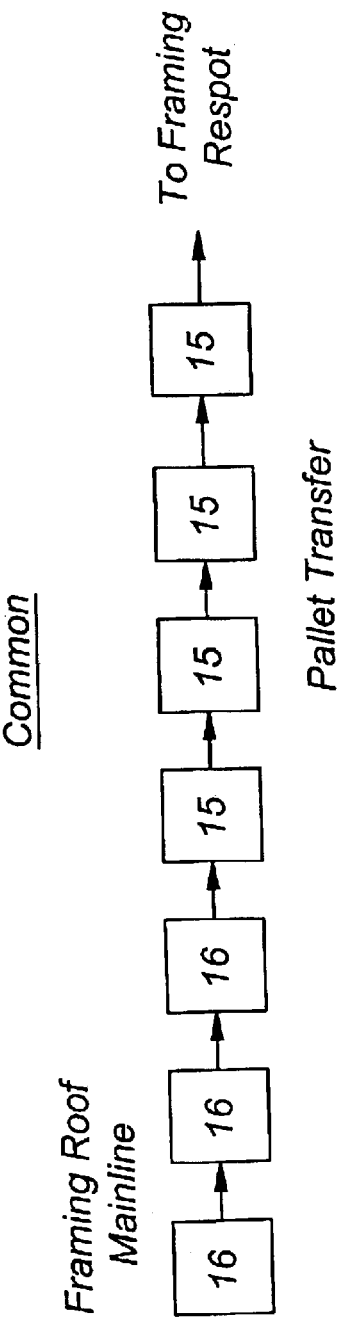
Figure 54:
Figure 55:
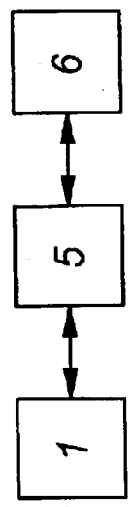
Figure 56:
Figure 57:
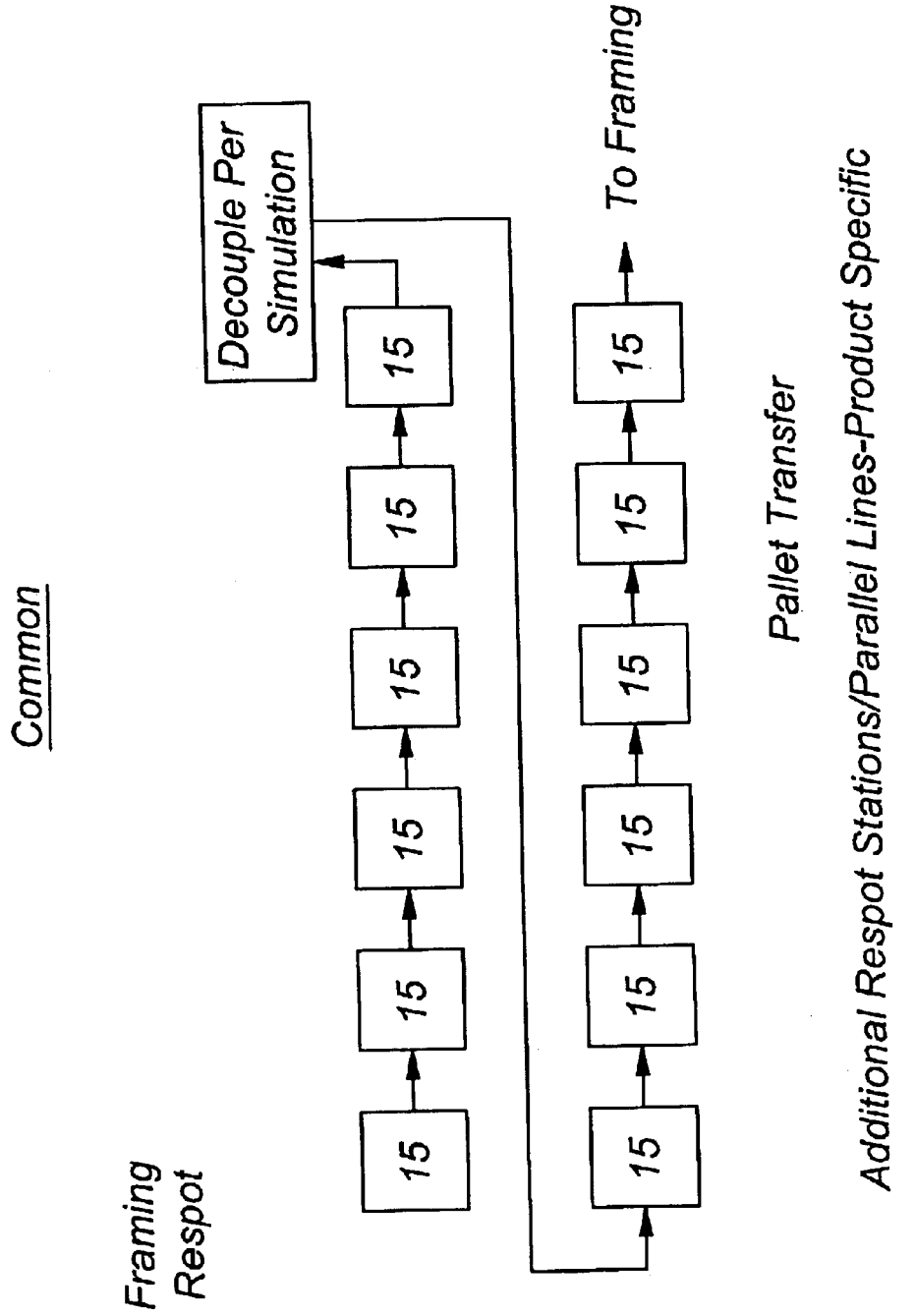
Figure 58:
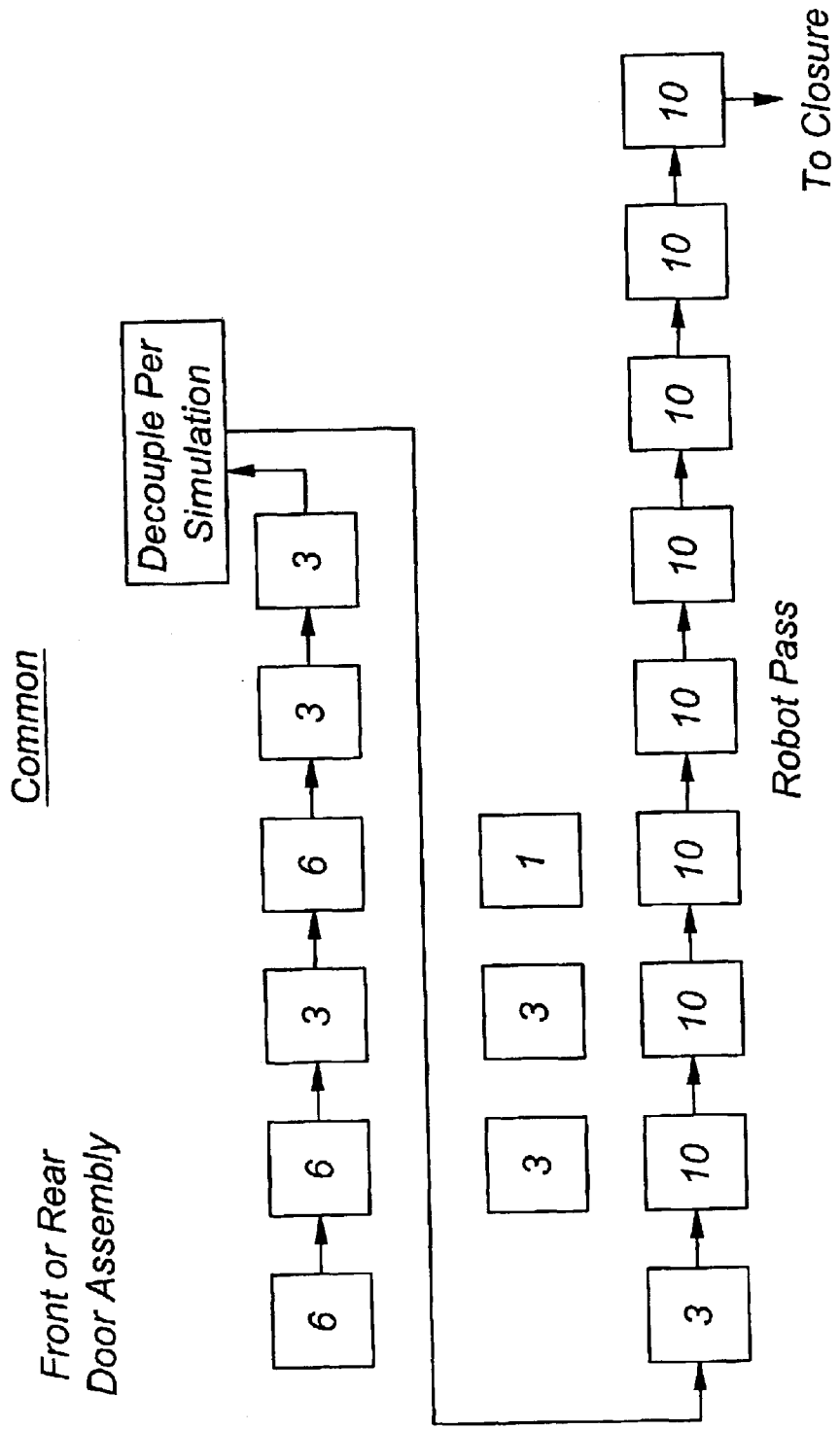
Figure 59:
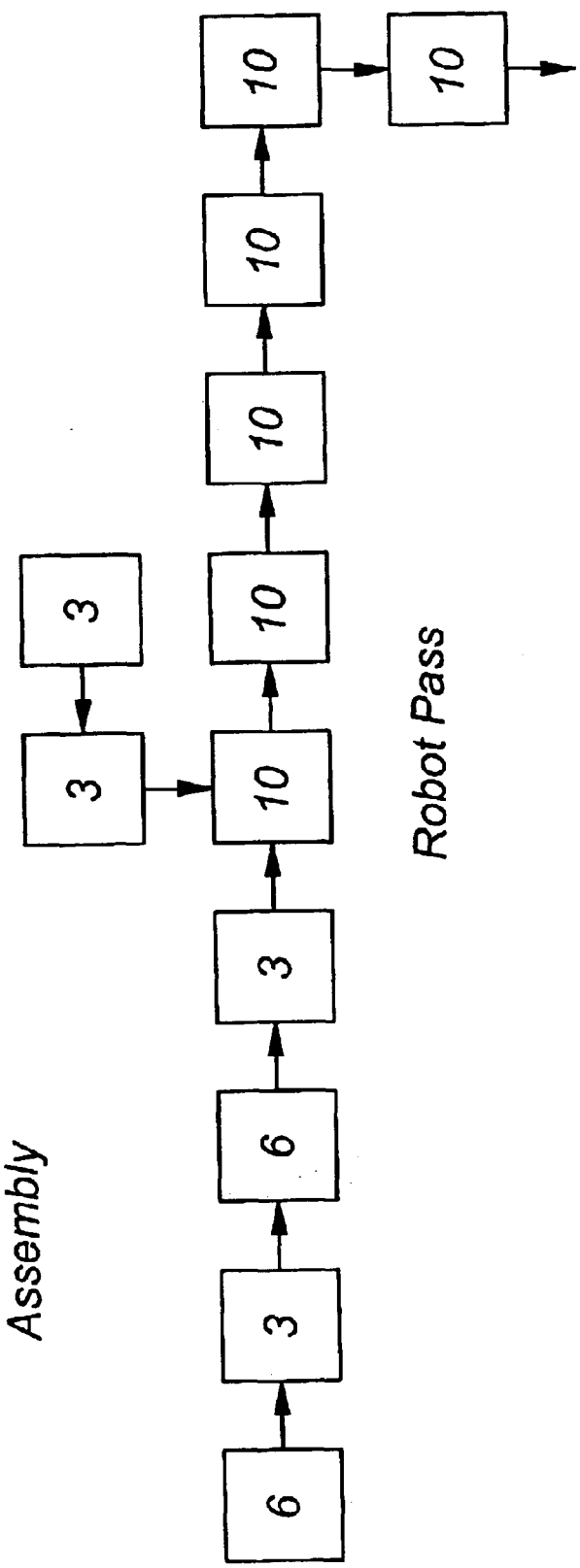
Figure 60:
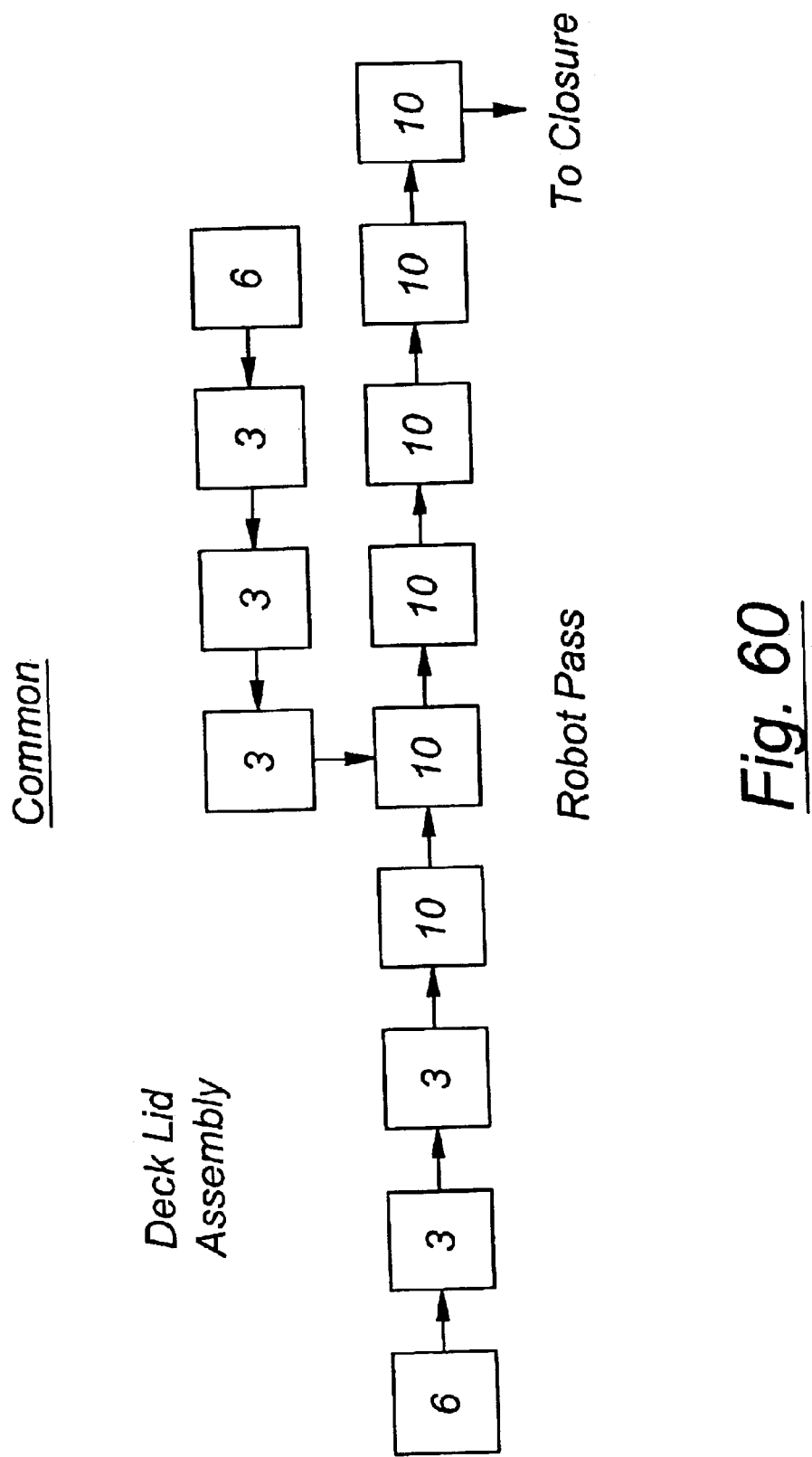

Task station 11 (FIG. 9) has two sliding tool plates 514 and multiple robots. Tooling plates 514 are mounted on common indexing shuttle 515. The robots include four robots 516 for welding and three slide-mounted robots 518, 519, and 520 for handling material. Robots 519 and 520 allow workpieces to be placed on either one of tool plates 514 depending on the mix of parts needed from task station 11. It should be noted that the slides for robots 519 and 520 are neither parallel to each other nor perpendicular to the center axis of indexing shuttle 515. Optionally, robots 516 may be either welding robots or could be other types of robots such as sealing or adhesive dispensing units.

Task station 11 provides a very high level of flexibility because the diverging arrangement of the slide mounts for material handling robots 519 and 520 allow for large, extensive feeder stations (not shown) which may accommodate a very wide range of component parts and subassemblies. This flexibility is extremely useful in conjunction with the capability to process multiple parts with tooling plates 514.

Figure 74:
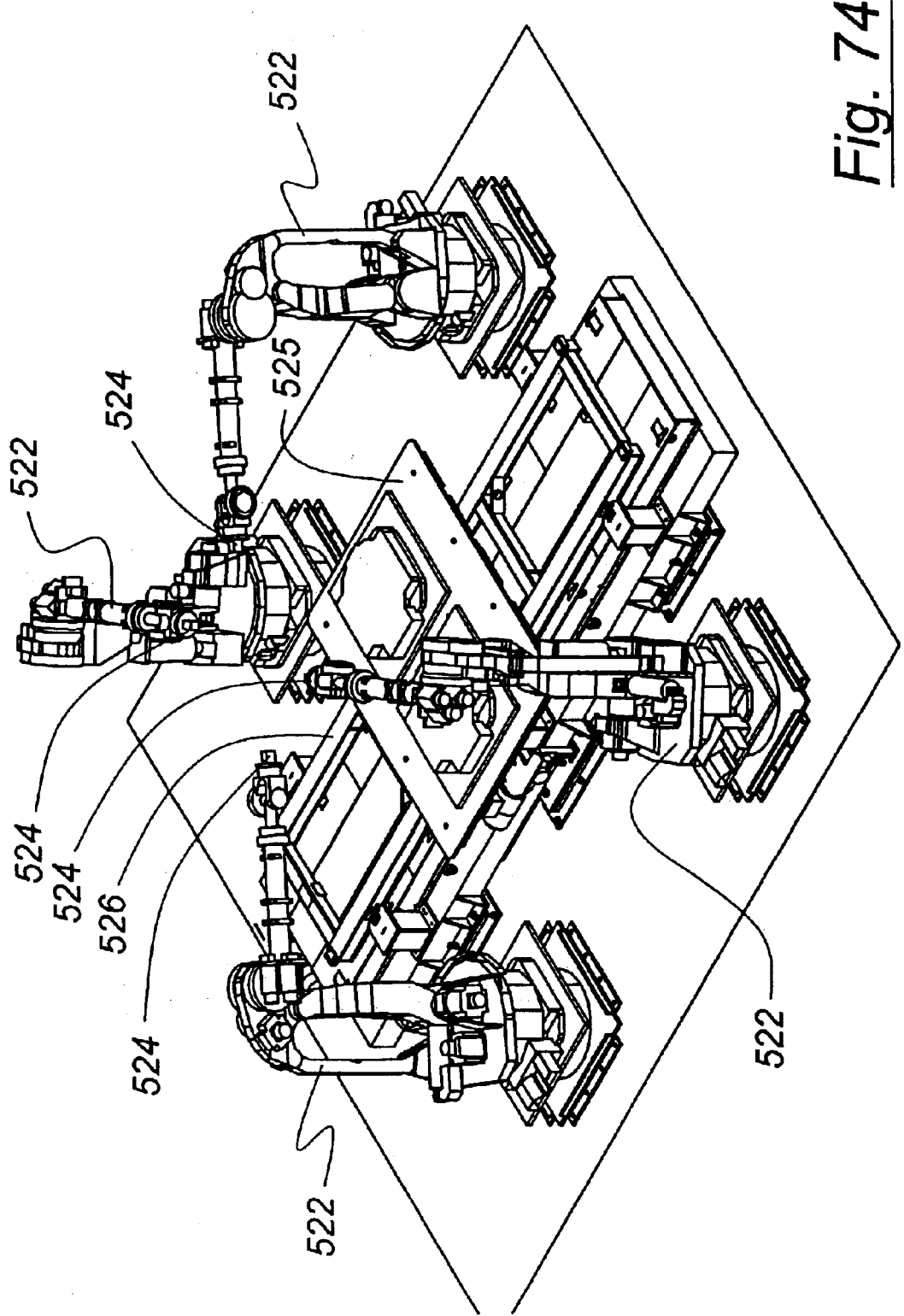

Task station 12 (FIG. 74) which has provisions for receiving pallet 525 on roller bed 526, is a vision task station containing optical measuring devices and fixtures for performing inspections using four robots 522 and cameras 524 with associated calibration equipment. Optionally, a smaller or larger number of cameras and robots could be employed with this task station.

Figure 75:
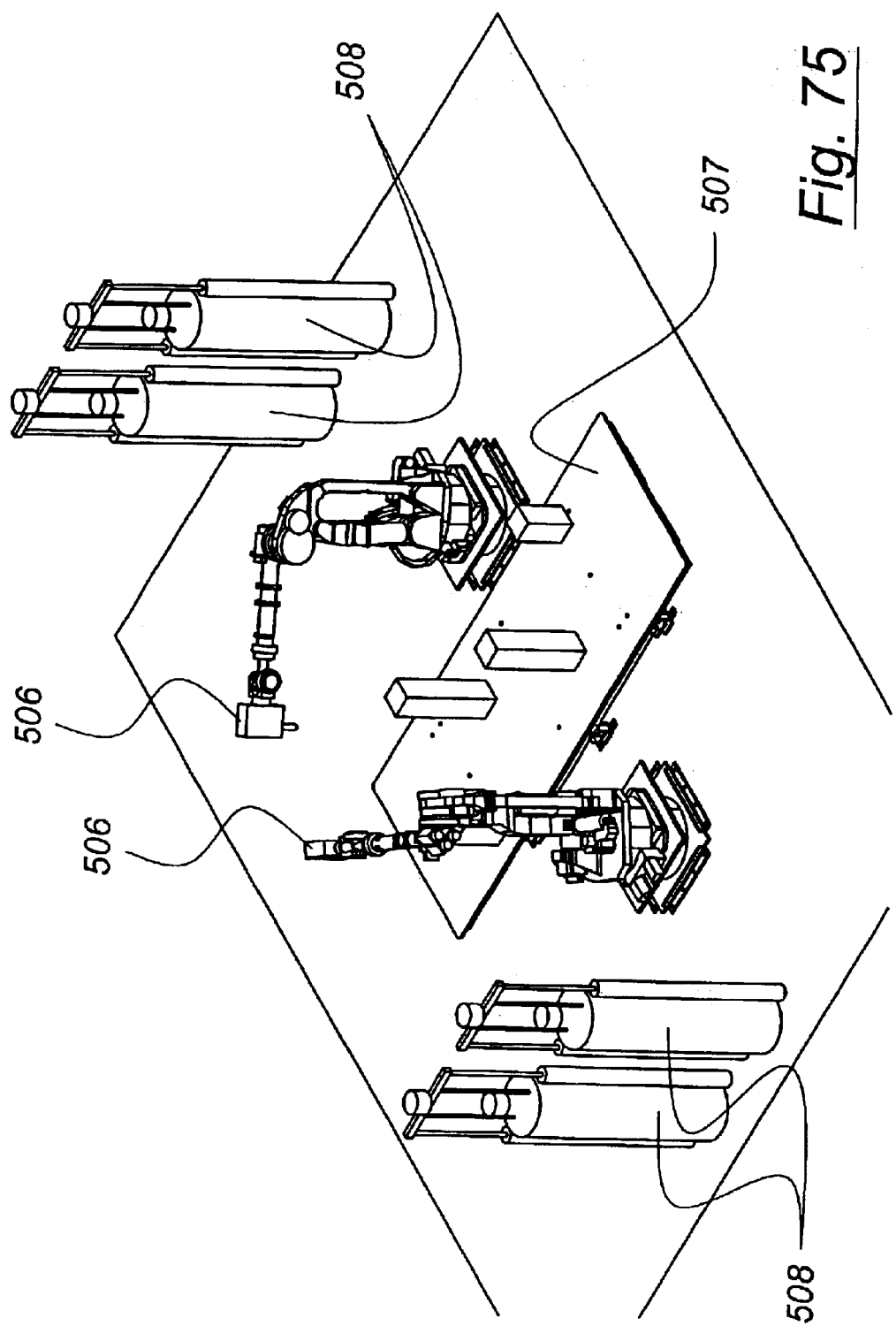

Task station 13 (FIG. 75) is a sealer applying task station having two robots 506 which apply either adhesive, or sealer or mastic stored in tanks 508. Although a larger tooling plate 507 is illustrated in FIG. 75, as with other task stations, either a smaller tooling plate or a large pallet could be employed for handling workpieces. If a pallet is used, task station 13 could have a roller bed for accommodating the pallet system.

Figure 76:
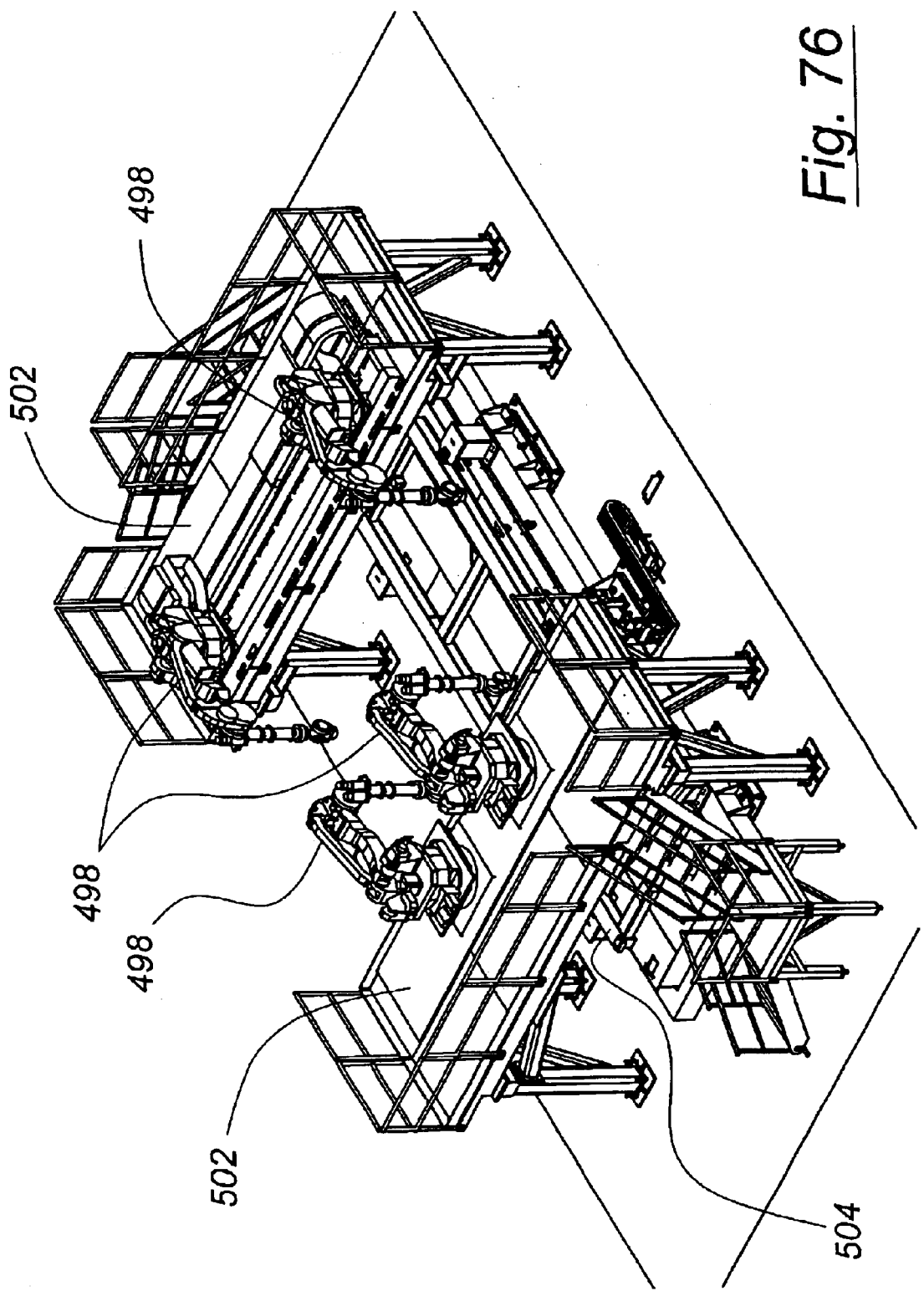

Task station 14 (FIG. 76) is a welding task station including dual shuttling tooling plates (not shown) mounted upon shuttle drive 504, and four robots 498 mounted on balconies 502 which allow robots 498 to reach down to operate on workpieces carried upon the tooling plates as they move back and forth under robots 498. The sliding tooling plates provide model mix capability. In other words, different types of vehicles may be handled without the need for tooling change over.

Figure 77:
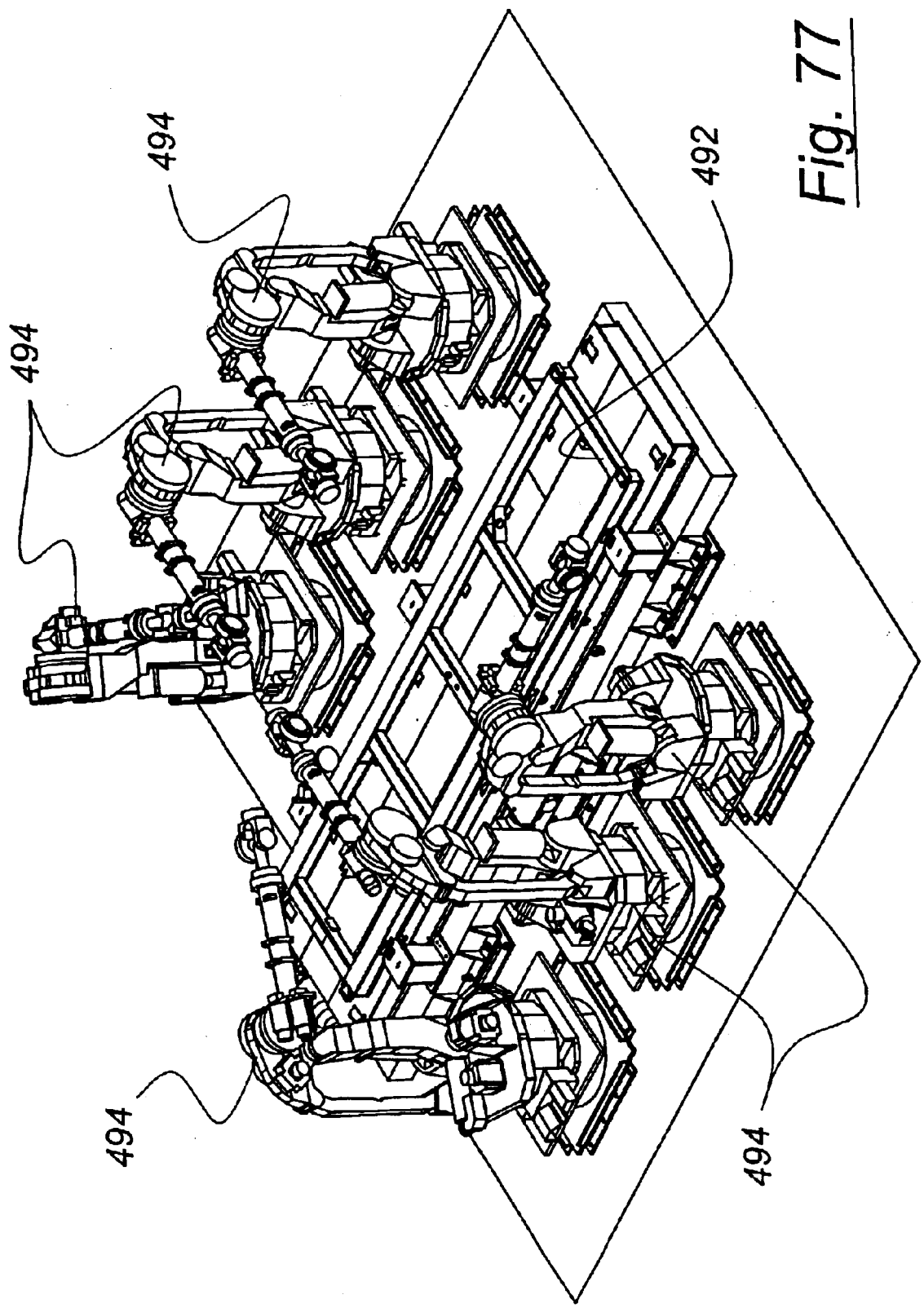

Task station 15 (FIG. 77) is a welding task station used for large assemblies and includes roller bed 492 for accommodating a pallet (not shown) and may utilize not only the six illustrated robots 494, but also robotic welders or sealing or adhesive application robots. Alternatively, a smaller number of weldbots (welding robots) could be employed, either alone or with adhesive or sealer applying robots.

Figure 78:
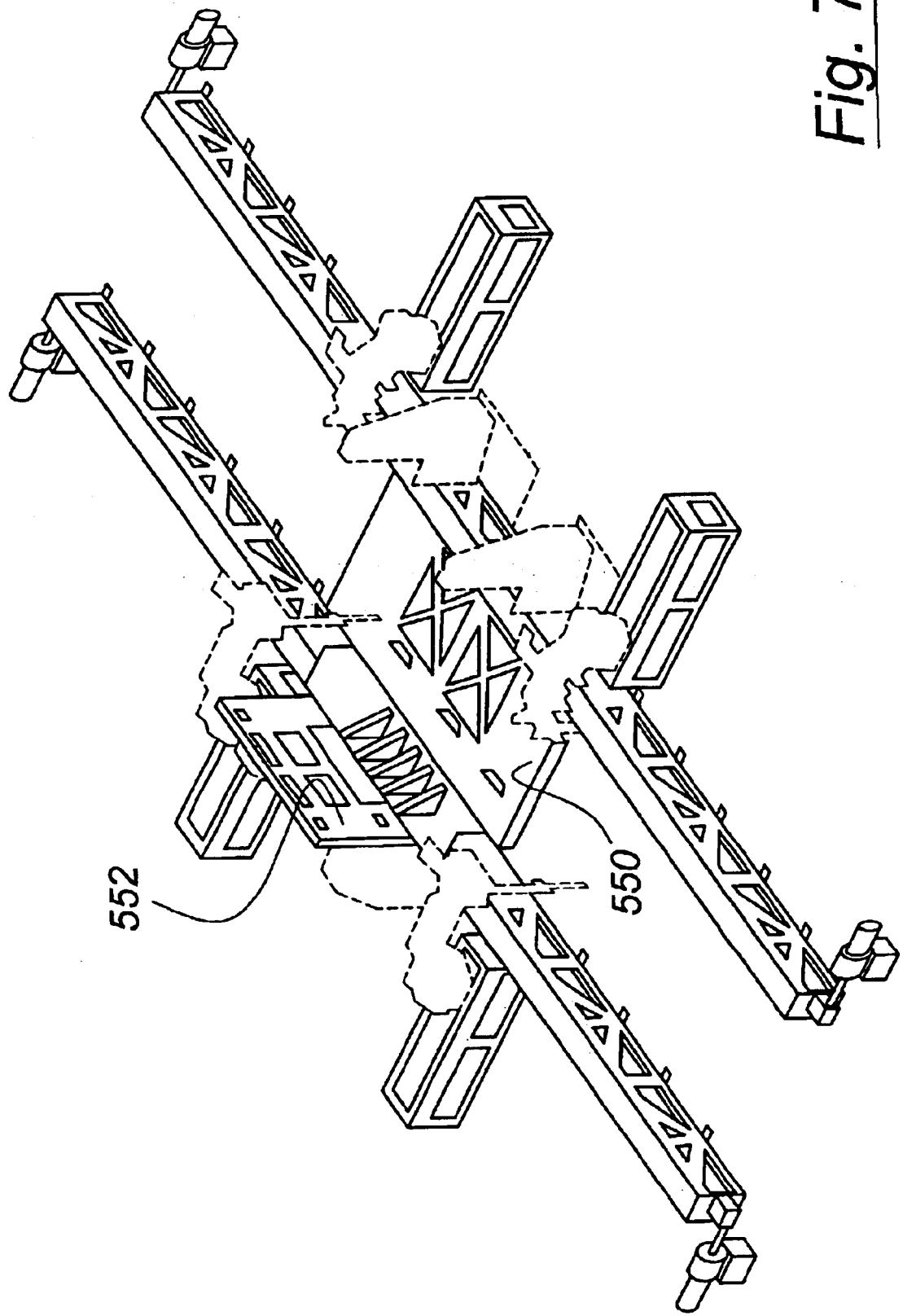
Figure 106:
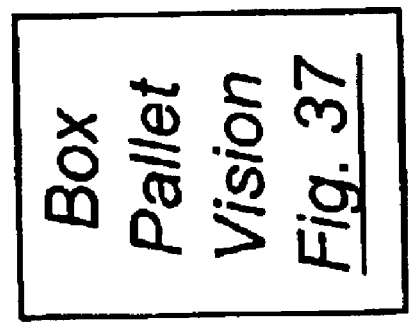

Task station 16 (FIG. 78) is schematic representation of a framer that is used join a vehicle body side to an underbody. In use, the underbody would be mounted upon a pallet and brought into a roller bed 550 that is incorporated in task station 16. Gate fixture 552 is used to mate the body side with the underbody while the underbody is on the pallet, to permit welding of the body side and underbody. If desired, task station 16 may be augmented by an overhead balcony holding additional robots or an indexing unit and extra gate so as to accommodate other body configurations.

Figure 133:
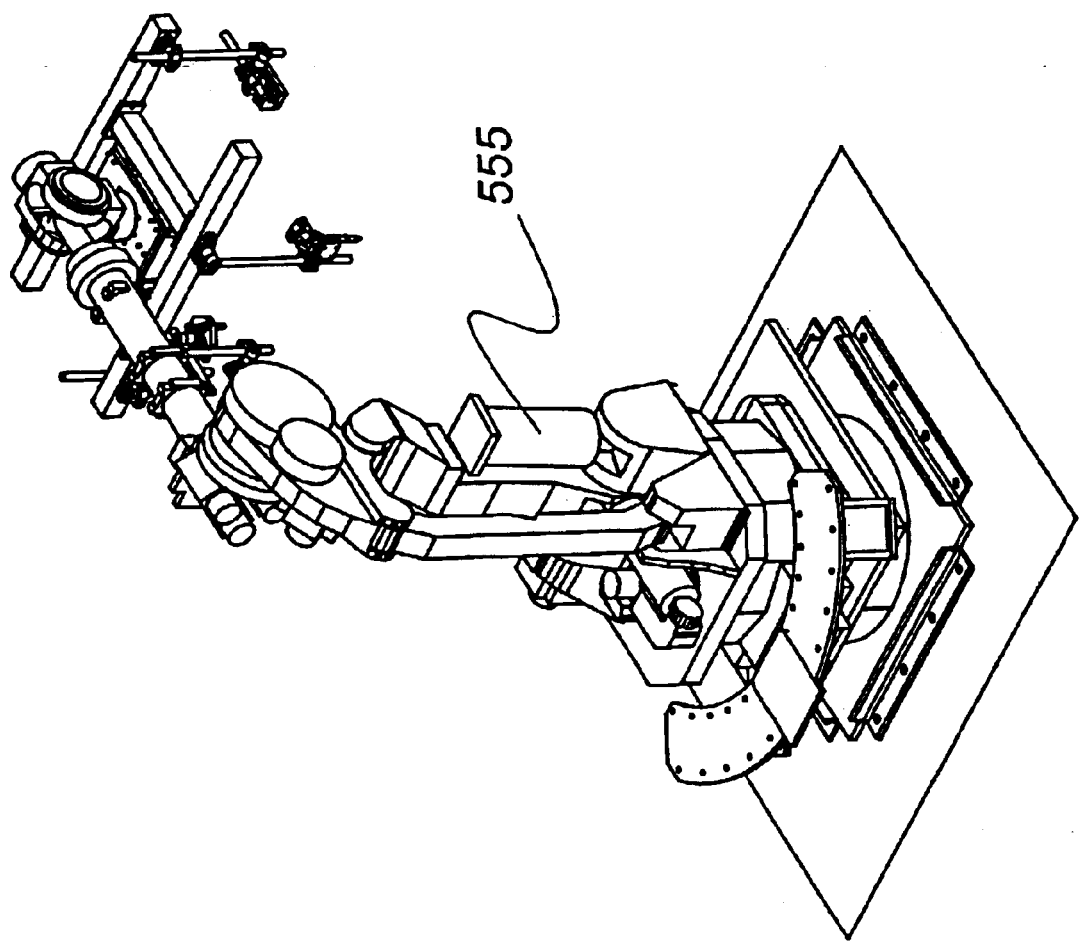
FIGS. 133–140 illustrate transfer task stations in the manufacturing system of the present invention.
Figure 134:
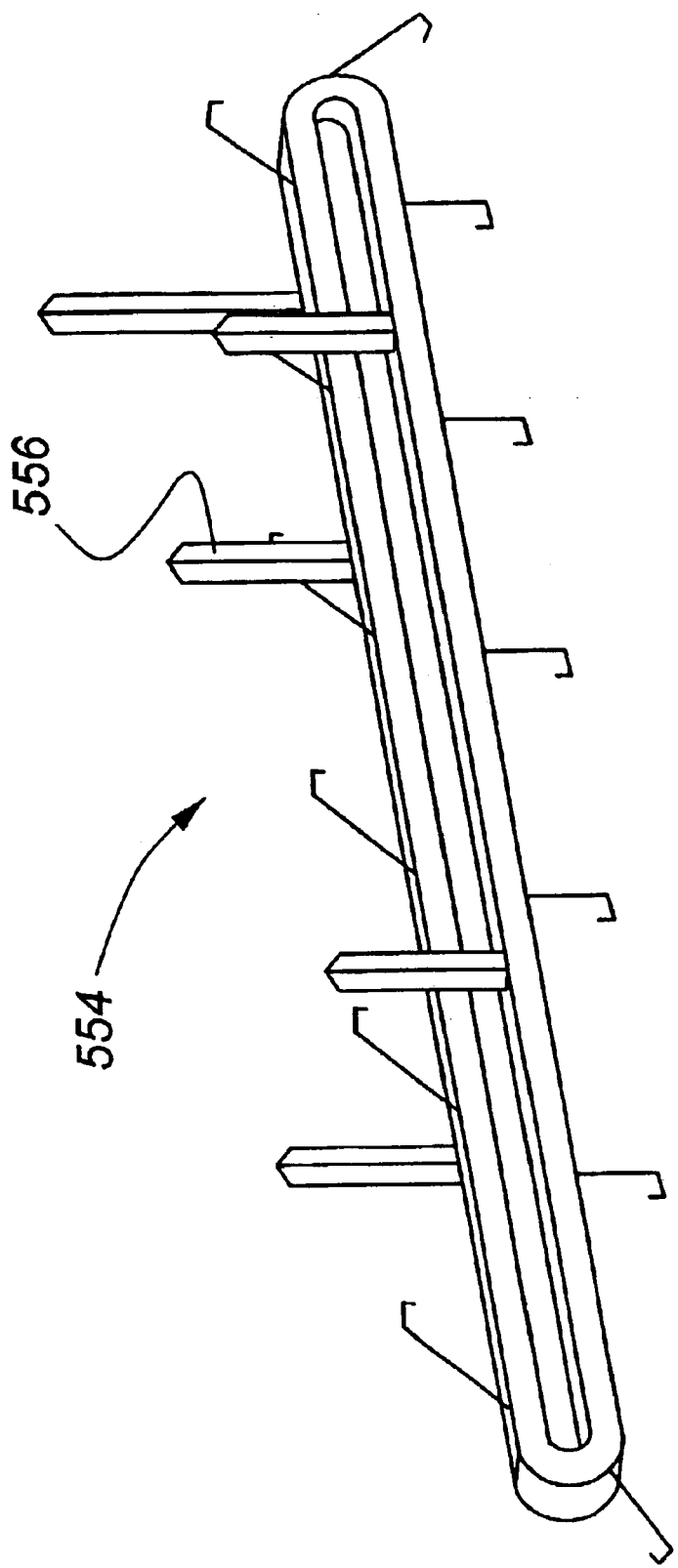
Figure 135:
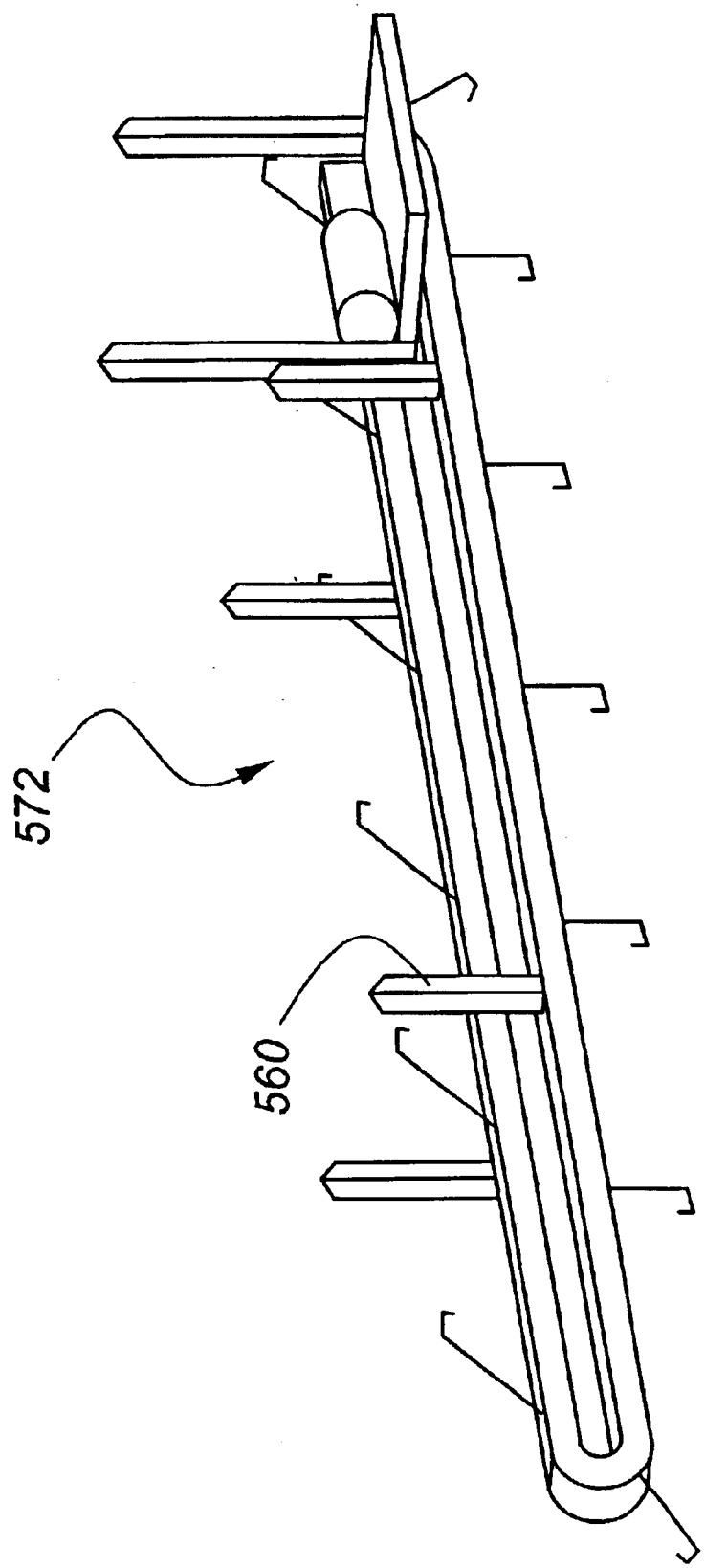
Figure 136:
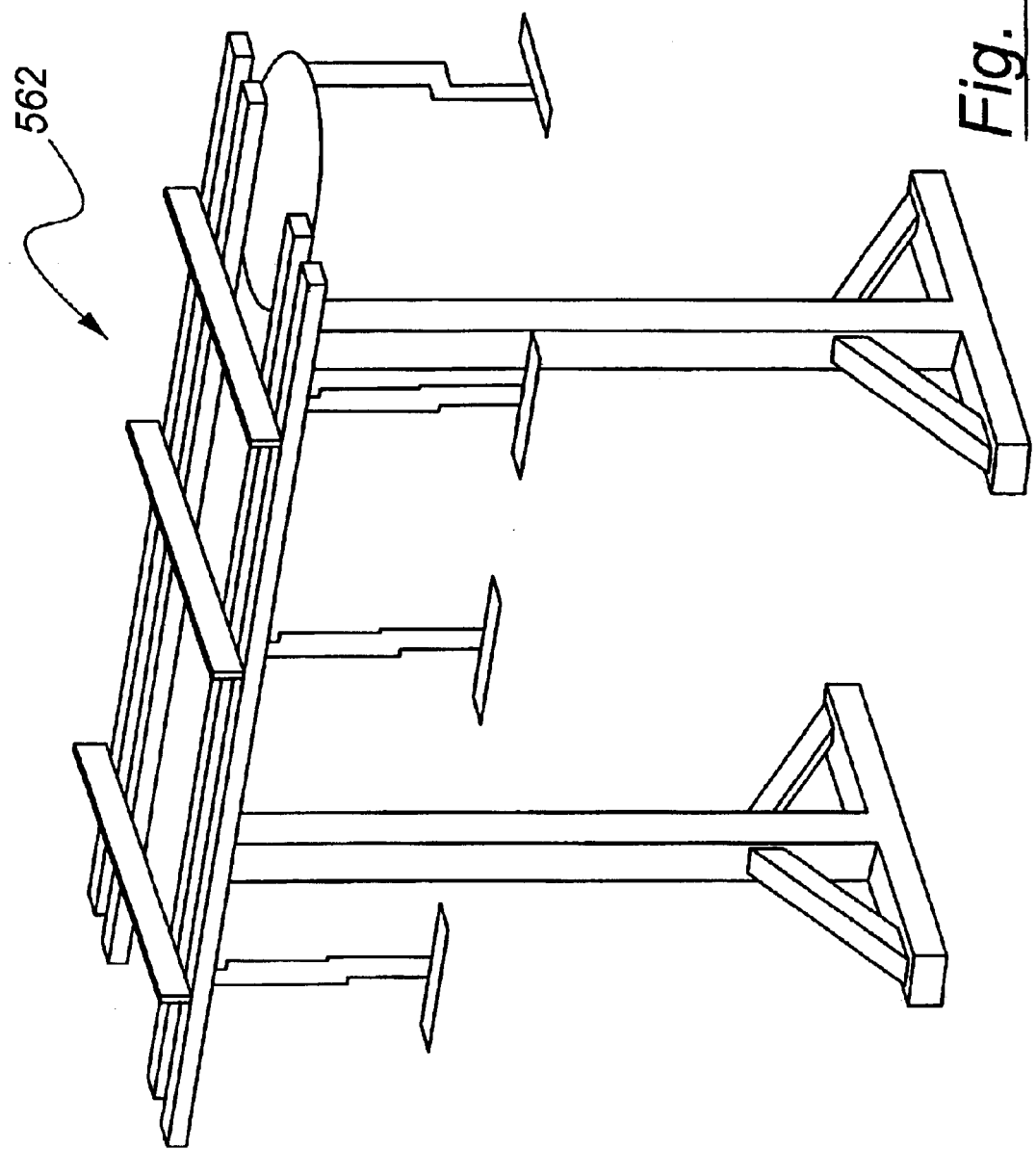
Figure 137:
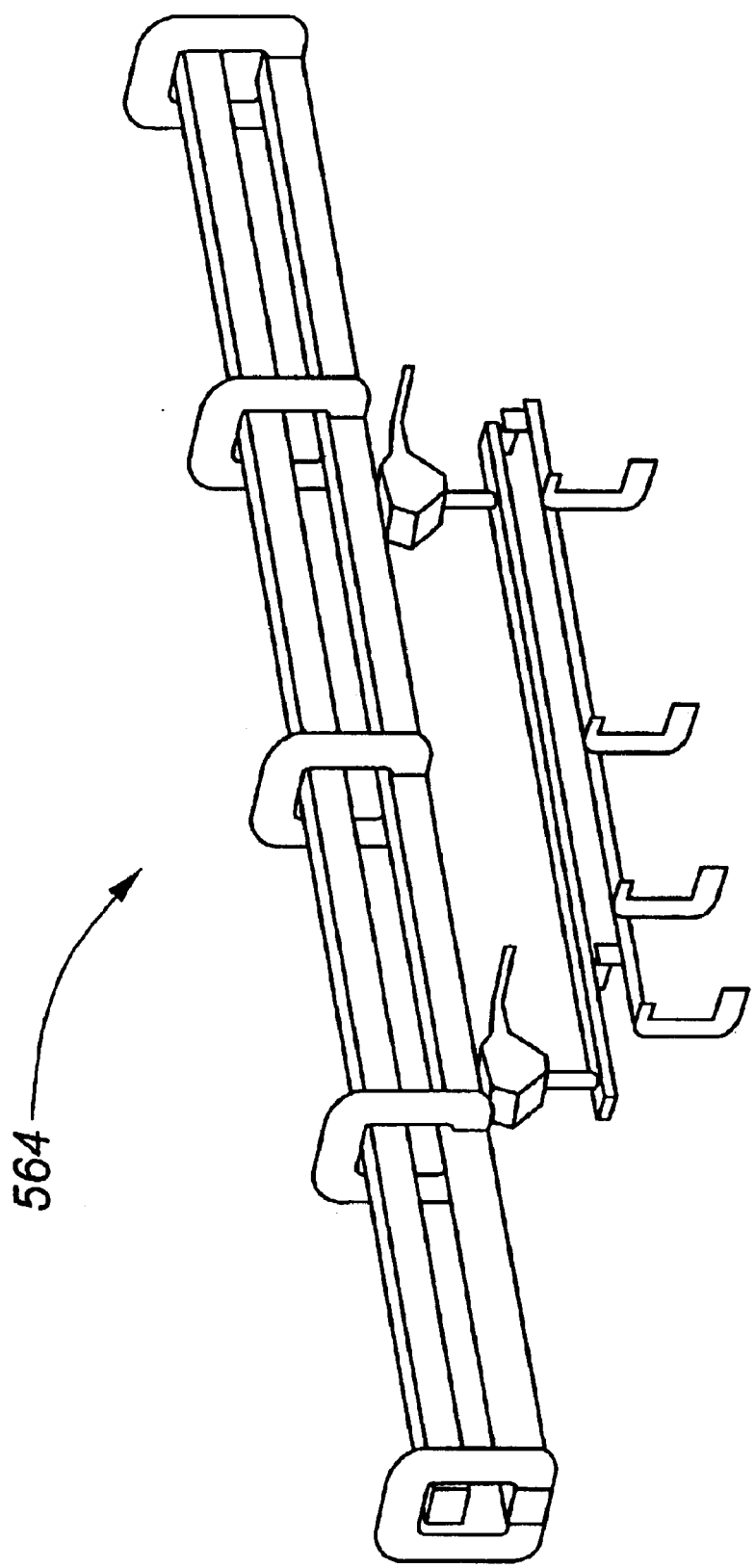
Figure 138:
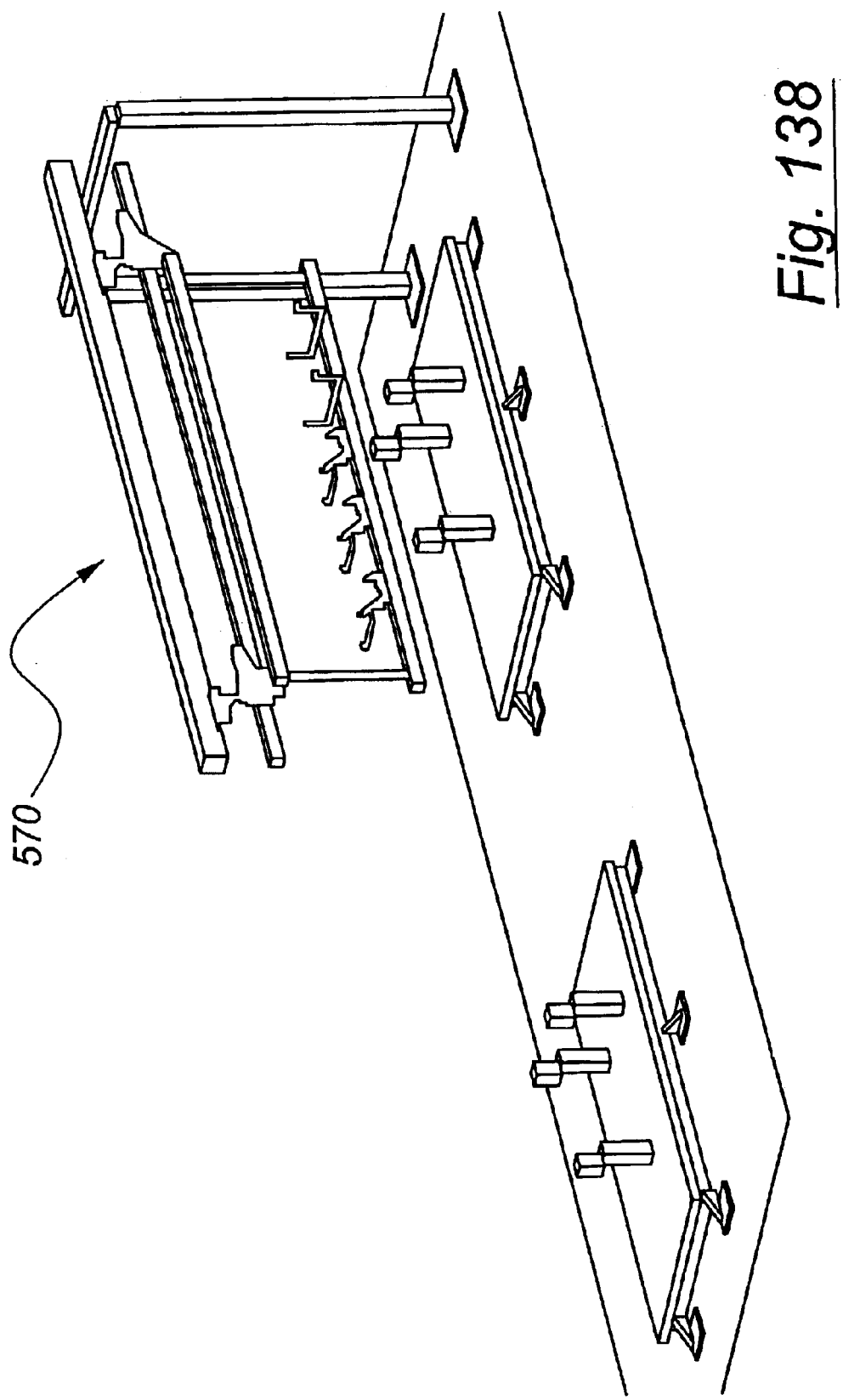
Figure 139:
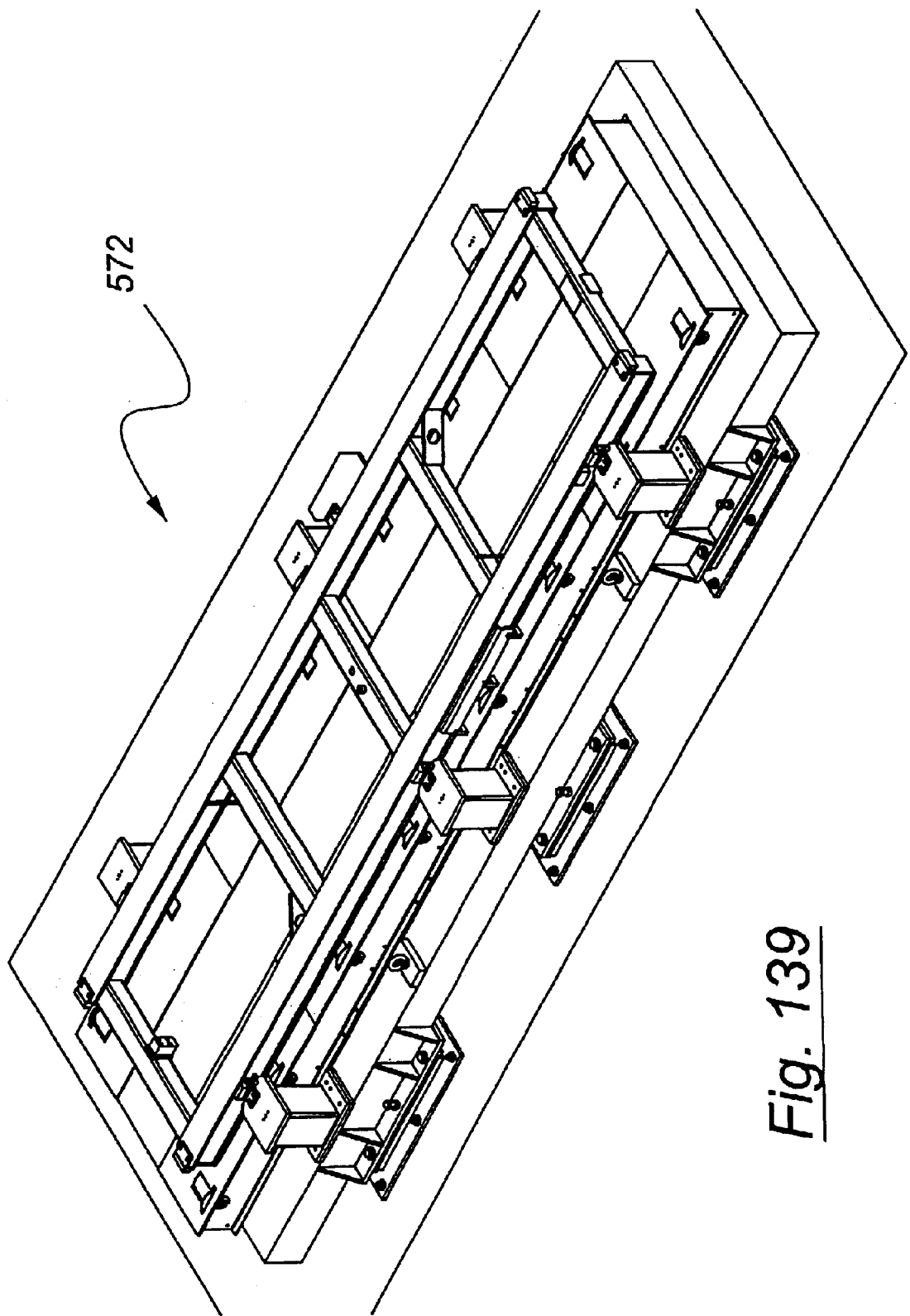
Figure 140:
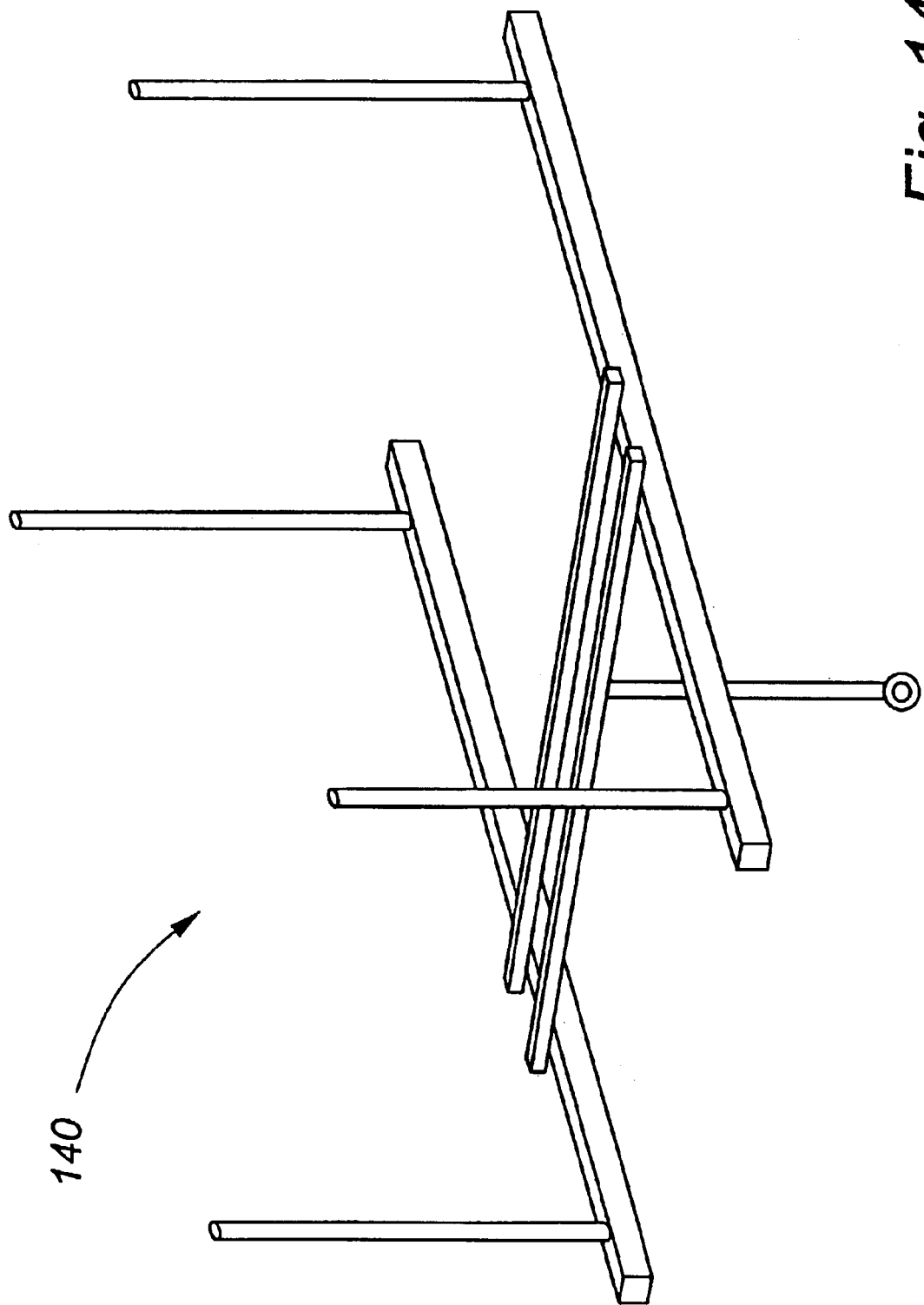
Figure 142:
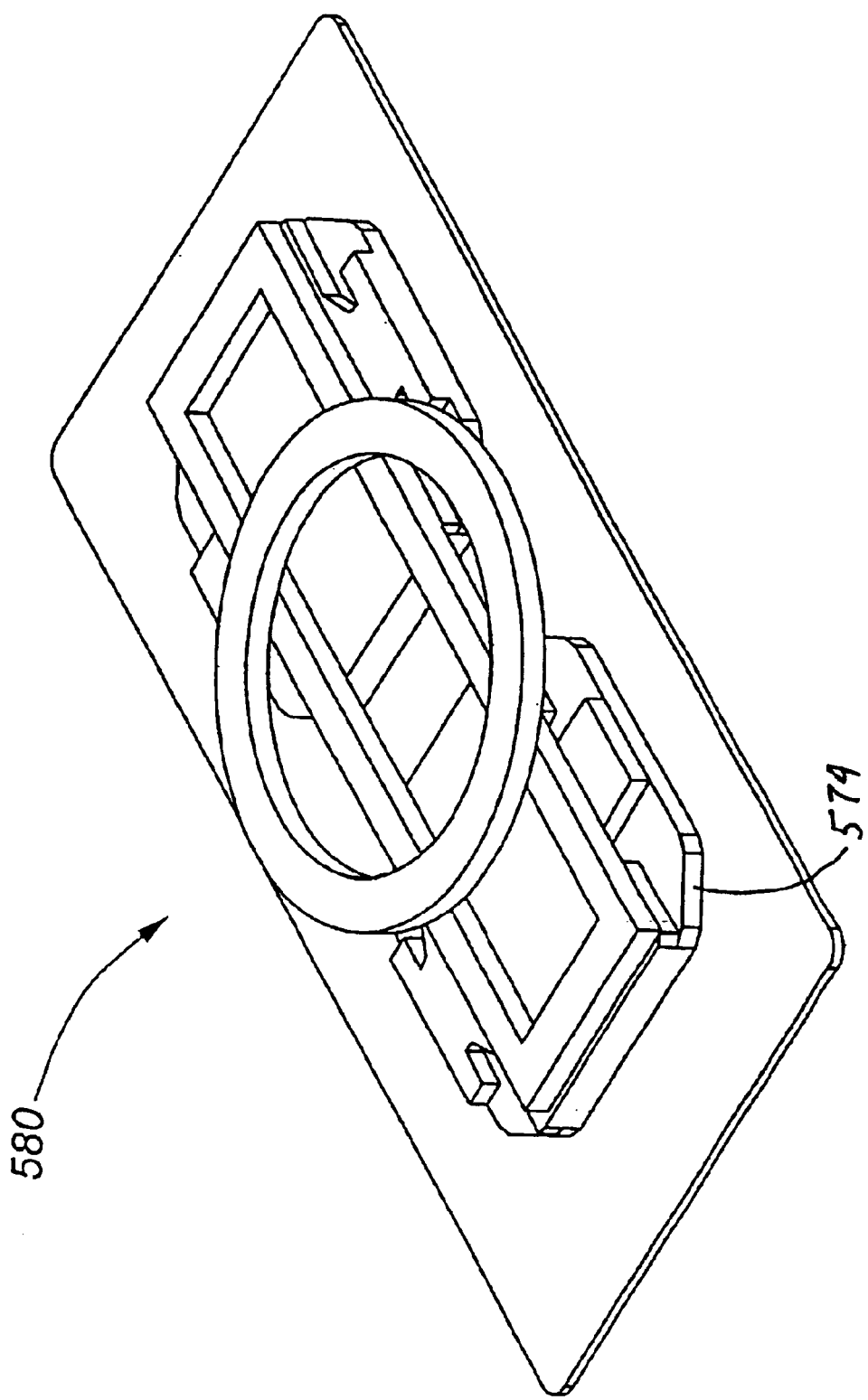
FIG. 142 illustrates a pallet type transfer station with a turntable.
Figure 143:
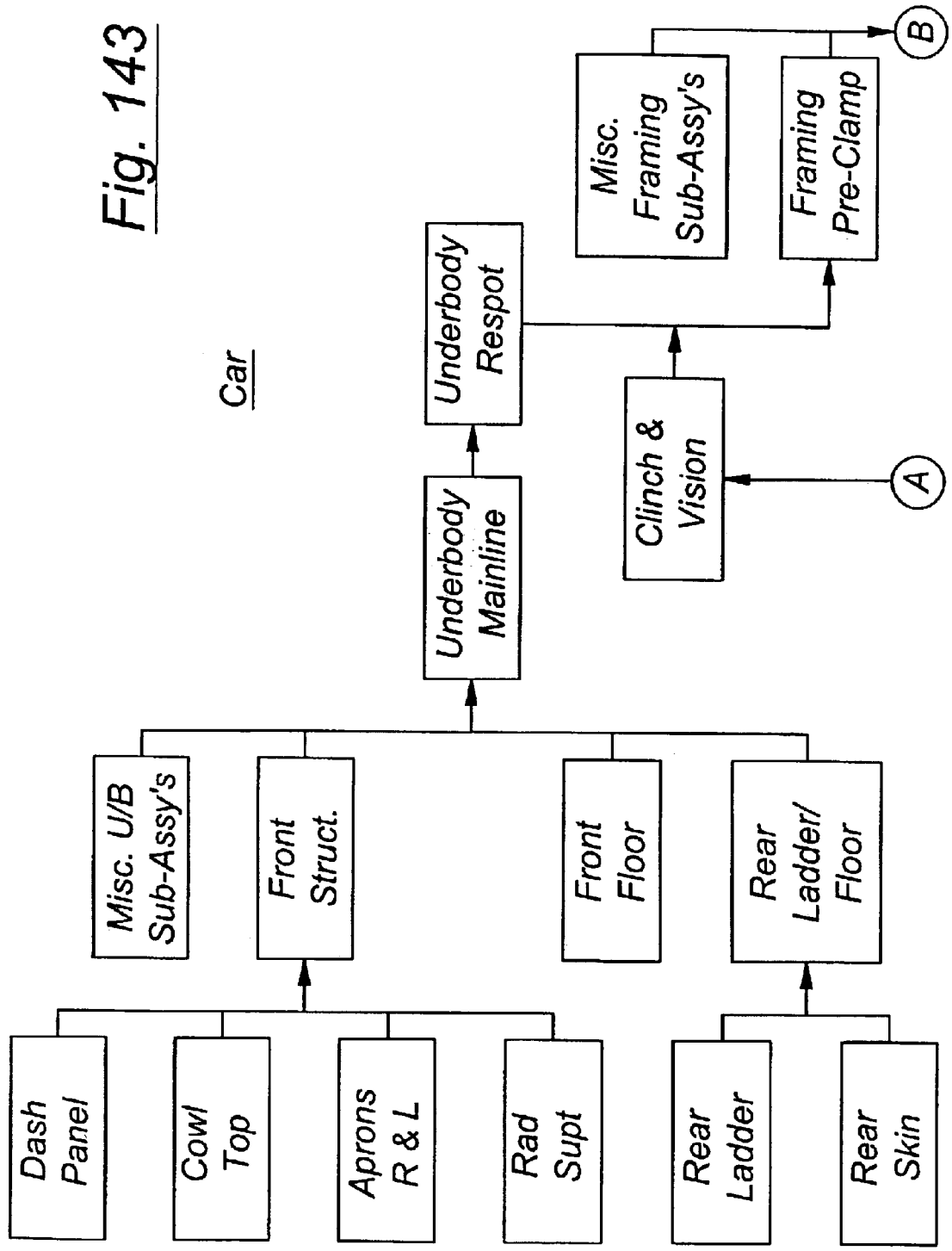
FIGS. 143–145 graphically illustrate a process line for producing an automotive vehicle car body.
Figure 144:
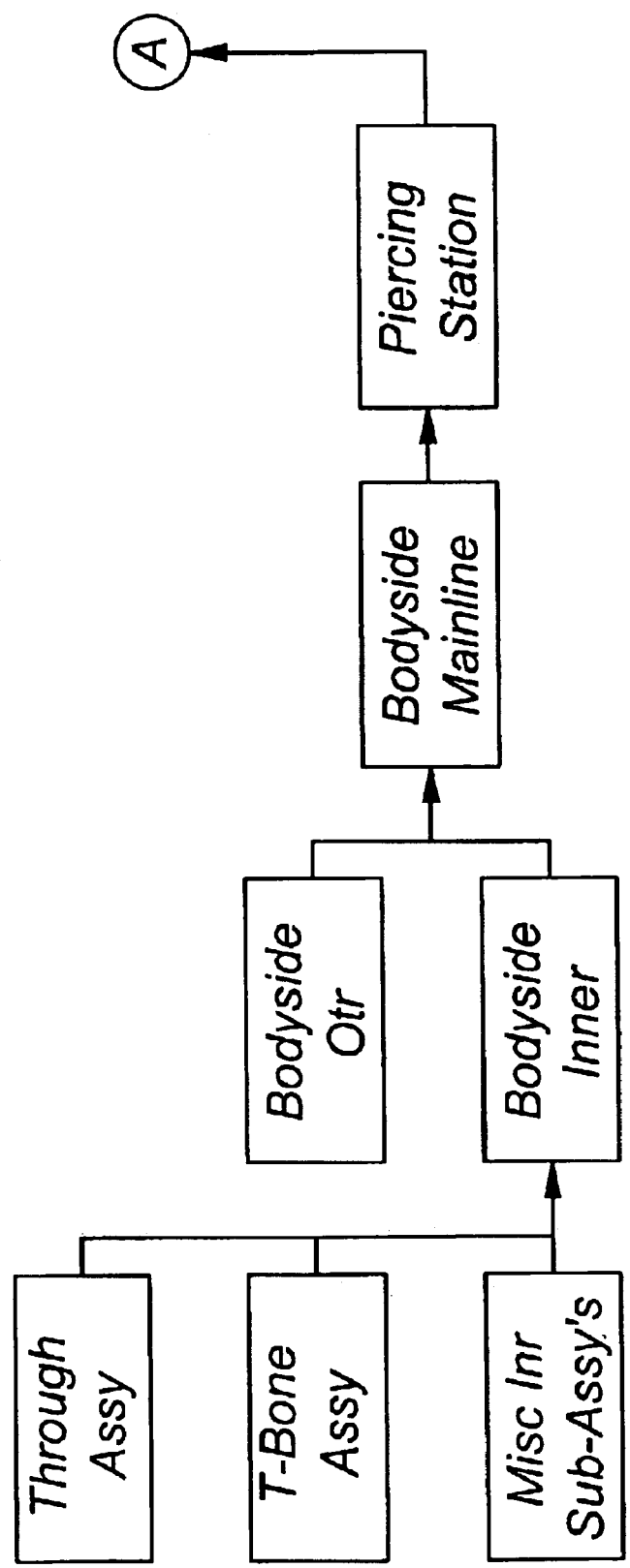

The flexible manufacturing system also has standardized transfer task stations to move workpieces and subassemblies between various templates and operational task stations. A first transfer task station is provided by a robot 555 (FIG. 133), which may transfer subassemblies between any of the aforementioned task stations 1–16. Referring to FIG. 134, a second transfer task station comprises a gravity powered over and under conveyor 554, which is typically supported by overhead hangers 556. Referring to FIG. 135, a third transfer task station is provided by an electrically powered over and under conveyor 558, which is suspended from overhead hangers 560. A fourth transfer task station is provided by an enclosed track monorail 562 (FIG. 136). A fifth transfer task station is provided by an exposed monorail 564 (FIG. 137 partially shown). A sixth transfer task station is provided by an electrified monorail 570 (FIG. 138). A seventh transfer task station is provided by a pallet transfer system 572 (FIG. 139) which has a roller/chain delivery for heavier subassemblies. An eighth transfer task station is provided by an overhead bridge crane 574 (FIG. 140). A pallet 580 with a turntable is shown in FIG. 142.

As mentioned previously, the process line is formed by a plurality of templates which are combined in a predetermined alignment to form the process line. The process line can be made flexible in different ways. First, the process line can be made flexible so that a first set of different subassemblies can be manufactured on the process line which differ from one another. These different subassemblies can be manufactured simultaneously due to the presence on the process line of workpiece presenters which have a tooling plate for each separate subassembly. In rare instances where the process line is dedicated to one type of vehicle, the entire process line can be quickly retooled by changing the appropriate tooling plates and reprogramming the robotic operators. However, in most instances, flexibility is chiefly accomplished by having workpiece presenters with tooling plates for all types of subassemblies desired.

Examples of vehicle differences are two similar vehicles having different structures and various differences in body components, while having similar basic dimensions. Other examples are a process line for a different series of passenger vehicles.

In some instances it may be desirable for the process line to provide a body portion for two separate assembly lines which vastly differ from one another, such as a passenger car line assembly line and a light truck vehicle assembly line. In other instances, the different assembly plants may include a front-wheel drive vehicle assembly plant and a rear-wheel drive vehicle. In still other instances, the assembly plants may be for a unibody-type passenger vehicle and a body-on-frame-type passenger vehicle.

To minimize resources required, a determination is made as to which task stations are required to form a given subassembly.

Figure 61:
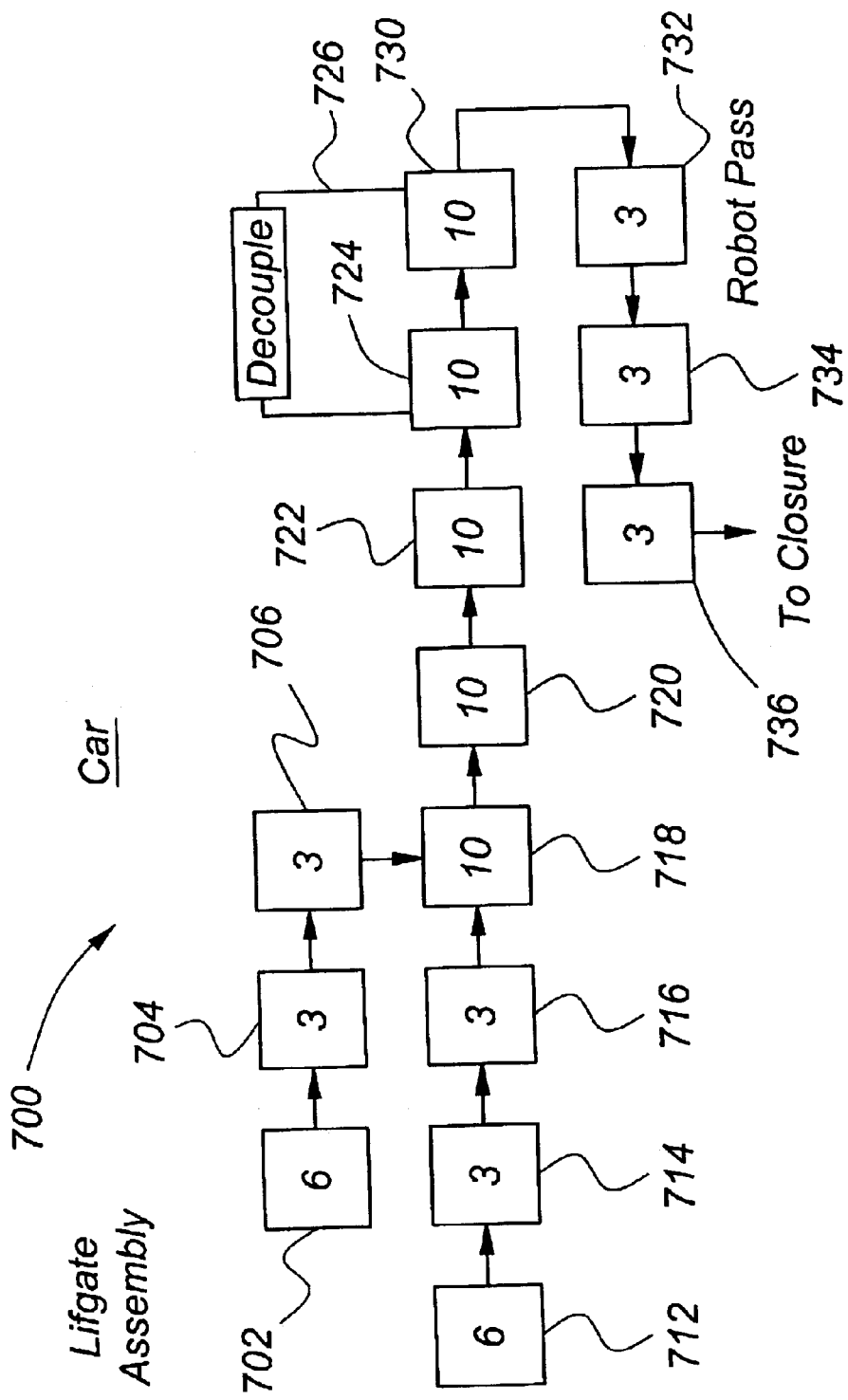
Figure 62:
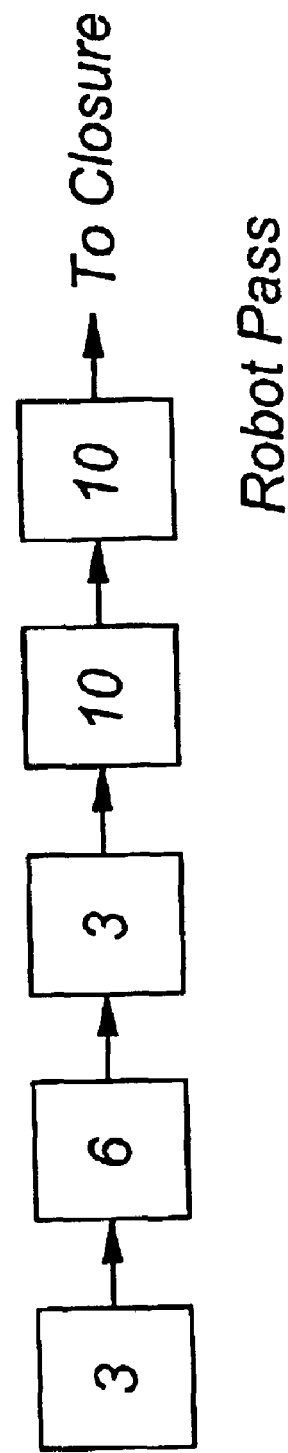

FIG. 61 provides an arrangement of template 700 for producing a lift gate assembly of the vehicle. The lift gate is a rear end enclosure of a hatchback. An outer panel is geopositioned (rigidly clamped and located) with reinforcements into a welding task station 6 noted as item 702. From the task station 702, via a number one transfer task station (robotic delivery not shown), the outer panel with its welded reinforcement is sent to a supplemental spot welding task station 3, item 704. From task station 3, 704 by robotic transfer the outer panel is delivered to a task station 3, 706 wherein sealant is applied. Simultaneously, the inner panel along with reinforcements is delivered to a geopositioning task station 6, 712 where welds are performed which fix the position of the inner panel and its reinforcements. The inner panel is then delivered to two supplemental weld task stations 3, 714 and 716.

In a geopositioning weld task station 10, 718 the inner panel is mated with the outer panel. Subsequent to the weld task station 10 the mated panels are delivered to two supplemental weld task stations 10, 720 and 722. By robotic transfer, the lift gate assembly is then delivered to a hemming task station 10, 724 wherein the outer panel is hemmed over the inner panel. The lift gate assembly is then delivered to a storage line 726 which holds 6 lift gate assemblies in queue. The storage line acts as a buffer. The storage line is sometimes called a decouple.

Figure 145:
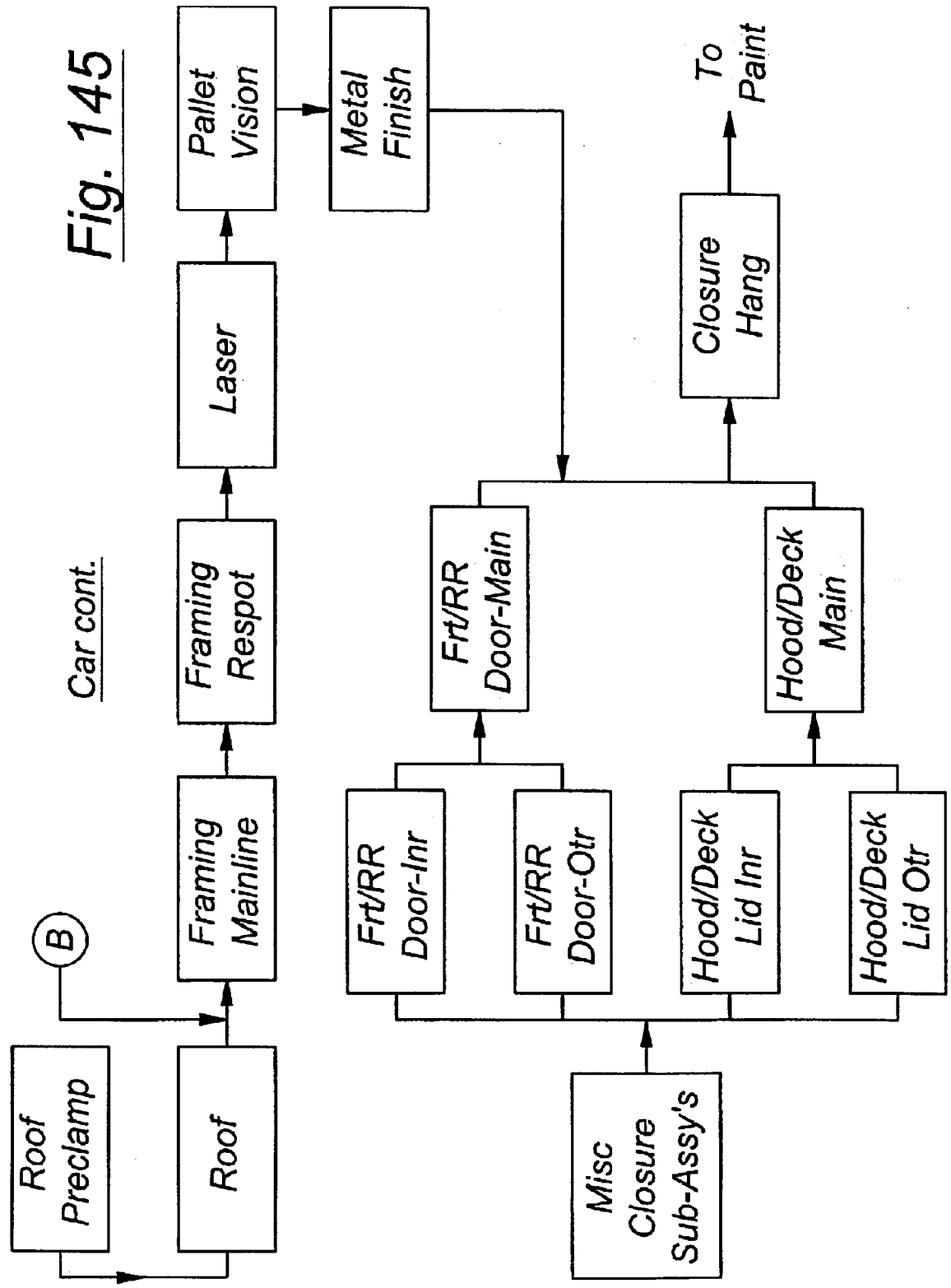
Figure 146:
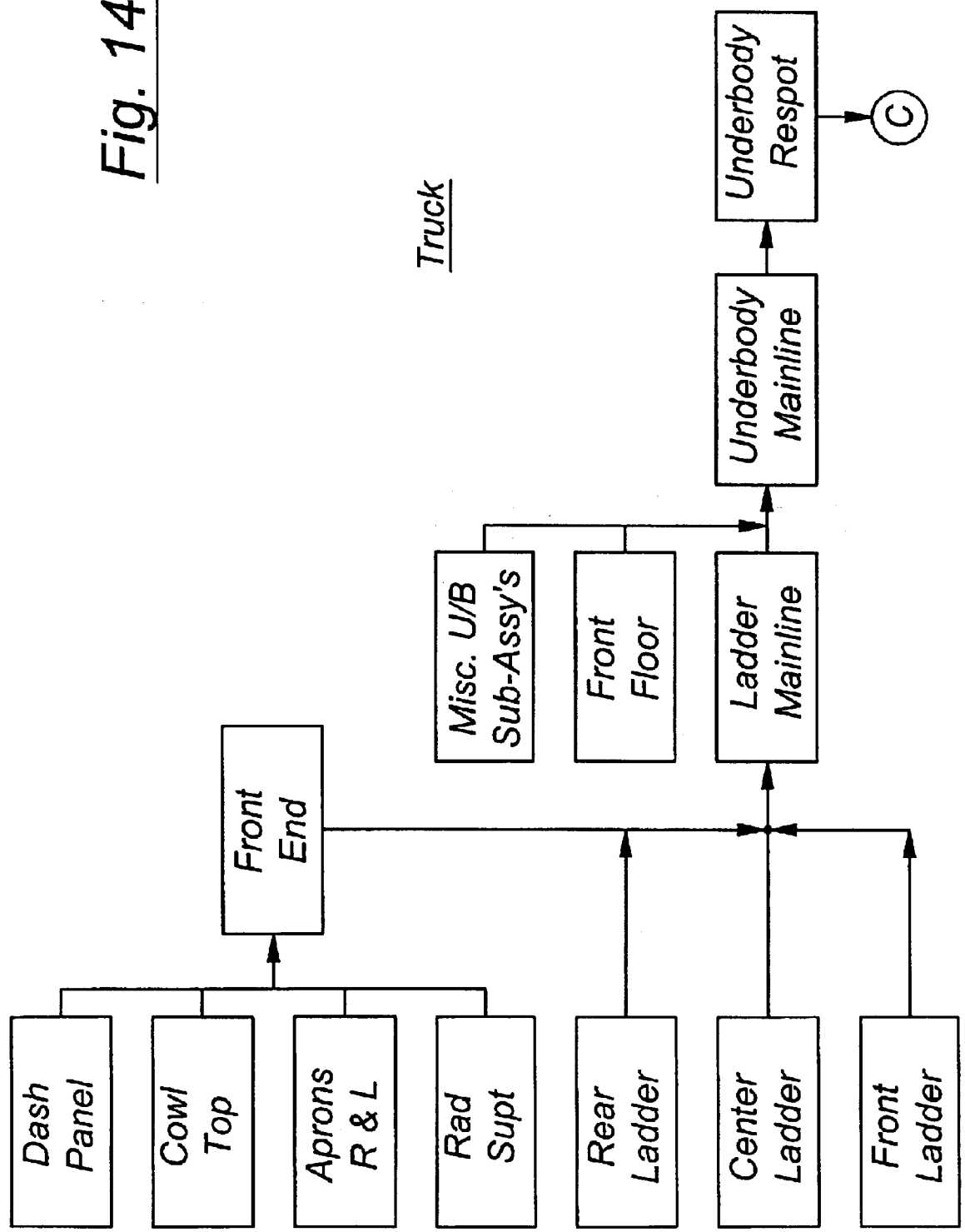
FIGS. 146–149 graphically illustrate a process line for a truck-like vehicle.
Figure 147:
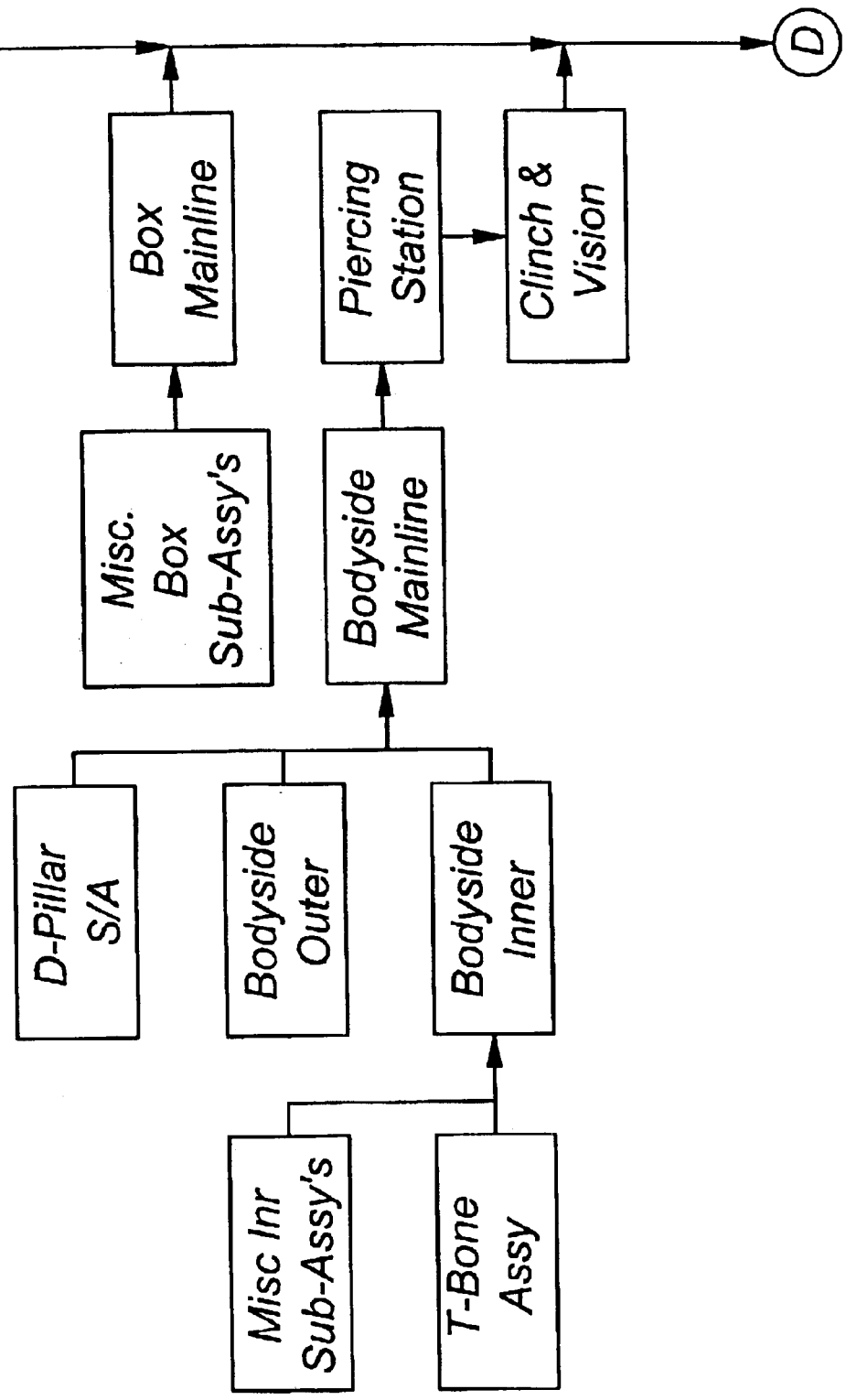
Figure 148:
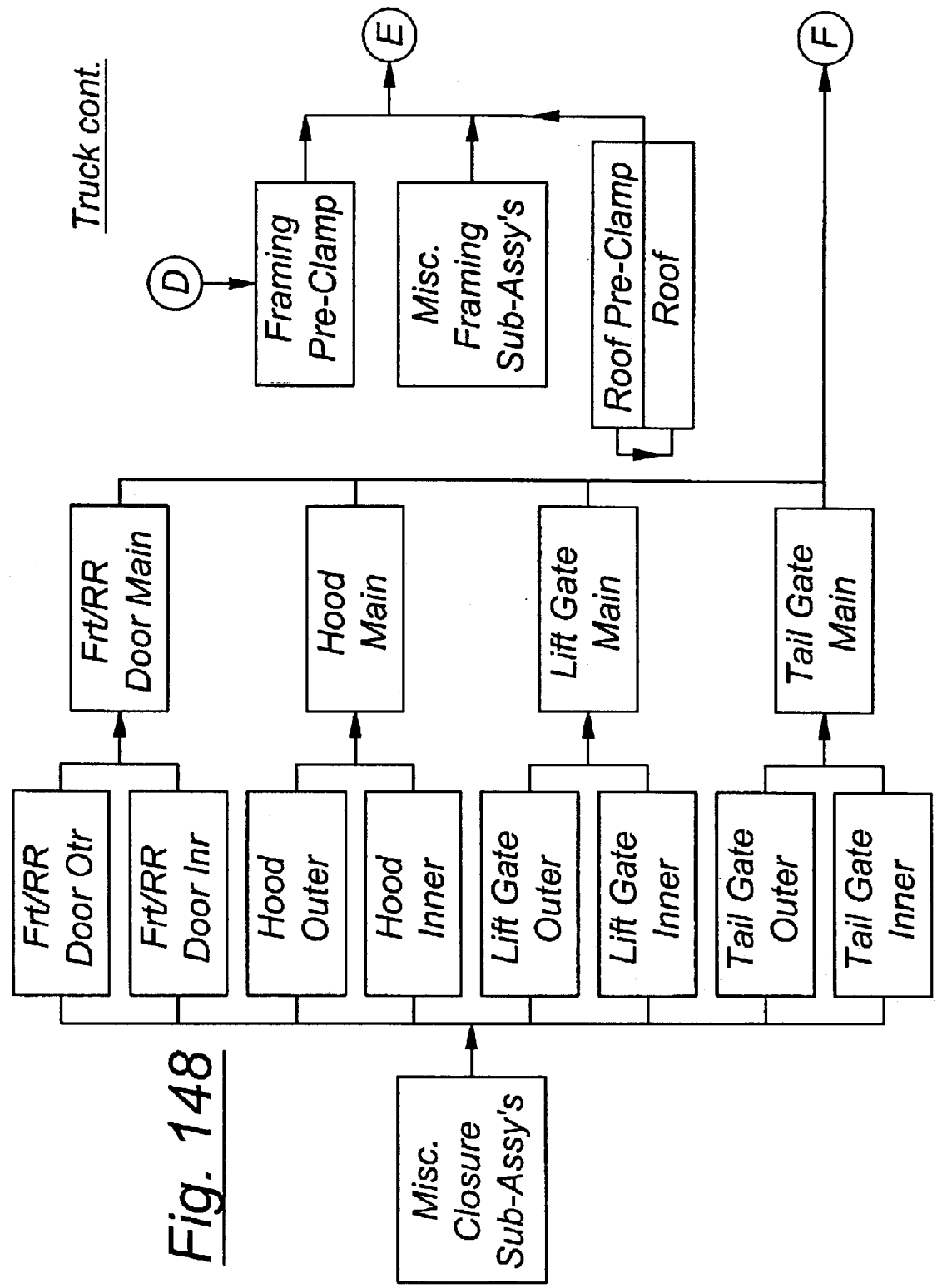
Figure 149:
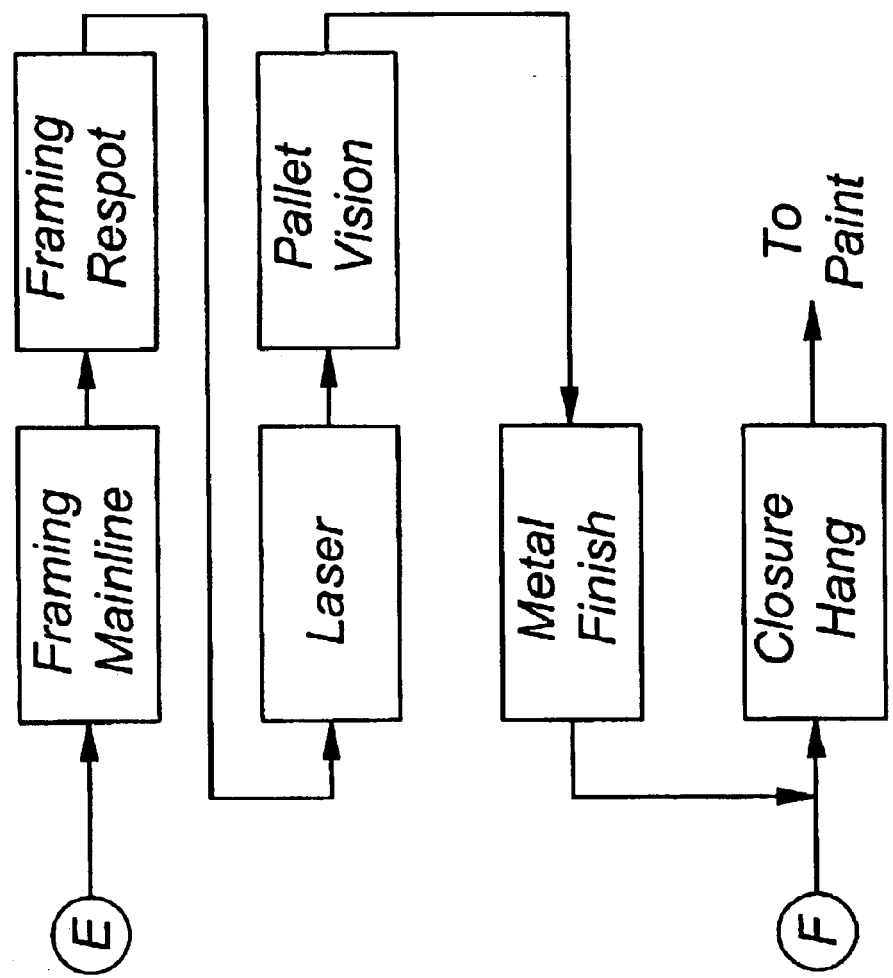

The lift gate assembly is then robotically transferred from a storage station 726 to a task station 10, 730 which applies sealant. The lift gate assembly is then robotically transferred to a task station 3, 732 where additional sealant is applied. The lift gate assembly is then transferred to a task station 3, 734 where portions of the sealant are induction cured. The lift gate assembly is then transferred to another task station 3, 736 where there is a secondary induction cure. The lift gate assembly is then transported to the main delivery line, shown in FIG. 145.

As mentioned previously, the lift gate assembly template 700 has two re-spotting task stations 10 noted as items 720 and 722. The maximum feed rate of the lift gate assembly is approximately 40 lift gate assemblies per hour. If desired, re-spot task station 722 can be eliminated and the number of welds completed at the geopositioning weld task station 10, 718 can be increased along with an increased number of welds at re-spot task station 10, 720. As such, a lift gate assembly feed rate of approximately thirty units per hours may be established.

Figure 151:
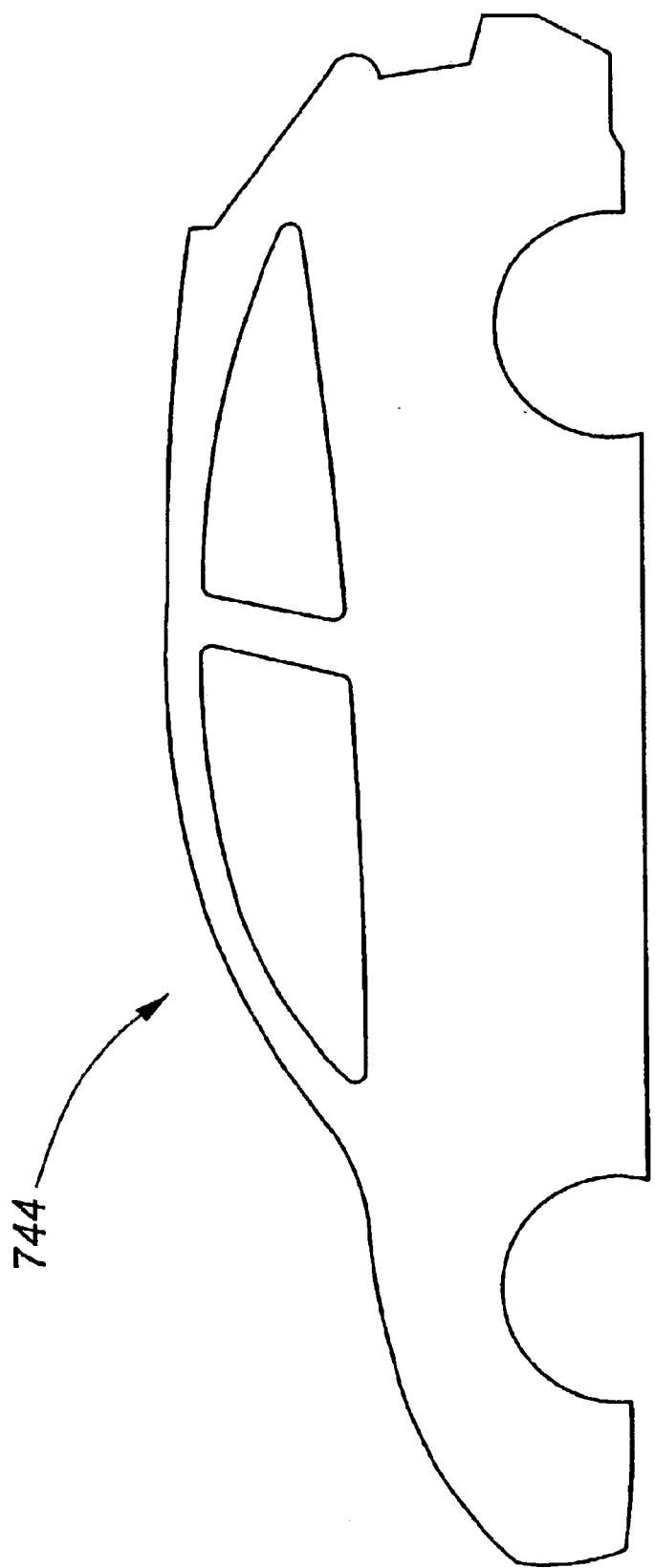
Figure 152:
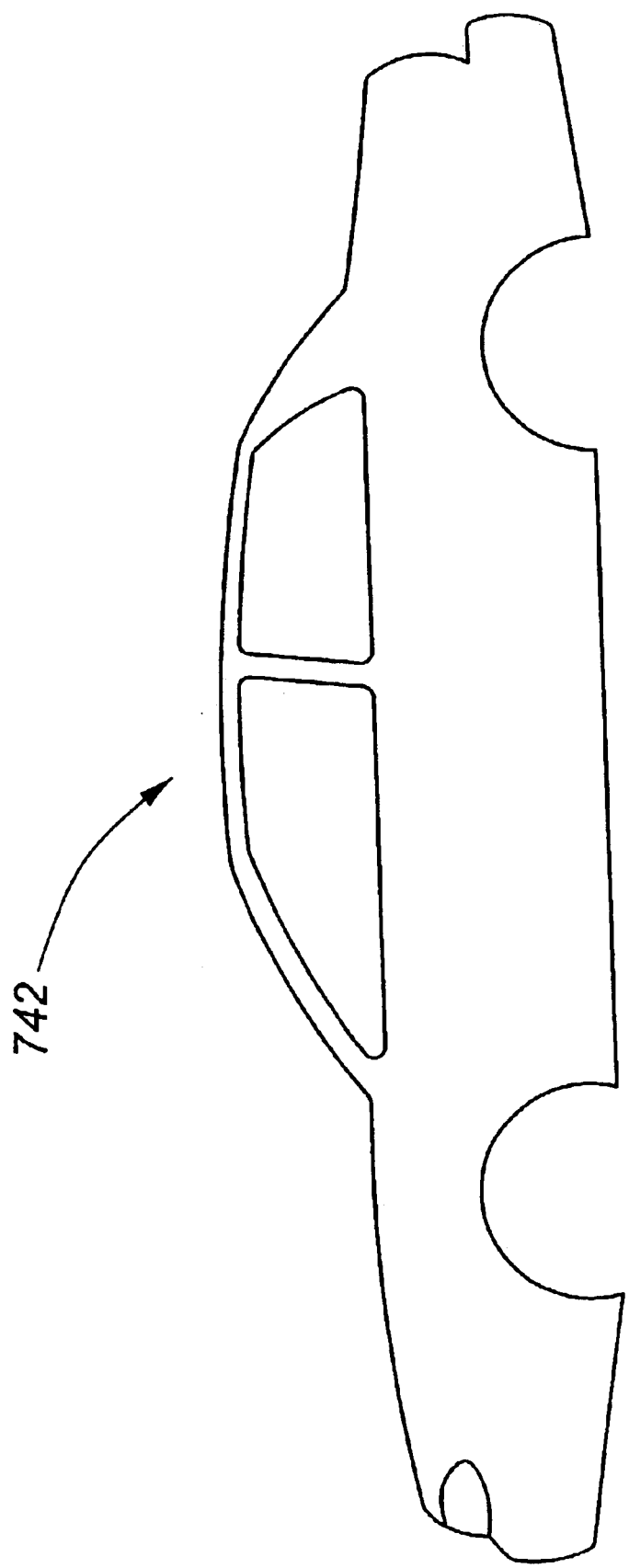

If a thirty lift gate assembly per hour completion rate is acceptable, then additional flexibility options may be realized. Task station 10, 720 may be dedicated to a first subassembly which is utilized for body-on-frame type vehicles (like rear wheel drive passenger car 742, FIG. 152) and task station 10, 722 may be a dedicated task stations for unibody frame-type passenger car vehicles (like front wheel drive vehicle 744, FIG. 151).

The lift gate assemblies in their initial phases of engineering will be stamped with holes so that the tooling prior to and including the weld geopositioning task station 10, 718 can be common to both types of passenger vehicle bodies. Thereafter, the differences in the lift gate assemblies will be accommodated in the task stations 724, 730, 732, 734 and 736.

Templates of subassemblies shown in FIGS. 10–18 are discrete for car body assemblies. Templates of subassemblies shown in FIGS. 19–37 are discrete for truck body assemblies. Templates shown in FIGS. 37–52 are common to car and truck bodies. By combining the templates in a predetermined manner, the process lines as shown in FIGS. 143–145 and 146–149 for the materially different cars and trucks are provided, resulting in a vehicle body which is delivered to the paint shop.

Figure 150:
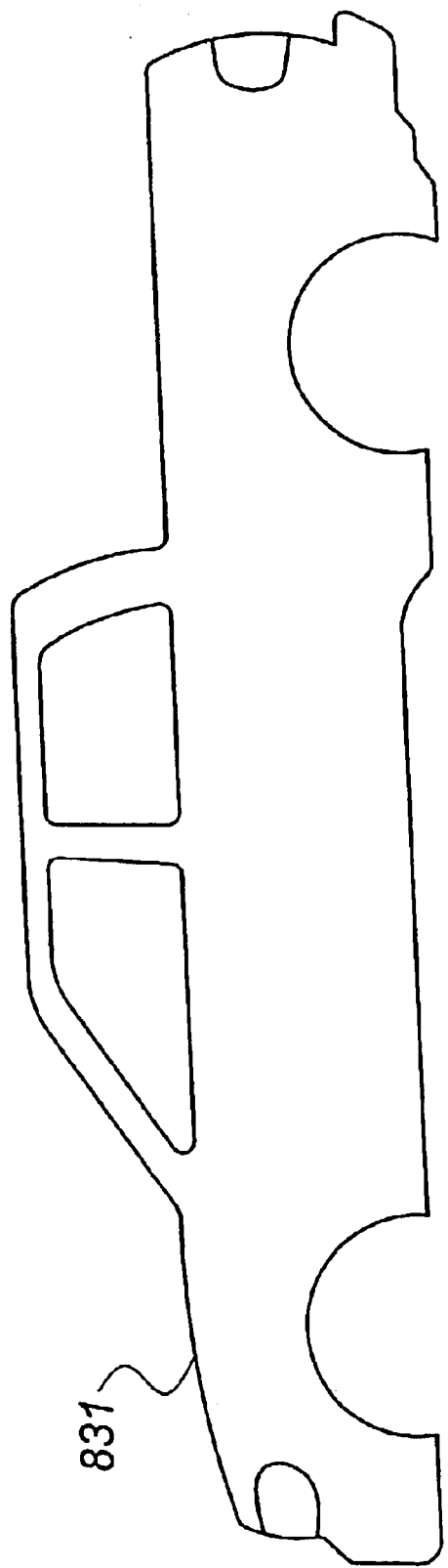
FIGS. 150–152 illustrate vehicle bodies for a rear wheel drive truck, a uniframe passenger front wheel drive vehicle and a body on frame chassis-type vehicle, respectively.

Referring to FIGS. 79–87, the flexible manufacturing system of the present invention has a first set of templates drawn from a set of standardized task stations for manufacturing subassemblies of a portion of a first type of vehicle. In like manner, FIGS. 97–105 provide templates drawn from a defined set of task stations utilized to form a process line for certain subassemblies of a second type of vehicle which materially differs from the first type of vehicle. It should be noted that the subassemblies of FIG. 1 are not just for one first type of vehicle, which in the instance is a passenger car, but it can be for a family of passenger cars. In like manner, the templates noted in FIGS. 88–106 are for a family of truck vehicles 831 (FIG. 150).

FIGS. 107–132 are a listing of templates which have been determined to be common for a process line for making cars and for producing trucks. In engineering a process line, if it is desirable to produce cars, templates of FIGS. 79–87 will be combined to form the process line. If it is desirable to produce trucks, templates of FIGS. 89–106 will be combined to produce the process line. The templates which are discrete to cars and the templates which are discrete to trucks will both be combined with the templates of FIGS. 107–132 which are common to both sets of assemblies if it is desirable for the process line to produce both types of vehicle bodies. In some instances, a space can be reserved in a template for future models.

As mentioned previously, although the sets of vehicle assemblies have been explained in a situation of passenger cars and trucks, in other instances the families of vehicles will differ in that one family will be rear-wheel drive and the other family will be front-wheel drive. Another variation is for vehicles having a unibody construction and vehicles having a body mounted on frame type construction.

Various embodiments of the present invention have been shown in the application of a process line for automotive vehicle car bodies. It will be apparent to those skilled in the art of the various modifications and changes which can be made to the present invention without departing from the spirit and scope of the invention as it is embodied in the accompanying claims.

What is claimed is:

1. A tooling plate assembly for mounting a workpiece for a vehicle subassembly, the tooling plate assembly comprising:
   a tooling plate including:
      a first surface adapted to receive the workpiece,
      a second surface disposed opposite the first surface,
      a channel disposed proximate the second surface,
      a first block plate disposed proximate the channel, the first block plate including a first step; and
      a second block plate disposed proximate channel, the second block plate having a second step and a third step disposed adjacent to the second step; and
   a workpiece presenter including:
      a first heel block having a first mating surface and a first locating portion extending from the first mating surface, and
      a second heel block having a second mating surface and second and third locating portions extending from the second mating surface;
   wherein the first heel block is adapted to receive the first block plate such that the first step engages the first locating portion and the second heel block is adapted to receive the second block plate such that the second and third steps engage the second and third locating portions, respectively, to locate the tooling plate with respect to the workpiece presenter in a repeatable manner.

2. The tooling plate assembly of claim 1 wherein the first block plate further comprises a hole adapted to receive a fastener extending from the first heel block.

3. The tooling plate assembly of claim 1 wherein the second block plate further comprises a hole adapted to receive a fastener extending from the second heel block.

4. The tooling plate assembly of claim 1 wherein the first surface has a planar configuration.

5. The tooling plate assembly of claim 1 further comprising a standoff disposed proximate the channel, the standoff being adapted to support the tooling plate when the tooling plate is removed from the workpiece presenter and disposed on a support surface.

6. The tooling plate of claim 5 wherein the first and second block plates are spaced apart from the support surface when the standoff supports the tooling plate.

7. The tooling plate assembly of claim 1 further comprising a first channel and a second channel spaced apart from and extending parallel to the first channel.

8. The tooling plate assembly of claim 7 wherein the first and second block plates are disposed proximate the first channel.

9. The tooling plate assembly of claim 7 further comprising a third block plate disposed proximate the first channel.

10. The tooling plate assembly of claim 7 further comprising a third block plate disposed proximate the second channel.

11. The tooling plate assembly of claim 7 wherein a first set of standoffs is disposed proximate the first channel and a second set of standoffs is disposed proximate the second channel.

12. The tooling plate assembly of claim 1 further comprising a plurality of mounting holes disposed proximate the first surface, each mounting hole being adapted to receive a fastener for mounting a fixture configured to receive the workpiece.

13. The tooling plate assembly of claim 12 wherein the plurality of mounting holes are arranged in a grid pattern such that each mounting hole is spaced apart from at least two other mounting holes by a common distance.

14. The tooling plate assembly of claim 1 wherein the workpiece presenter further comprises a platform and the first and second block plates are disposed proximate the platform.

* * * * *